(12) United States Patent
Tsumagari et al.

(10) Patent No.: US 7,167,634 B2
(45) Date of Patent: *Jan. 23, 2007

(54) DIGITAL VIDEO RECORDING/PLAYBACK SYSTEM WITH ENTRY POINT PROCESSING FUNCTION

(75) Inventors: Yasufumi Tsumagari, Yokohama (JP); Shinichi Kikuchi, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 114 days.

This patent is subject to a terminal disclaimer.

(21) Appl. No.: 10/801,058

(22) Filed: Mar. 16, 2004

(65) Prior Publication Data

US 2004/0175146 A1    Sep. 9, 2004

Related U.S. Application Data

(62) Division of application No. 10/076,484, filed on Feb. 19, 2002, now Pat. No. 6,798,976, which is a division of application No. 09/632,937, filed on Aug. 4, 2000, now Pat. No. 6,360,057, which is a division of application No. 09/564,538, filed on May 4, 2000, now Pat. No. 6,480,669.

(30) Foreign Application Priority Data

May 12, 1999    (JP)    ................................. 11-131475

(51) Int. Cl.
     *H04N 5/91*    (2006.01)
(52) U.S. Cl. .......................... 386/95; 386/125; 386/126
(58) Field of Classification Search .................. 386/95, 386/125–126, 124, 46, 83
     See application file for complete search history.

(56) References Cited

U.S. PATENT DOCUMENTS

| 5,740,304 | A | * | 4/1998 | Katsuyama et al. ........ 386/125 |
| 5,771,334 | A | | 6/1998 | Yamauchi et al. |
| 5,784,528 | A | | 7/1998 | Yamane et al. |
| 5,838,301 | A | | 11/1998 | Okamoto et al. |
| 6,064,380 | A | * | 5/2000 | Swenson et al. ......... 715/500.1 |

(Continued)

FOREIGN PATENT DOCUMENTS

JP    6-103317    4/1994

(Continued)

OTHER PUBLICATIONS

Explanation of Circumstances concerning Accelerated Examination for Japanese Patent Application No. 1999-131475 (with English translation).

(Continued)

*Primary Examiner*—Vincent F. Boccio
(74) *Attorney, Agent, or Firm*—Oblon, Spivak, McClelland, Maier & Neustadt, P.C.

(57) ABSTRACT

This invention allows the user to insert an entry point (bookmark) at an arbitrary recording position of video data, audio data, and the like as if he or she placed a bookmark between pages of a book. Information RTR_VMG that manages recorded objects includes movie cell entry point information M_C_EPI. M_C_EPI includes entry point playback time information EP_PTM and text information PRM_TXTI that pertains to an entry point. PRM_TXTI can store text information that pertains to its contents together with type information and date information of an entry point.

4 Claims, 41 Drawing Sheets

CONTENTS OF VIDEO MANAGER INFORMATION MANAGEMENT TABLE (VMGI_MAT)

| RBP | FILE NAME | CONTENTS |
|---|---|---|
| 0–11 | VMG_ID | VMG IDENTIFIER |
| 12–15 | RTR_VMG_EA | END ADDRESS OF RTR_VMG |
| 16–27 | RESERVED | RESERVED |
| 28–31 | VMGI_EA | END ADDRESS OF VMGI |
| 32–33 | VERN | VERSION NUMBER OF DVD SPECIFICATION FOR VIDEO RECORDING |
| 32–127 | RESERVED | RESERVED |
| 128–129 | TM_ZONE | TIME ZONE |
| 130–131 | STILL_TM | STILL TIME FOR STILL PICTURES |
| 132–133 | CHRS | CHARACTER SET CODE FOR PRIMARY TEXT |
| 134–148 | RSM_MRKI | RESUME MAKER INFORMATION |
| 149–163 | REP_PICTI | DISC REPRESENTATIVE PICTURE INFORMATION |
| 164–191 | RESERVED | RESERVED |
| 192–195 | M_AVFIT_SA | START ADDRESS OF M_AVFIT |
| 196–199 | S_AVFIT_SA | START ADDRESS OF S_AVFIT |
| 200–207 | RESERVED | RESERVED |
| 208–211 | ORG_PGCI_SA | START ADDRESS OF ORG_PGCI |
| 212–215 | UD_PGCIT_SA | START ADDRESS OF UD_PGCIT |
| 216–219 | TXTDT_MG_SA | START ADDRESS OF TXTDT_MG |
| 220–223 | MNFIT_SA | START ADDRESS OF MNFIT |
| 224–511 | RESERVED | RESERVED FOR FUTURE USE |

RBP=RELATIVE BYTE POSITION

U.S. PATENT DOCUMENTS

| | | | |
|---|---|---|---|
| 6,078,727 | A | 6/2000 | Saeki et al. |
| 6,088,507 | A | 7/2000 | Yamauchi et al. |
| 6,108,486 | A | 8/2000 | Sawabe et al. |
| 6,157,769 | A * | 12/2000 | Yoshimura et al. ........... 386/95 |
| 6,181,870 | B1 | 1/2001 | Okada et al. |
| 6,188,835 | B1 | 2/2001 | Grandbois |
| 6,253,026 | B1 | 6/2001 | Saeki et al. |
| 6,263,155 | B1 | 7/2001 | Saeki et al. |
| 6,360,057 | B1 | 3/2002 | Tsumagari et al. |
| 6,493,505 | B1 * | 12/2002 | Okada et al. ................. 386/95 |
| 6,798,976 | B1 * | 9/2004 | Tsumagari et al. ............ 386/95 |

FOREIGN PATENT DOCUMENTS

| | | |
|---|---|---|
| JP | 9-245413 | 9/1997 |
| JP | 11-96730 | 4/1999 |
| JP | 2000-322875 | 11/2000 |

OTHER PUBLICATIONS

Explanation of Circumstances concerning Accelerated Examination for Japanese Patent Application No. 2001-284024 (with English translation).

Explanation of Circumstances concerning Accelerated Examination for Japanese Patent Application No. 2001-284023 (with English translation).

* cited by examiner

CONTENTS OF VIDEO MANAGER INFORMATION
MANAGEMENT TABLE (VMGI_MAT)

| RBP | FILE NAME | CONTENTS |
|---|---|---|
| 0-11 | VMG_ID | VMG IDENTIFIER |
| 12-15 | RTR_VMG_EA | END ADDRESS OF RTR_VMG |
| 16-27 | RESERVED | RESERVED |
| 28-31 | VMGI_EA | END ADDRESS OF VMGI |
| 32-33 | VERN | VERSION NUMBER OF DVD SPECIFICATION FOR VIDEO RECORDING |
| 32-127 | RESERVED | RESERVED |
| 128-129 | TM_ZONE | TIME ZONE |
| 130-131 | STILL_TM | STILL TIME FOR STILL PICTURES |
| 132-133 | CHRS | CHARACTER SET CODE FOR PRIMARY TEXT |
| 134-148 | RSM_MRKI | RESUME MAKER INFORMATION |
| 149-163 | REP_PICTI | DISC REPRESENTATIVE PICTURE INFORMATION |
| 164-191 | RESERVED | RESERVED |
| 192-195 | M_AVFIT_SA | START ADDRESS OF M_AVFIT |
| 196-199 | S_AVFIT_SA | START ADDRESS OF S_AVFIT |
| 200-207 | RESERVED | RESERVED |
| 208-211 | ORG_PGCI_SA | START ADDRESS OF ORG_PGCI |
| 212-215 | UD_PGCIT_SA | START ADDRESS OF UD_PGCIT |
| 216-219 | TXTDT_MG_SA | START ADDRESS OF TXTDT_MG |
| 220-223 | MNFIT_SA | START ADDRESS OF MNFIT |
| 224-511 | RESERVED | RESERVED FOR FUTURE USE |

RBP=RELATIVE BYTE POSITION

FIG. 7

CONTENTS OF PLAY LIST SEARCH POINTER
TABLE INFORMATION (PL_SRPTI)

| RBP | FILE NAME | CONTENTS |
|---|---|---|
| 0-2 | RESERVED | RESERVED |
| 3 | PL_SRP_Ns | NUMBER OF PLAY LIST SEARCH POINTERS |
| 4-7 | PL_SRPT_EA | END ADDRESS OF PL_SRPT |

RBP=RELATIVE BYTE POSITION

CONTENTS OF PLAY LIST SEARCH POINTER (PL_SRP)

| RBP | FILE NAME | CONTENTS |
|---|---|---|
| 0 | RESERVED | RESERVED |
| 1 | PL_TY | PLAY LIST TYPE |
| 2 | PGCN | PGC NUMBER |
| 3-7 | PL_CREATE_TM | TIME WHEN PLAY LIST WAS CREATED |
| 8-135 | PRM_TXTI | PRIMARY TEXT INFORMATION |
| 136-137 | IT_TXT_SRPN | ITEM TEXT SEARCH POINTER NUMBER FOR THIS PLAY LIST IT_TXT_SRPN |
| 138-145 | THM_PTRI | THUMBNAIL POINTER INFORMATION |

RBP=RELATIVE BYTE POSITION

FIG. 10

CONTENTS OF THUMBNAIL POINTER INFORMATION (THM_PTRI)

| RBP | FILE NAME | CONTENTS |
|---|---|---|
| 138-139 | CN | CELL NUMBER |
| 140-145 | THM_PT | THUMBNAIL POINT |

RBP=RELATIVE BYTE POSITION

FIG. 11

CONTENTS OF TIME MAP GENERAL INFORMATION (TMAP_GI)

| RBP | FILE NAME | CONTENTS |
|-----|-----------|----------|
| 0-1 | TM_ENT_Ns | NUMBER OF TIME ENTRIES |
| 2-3 | VOBU_ENT_Ns | NUMBER OF VOBU ENTRIES |
| 4-5 | TM_OFS | TIME OFFSET |
| 6-9 | ADR_OFS | ADDRESS OFFSET |

RBP=RELATIVE BYTE POSITION

FIG. 15

CONTENTS OF TIME ENTRY (TM_ENT)

| RBP | FILE NAME | CONTENTS |
|-----|-----------|----------|
| 0-1 | VOBU_ENTN | VOBU ENTRY NUMBER |
| 2 | TM_DIFF | TIME DIFFERENCE |
| 3-6 | VOBU_ADR | TARGET VOBU ADDRESS |

RBP=RELATIVE BYTE POSITION

FIG. 16

CONTENTS OF PGC GENERAL INFORMATION (PGC_GI)

| RBP | FILE NAME | CONTENTS |
|---|---|---|
| 0 | RESERVED | RESERVED |
| 1 | PG_Ns | NUMBER OF PROGRAMS |
| 2-3 | CI_SRP_Ns | NUMBER OF CI_SRPs |

RBP=RELATIVE BYTE POSITION

FIG. 20

CONTENTS OF PROGRAM INFORMATION (PGI)

| RBP | FILE NAME | CONTENTS |
|---|---|---|
| 0 | RESERVED | RESERVED |
| 1 | PG_TY | PROGRAM TYPE |
| 2-3 | C_Ns | NUMBER OF CELLS IN THIS PROGRAM |
| 4-131 | PRM_TXTI | PRIMARY TEXT INFORMATION |
| 132-133 | IT_TXT_SRPN | IT_TXT_SRP NUMBER |
| 134-141 | THM_PTRI | THUMBNAIL POINTER INFORMATION |

RBP=RELATIVE BYTE POSITION

FIG. 21

CONTENTS OF MOVIE CELL GENERAL INFORMATION (M_C_GI)

| RBP | FILE NAME | CONTENTS |
|---|---|---|
| 0 | RESERVED | RESERVED |
| 1 | C_TY | CELL TYPE |
| 2-3 | M_VOBI_SRPN | MOVIE VOBI SEARCH POINTER NUMBER |
| 4-5 | C_EPI_Ns | NUMBER OF CELL ENTRY POINT INFORMATION |
| 6-11 | C_V_S_PTM | PRESENTATION START TIME OF THIS CELL |
| 12-17 | C_V_E_PTM | PRESENTATION END TIME OF THIS CELL |

RBP=RELATIVE BYTE POSITION

FIG. 24

CONTENTS OF MOVIE CELL ENTRY POINT INFORMATION (M_C_EPI)

| RBP | FILE NAME | CONTENTS |
|---|---|---|
| 0 | EP_TY | ENTRY POINT TYPE |
| 1-6 | EP_PTM | PRESENTATION TIME OF ENTRY POINT |
| 7-134 | PRM_TXTI | PRIMARY TEXT INFORMATION |

RBP=RELATIVE BYTE POSITION

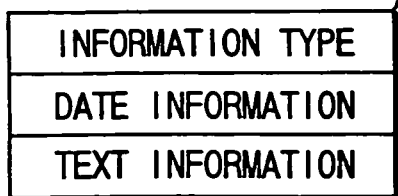

FIG. 25

=RESULT OF SEARCHING=

| TIME | TITLE | ATTRIBUTE | MARK REC TIME |
|------|-------|-----------|---------------|
| 00'00" | CINDERELLA | SET | 99.01.01 20:00 |
| 01'10" | WITCH & CINDERELLA | SET | 99.01.04 19:00 |

FIG. 42

STRUCTURE OF THE STREAM DATA AREA WITHIN A STREAM PES PACKET

DIGITAL VIDEO RECORDING/PLAYBACK SYSTEM WITH ENTRY POINT PROCESSING FUNCTION

CROSS-REFERENCE TO RELATED APPLICATIONS

The present application is a divisional of application Ser. No. 10/076,484, filed on Feb. 19, 2002, which is a divisional of application Ser. No. 09/632,937 (now U.S. Pat. No. 6,360,057), filed on Aug. 4, 2000, which is a divisional of application Ser. No. 09/564,538 (now U.S. Pat. No. 6,480,669), filed on May 4, 2000, each of which is incorporated herein by reference.

BACKGROUND OF THE INVENTION

The present invention relates to an apparatus/method capable of real-time digital recording of a video picture and the like, and a digital information medium (real-time digital video recording/playback system) used in the apparatus/method.

More particularly, the present invention relates to an apparatus/method which assures a special information storage area on a recordable/reproducible DVD disc (DVD-RAM disc or the like), and uses information stored in that area as needed upon playback, erasure, or the like of a recorded video program.

Nowadays, DVD video specification that uses MPEG2 (Moving Picture Expert Group 2) in video (moving picture) digital recording/playback, and AC-3 (Digital Audio Compression or Audio Coding 3) in audio digital recording/playback has been settled, and various playback apparatuses (DVD video players) which use that specification are commercially available.

The DVD video specification supports MPEG2 as a moving picture compression scheme, and AC-3 audio and MPEG audio in addition to linear PCM as an audio recording scheme. Also, the DVD video specification supports sub-picture data for superimposed dialogs, navigation data for playback control such as fastforwarding, rewinding, data search, and the like, and ISO9660 and UDF bridge format for computers.

Furthermore, recordable DVD discs (recordable/reproducible DVD-RAM/DVD-RW or write-once DVD-R) have been developed, and an environment that allows the development of digital video information recording/playback apparatuses (alternatives to a conventional video cassette tape recorder) using recordable DVD discs is in order.

Under such circumstances, the DVD-RTR (DVD real-time recording) specification for digitally recording a video picture or the like in real time and playing it back has been proposed, and is settled as a standard.

However, the number and kinds of program contents recorded tends to increase with increasing recording size of a disc, and it becomes harder for the user to grasp the recorded contents. For this reason, a problem is posed in terms of management of recorded discs.

BRIEF SUMMARY OF THE INVENTION

It is an object of the present invention to provide an apparatus/method and medium, which allow the user to write or erase a mark (entry point) at an arbitrary recording position of video data, audio data, and the like as if he or she placed a bookmark between pages or at an important position while reading a book.

In order to achieve the above object, a digital video information medium according to the present invention has a volume space including a management area and data area.

The data area stores data segmented into one or more objects (RTR_MOV.VRO/VR_MOVIE.VRO, RTR_STO.VRO/VR_STILL.VRO, RTR_STA.VRO/VR_AUDIO.VRO). Each object is comprised of one or more data units (one or more VOBUs form a cell, and one or more cells form video object). Each data unit (VOBU) stores one or more packs (video or audio packs) of video or audio data to be played back within a predetermined time (0.4 to 1.2 sec).

The management area stores management information (RTR_VMG) used to manage the objects. The management information (RTR_VMG) has program chain information (ORG_PGC or UD_PGCIT) for designating the playback order of objects. The program chain information (PGCI) includes one or more pieces of program information (PGI) and one or more pieces of cell information (CI). The cell information (CI) contains designation information (M_CI) for designating an object to be played back.

The designation information (M_CI) records entry point information (M_C_EPI) for designating the playback position in an object.

The entry point information (M_C_EPI) includes information (PRM_TXTI) that pertains to an entry point.

In order to achieve the above object, a digital video information recording/playback apparatus according to the present invention records or plays back the contents of the objects (RTR_MOV.VRO/VR_MOVIE.VRO) using a recordable/reproducible medium which has movie cell information (M_CI) in management information (RTR_VMG) for managing objects (RTR_MOV.VRO/VR_MOVIE.VRO) as recorded information.

The digital video information recording/playback apparatus comprises an entry point setting unit (MPU) for setting a required entry point (M_C_EPI#1 to M_C_EPI#n) in the movie cell information (M_CI); an additional information input unit (MPU) for inputting additional information (information type, information date, text information, and the like in PRM_TXTI) with respect to the entry point (M_C_EPI); and an additional information setting unit (MPU) for setting the additional information in the entry point (M_C_EPI).

In order to achieve the above object, a digital video information processing method according to the present invention records or plays back the contents of the objects (RTR_MOV.VRO/VR_MOVIE.VRO) using a recordable/reproducible medium which has movie cell information (M_CI) in management information (RTR_VMG) for managing objects (RTR_MOV.VRO/VR_MOVIE.VRO) as recorded information.

In this digital video information processing method, a required entry point (M_C_EPI#1 to M_C_EPI#n) is set in the movie cell information (M_CI); additional information (information type, information date, text information, and the like in PRM_TXTI) is input with respect to the entry point (M_C_EPI); and the additional information is set in the entry point (M_C_EPI).

Using the entry point as needed, the user can easily recognize the recorded contents of a disc. Also, using the entry point information, the user can record/play back from a desired position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a view for explaining the contents of a video manager information table (VMGI_MAT) shown in FIG. 6;

FIG. 10 is a view for explaining the contents of a play list search pointer (PL_SRP) shown in FIG. 8;

FIG. 11 is a view for explaining the contents of thumbnail pointer information (THM_PTRI) shown in FIG. 10;

FIG. 15 is a view for explaining the contents of time map general information (TMAP_GI) shown in FIG. 14;

FIG. 16 is a view for explaining the contents of a time entry (TM_ENT) shown in FIG. 14;

FIG. 20 is a view for explaining the contents of PGC general information (PGC_GI) shown in FIG. 19;

FIG. 21 is a view for explaining the contents of program information (PGI) shown in FIG. 19;

FIG. 24 is a view for explaining the contents of movie cell general information (M_C_GI) shown in FIG. 23;

FIG. 25 is a view for explaining the contents of movie cell entry point information (M_C_EPI) shown in FIG. 23;

FIG. 42 shows an example of a search result display window in the text information search process shown in FIG. 40;

DETAILED DESCRIPTION OF THE INVENTION

The arrangement of a medium (DVD recordable/reproducible disc) according to an embodiment of the present invention, the arrangement of a DVD-RTR (DVD real-time recording) recording/playback apparatus (RTR video recorder), and various operations of this apparatus will be explained below with reference to the accompanying drawings.

Figure 1:
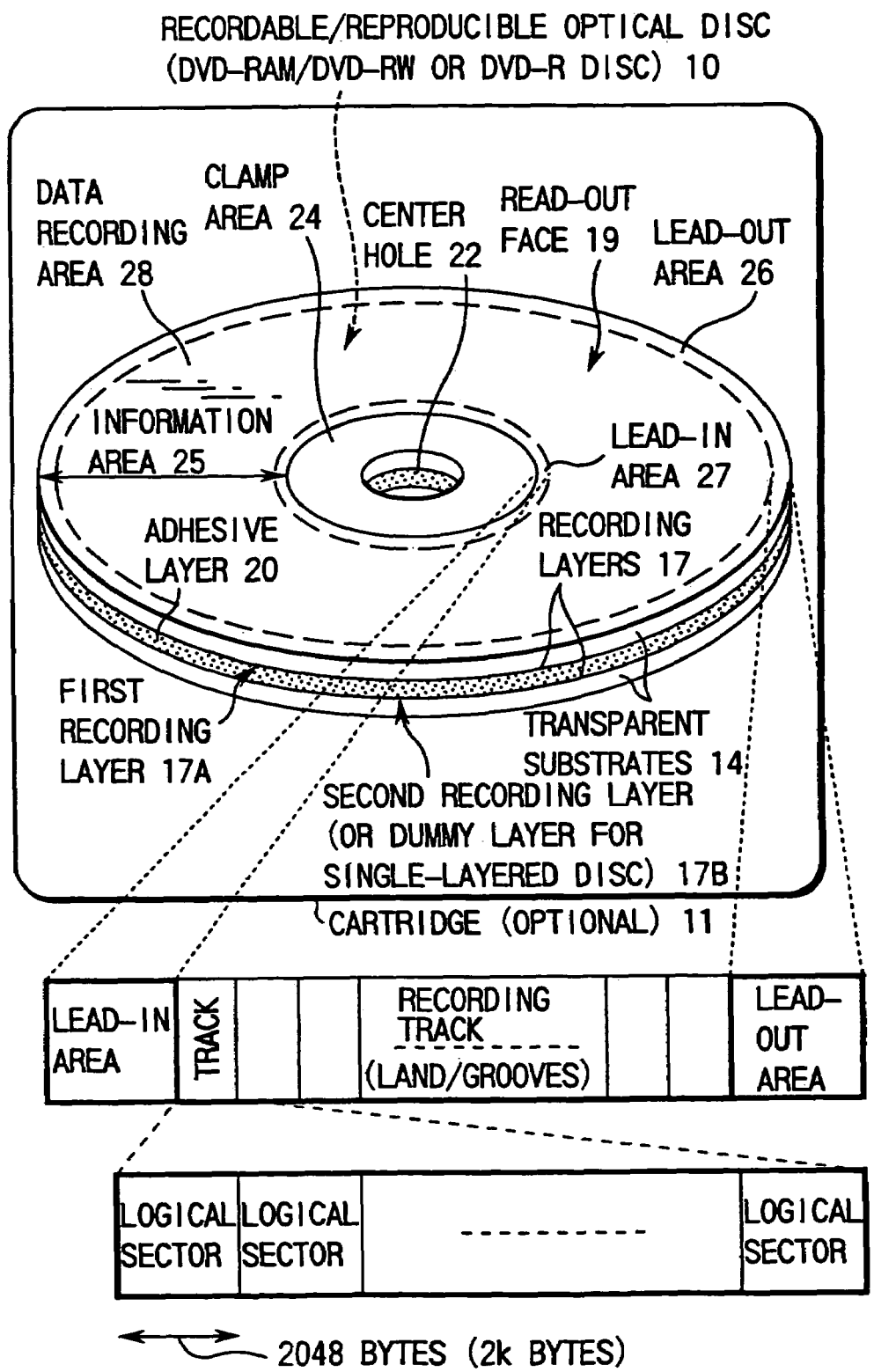
FIG. 1 is a view for explaining the structure of a recordable/reproducible optical disc according to an embodiment of the present invention.

FIG. 1 is a view for explaining the structure of optical disc 10 used in the DVD-RTR recording/playback apparatus. As shown in FIG. 1, optical disc 10 has a structure obtained by adhering a pair of transparent substrates 14 respectively having layers 17A and 17B using adhesive layer 20.

If this disc 10 is a single-layered DVD-RAM (or DVD-RW) disc, first information recording layer 17A is formed of a phase change recording layer, and second information recording layer 17B is formed of a dummy layer (which may also serve as a label of that disc).

If this disc 10 is a single-sided, two-layered DVD-ROM/RAM disc, first information recording layer 17A is formed of a semi-transparent film (thin metal film or the like) formed with pits, and second information recording layer 17B is formed of a phase change recording layer.

If this disc 10 is a double-sided, two-layered DVD-RAM (or DVD-RW) disc, both first and second information recording layers 17A and 17B are formed of phase change recording layers.

Each substrate 14 can be formed of a 0.6-mm thick polycarbonate film, and adhesive layer 20 can consist of a very thin ultraviolet setting resin (around 40 m to 70 m thick). When this pair of 0.6-mm thick substrates 14 are adhered so that layers 17A and 17B contact each other on the surfaces of adhesive layer 20, 1.2-mm thick large-capacity optical disc 10 is obtained.

Optical disc 10 has center hole 22, and clamp areas 24 used for clamping optical disc 10 upon its rotation are formed around center hole 22 on the two surfaces of the disc. Center hole 22 receives the spindle of a disc motor when disc 10 is loaded into a disc drive (not shown). Optical disc 10 is clamped at its clamp areas 24 by a disc damper (not shown).

Optical disc 10 has information areas 25 that can record information such as video data, audio data, and the like around clamp areas 24.

Each information area 25 has lead-out area 26 on its outer periphery side, and lead-in area 27 on its inner periphery side that contacts clamp area 24. The area between lead-out and lead-in areas 26 and 27 is defined as data recording area 28.

FIG. 1 also exemplifies the correspondence between each data recording area 28 of optical disc 10 and a data recording track recorded there.

On each of recording layers 17A and 17B of information areas 25, a recording track is continuously formed in, e.g., a spiral pattern. The continuous track is segmented into a plurality of sectors, which have serial numbers. Various data are recorded on optical disc 10 using these sectors as recording units.

Data recording area 28 serves as an actual data recording area, and records video data (main picture data) such as a movie or the like, sub-picture data such as superimposed dialogs, menus, and the like, and audio data such as words, effect sounds, and the like as recording/playback information in the form of similar pit trains (physical shapes or phase states that bring about change in optical conditions).

When optical disc 10 is a double-sided recording RAM disc in which each surface has one recording layer, each of recording layers 17A and 17B can be formed by three layers, i.e., by sandwiching a phase-change recording material layer (e.g., Ge2Sb2Te5) between two zinc sulfide.silicon oxide (ZnS.SiO2) mixture layers.

When optical disc 10 is a single-sided recording RAM disc in which each surface has one recording layer, recording layer 17A on the side of read-out face 19 can be formed by three layers including the aforementioned phase-change recording material layer. In this case, layer 17B on the side opposite to read-out face 19 need not be an information recording layer but may merely be a dummy layer.

When optical disc 10 is a one-side read type two-layered RAM/ROM disc, two recording layers 17A and 17B can comprise single phase-change recording layer 17B (on the side farther from read-out face 19; read/write), and single semi-transparent metal reflection layer 17A (on the side closer to read-out face 19; read-only).

When optical disc 10 is a write-once DVD-R, a polycarbonate substrate is used, gold can be used as a reflection layer (not shown), and an ultraviolet setting resin can be used as a protection layer (not shown). In this case, an organic dye is used in recording layer 17A or 17B. As the organic dyes, cyanine, squarilium, chroconic, and triphenylmenthane dyes, xanthene and quinone dyes (naphthoquinone, anthraquinone, and the like), metal complex dyes (phthalocyanine, porphyrin, dithiol complex, and the like), and so forth can be used.

Data can be written on such DVD-R disc using a semiconductor laser having a wavelength of 650 nm and an output of around 6 to 12 mW.

In various types of optical discs 10 described above, read-only ROM information is recorded on the recording layer as an embossed pattern signal. By contrast, no such embossed pattern signal is formed on substrate 14 having a read/write (or write-once) recording layer, and a continuous groove is formed instead. A phase-change recording layer is formed on such groove. In case of a read/write DVD-RAM disc, the phase-change recording layer in land portions is also used for information recording in addition to the groove.

When optical disc 10 is of one-side read type (independently of one or two recording layers), substrate 14 on the rear side viewed from read-out face 19 need not always be transparent to the read/write laser beam used. In this case, a label may be printed on the entire surface of substrate 14 on the rear side.

A DVD-RTR recorder/player (to be described later) can be designed to attain repetitive recording/repetitive playback (read/write) for a DVD-RAM disc (or DVD-RW disc), single recording/repetitive playback for a DVD-R disc, and repetitive playback for a DVD-ROM disc.

When disc 10 is a DVD-RAM (or DVD-RW), disc 10 itself is stored in cartridge 11 to protect its delicate disc surface.

When DVD-RAM disc 10 in cartridge 11 is inserted into the disc drive of a DVD-RTR recorder/player (to be described later), disc 10 is pulled out from cartridge 11, is clamped by the turntable of a spindle motor (not shown), and is rotated to face an optical head (not shown).

On the other hand, when disc 10 is a DVD-R or DVD-ROM, disc 10 itself is not stored in cartridge 11, and bare disc 10 is directly set on the disc tray of a disc drive.

Recording layer 17 of information area 25 shown in FIG. 1 is formed with a continuous data recording track in a spiral pattern. The continuous track is segmented into a plurality of logical sectors (minimum recording units) each having a given storage size, as shown in FIG. 1, and data are recorded with reference to these logical sectors. The recording size per logical sector is determined to be 2,048 bytes (or 2 kbytes) which are equal to one pack data length (to be described later).

Data recording area 28 is an actual data recording area, which similarly records management data, main picture (video) data, sub-picture data, and audio data.

Note that data recording area 28 of disc 10 can be segmented into a plurality of ring-shaped (annular) recording areas (a plurality of recording zones), although not shown. The disc rotational velocity varies in units of recording zones. However, within each zone, a constant linear or angular velocity can be set. In this case, an auxiliary recording area (free space) can be provided for each zone. These free spaces in units of zones may collectively form a reserve area for that disc 10.

Figure 2:
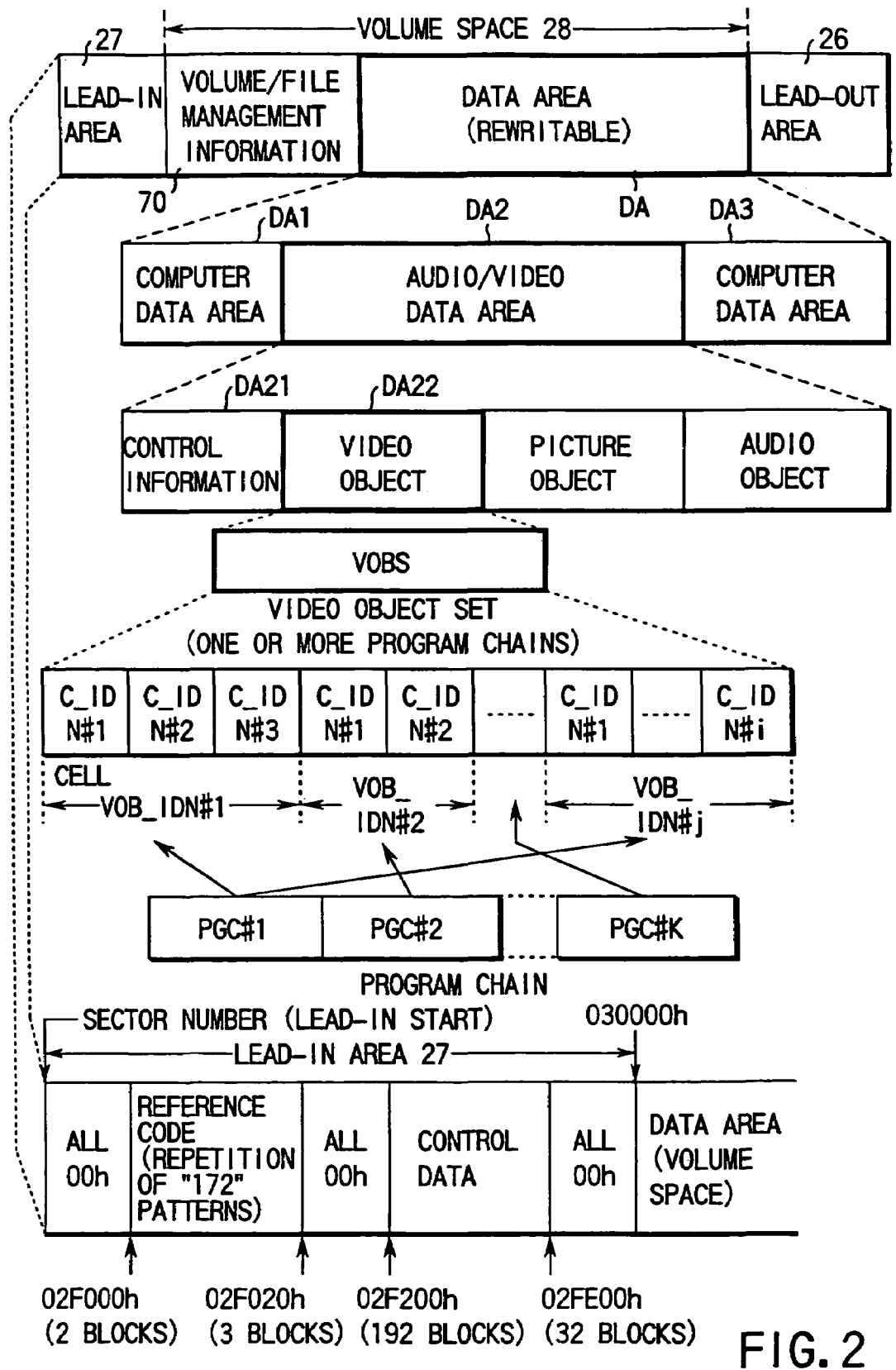
FIG. 2 is a view for explaining the format of digital information recorded on the optical disc shown in FIG. 1.

FIG. 2 is a view for explaining the hierarchical structure of information recorded on optical-disc 10 shown in FIG. 1.

In this structure, lead-in-area 27 includes an embossed data zone whose light reflection surface has an embossed pattern, a mirror zone whose surface is flat (mirror surface), and a rewritable data zone capable of information rewrites. Lead-out area 26 is also made up of a rewritable data zone capable of information rewrites.

Data recording area (volume space) 28 is comprised of volume/file management information 70 and data area DA, which can be rewritten by the user.

Volume/file management information 70 records file information of audio/video data recorded on data area DA, and information that pertains to the entire volume.

Data area DA can have both areas DA1 and DA3 that record computer data, and audio/video data area DA2 that records video data/audio data and the like. Note that the recording order, recording information size, and the like of computer data and audio/video data are arbitrary. Data area DA can record computer data or audio/video data alone.

Audio/video data area DA2 includes control information DA21, video object DA22, picture object DA23, and audio object DA24.

Control information DA21 can include control information required upon executing various processes such as recording (image recording and/or audio recording), playback, edit, search, and the like.

Video object DA22 can include information of the contents of recorded video data.

Picture object DA23 can include still image information such as still images, slide images, and the like.

Audio object DA24 can include information of the contents of recorded audio data.

Note that video object DA22 is formed by video object set VOBS. This VOBS has contents corresponding to one or more program chains PGC#1 to PGC#k which respectively designate cell playback orders by different methods.

The embossed data zone of lead-in area 27 records in advance:

(1) information which pertains to the entire information storage medium: the disc type (a DVD-ROM, DVD-RAM (or DVD-RW), DVD-R, or the like); disc size (12 cm, 8 cm, or the like); recording density; physical sector numbers indicating the recording start/end positions, and the like;

(2) information which pertains to the recording/playback/erasure characteristics: the recording power and recording pulse width; erase power; playback power; linear velocity upon recording and erasure, and the like; and (3) information which pertains to the manufacture of each information storage medium: the manufacturing number and the like.

The rewritable zone of each of lead-in area 27 and lead-out area 26 includes:

(4) a field for recording a unique disc name of each information recording medium;

(5) a test recording field (for confirming recording/erasure conditions); and (6) a field for recording management information that pertains to defective fields in data area DA.

On fields (4) to (6), a DVD-RTR recorder/player (a RTR video recorder or a personal computer with a DVD-RAM drive) can record information.

When disc 10 is set in the DVD-RTR recorder/player (RTR video recorder), information on lead-in area 27 is read first. Lead-in area 27 records a predetermined reference code and control data in ascending order of sector numbers.

The reference code in lead-in area 27 is made up of two error correction code blocks (ECC blocks). Each ECC block consists of 16 sectors. These two ECC blocks (32 sectors) are generated by appending scramble data. Upon playing back the reference code appended with the scramble data, filter operation or the like on the playback side is done to play back a specific data symbol (e.g., 172), thus assuring data read precision after that.

The control data in lead-in area 27 is made up of 192 ECC blocks. This control data field repetitively records the contents for 16 sectors in each block 192 times.

This control data made up of 16 sectors contains physical format information in the first sector (2,048 bytes), and disc manufacturing information and contents provider information in the subsequent sectors.

The physical format information contained in the control data includes the following contents.

That is, the first position describes the version, of the DVD format that the recorded information complies with.

The second position describes the size (12 cm, 8 cm, or the like) of a recording medium (optical disc 10) and minimum read-out rate. In case of a read-only DVD video, 2.52. Mbps, 5.04 Mbps, and 10.08 Mbps are prescribed minimum read-out rates, but other minimum read-out rates are reserved. For example, when an RTR video recorder capable of variable bit rate recording records at an average bit rate of 2 Mbps, the minimum read-out rate can be set to fall within the range from 1.5 to 1.8 Mbps using the reserve field.

The third position describes the disc structure (the number of recording layers, track pitch, recording layer type, and the like) of the recording medium (optical disc 10). Based on this recording layer type, disc 10 can be identified to be a DVD-ROM, DVD-R, or DVD-RAM (or DVD-RW).

The fourth position describes the recording density (linear density and track density) of the recording medium (optical disc 10). The linear density indicates the recording length per bit (0.267 μm/bit, 0.293 μm/bit, or the like). On the other hand, the track density indicates the neighboring track spacing (0.74 μm/track, 0.80 μm/track, or the like). The fourth position also includes a reserve field to designate other numerical values as the linear density and track density of a DVD-RAM or DVD-R.

The fifth position describes the start and end sector numbers and the like of data area (volume space) 28 of the recording medium (optical disc 10).

The sixth position describes a burst cutting area (BCA) descriptor. This BCA is applied as an option to a DVD-ROM disc alone, and is an area for storing recorded information upon completion of the disc manufacturing process.

The seventh position describes a free space size of the recording medium (optical disc 10). For example, when disc 10 is a single-sided single-layered recording DVD-RAM disc, information indicating 2.6 GB (or the number of sectors corresponding to this number of bytes) is stored at that position of disc 10. On the other hand, when disc 10 is a double-sided recording DVD-RAM disc, information indicating 5.2 GB (or the number of sectors corresponding to this number of bytes) is stored at that position.

Other positions are reserved for future use.

Figures 3, 4:
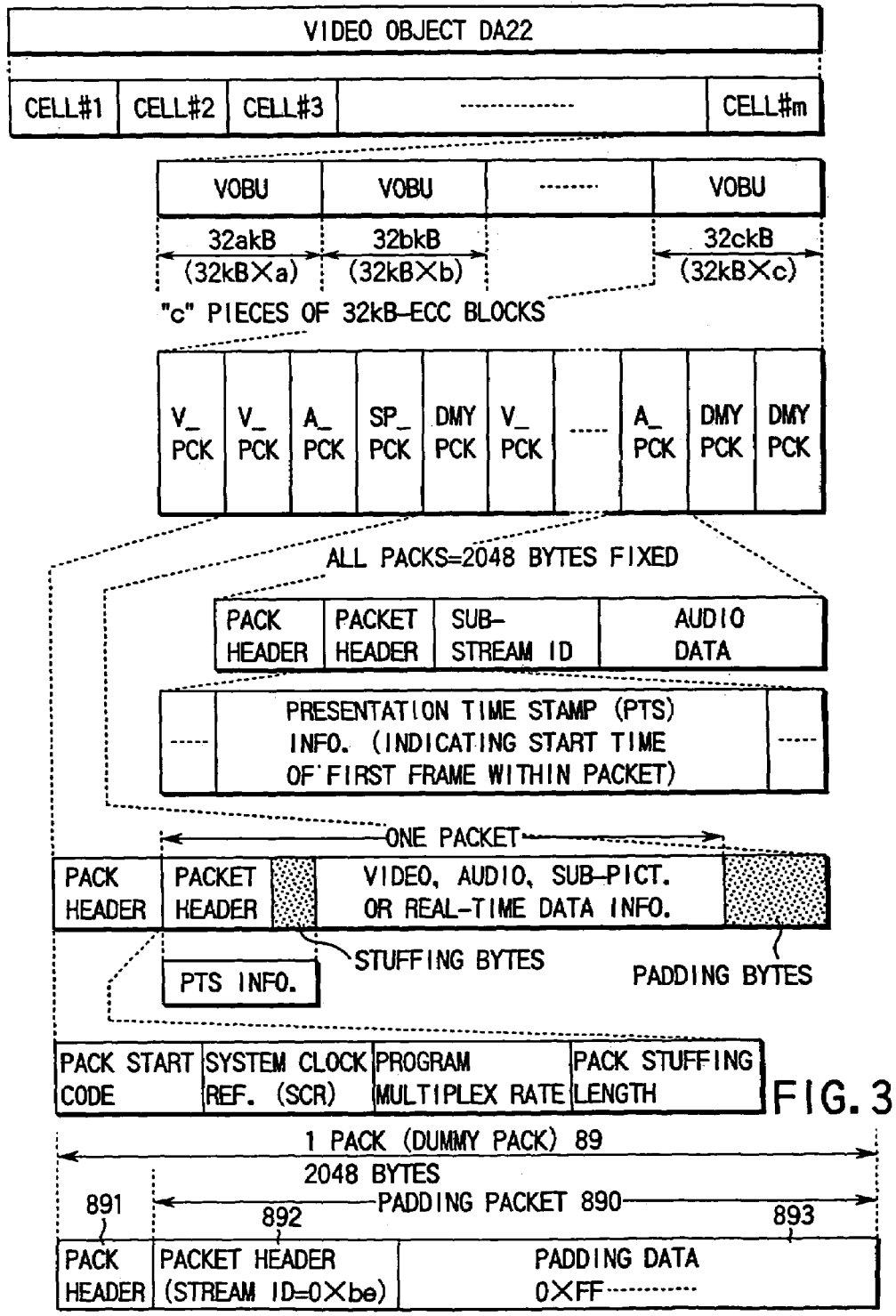
FIG. 3 is a view for explaining the data structure of a video object shown in FIG. 2.
FIG. 4 is a view for explaining the data structure of a dummy pack shown in FIG. 3.

FIG. 3 is a view for explaining the data structure of the video object shown in FIG. 2.

As shown in FIG. 3, each cell (for example, cell #m) consists of one or more video object units (VOBUs). Each VOBU is constituted as a set (pack sequence) of video packs, sub-picture packs, audio packs, dummy packs, and the like.

Each of these packs has a predetermined size (2,048 bytes) and serves as a minimum unit for data transfer. The minimum unit for logical processing is a cell, and logical processing is done is units of cells.

The playback or presentation time of the VOBU corresponds to that of video data made up of one or more picture groups (groups of pictures; to be abbreviated as GOPS) included in the VOBU, and is set to fall within the range from 0.4 sec to 1.2 sec. One GOP is screen data which normally has a presentation time of about 0.5 sec in the MPEG format, and is compressed to play back approximately 15 frame images during this interval. (The VOBU includes an integer number of GOPs except for a special case wherein a gap is produced in the video data flow. That is, the VOBU is normally a video information compression unit synchronous with GOPS.)

When the VOBU includes video data, a video datastream is formed by arranging GOPs (complying with MPEG) each consisting of video packs, sub-picture packs, audio packs, and the like. However, independently of the number of GOPs, the VOBU is defined with reference to the presentation time of GOPs.

Note that even playback data consisting of audio data and/or sub-picture data alone is formed using the VOBU as one unit. For example, when the VOBU is formed by audio packs alone, audio packs to be played back in the presentation time of the VOBU to which the audio data belong are stored in that VOBU as in the video object of video data.

The packs that form each VOBU have similar data structures except for a dummy pack. An audio pack will be taken as an example. As shown in FIG. 3, a pack header is allocated at the beginning of the pack, a packet header and sub-stream ID follow, and audio data is allocated at the end of the pack. In such pack format, the packet header is written with information of presentation time stamp PTS indicating the start time of the first frame in the packet.

Likewise, a pack that stores real-time recording data can be made up of a pack header, a packet header that can contain PTS information and stuffing bytes as needed, and a data area that stores video, audio, sub-picture, or real-time recording data. At the end of this data area, padding bytes can be appended as needed.

The pack header can contain data such as a pack start code, system clock reference (SCR), program multiplex rate, pack stuffing length, and the like.

In a DVD-RTR recorder/player that can record a video program that contains video object DA22 with the structure shown in FIG. 3 on optical disc 10, the user often wants to edit the recording contents after recording. In order to meet such requirement, dummy packs can be appropriately inserted in each VOBU. Each dummy pack can be used to record edit data later.

The dummy pack shown in FIG. 3 has a data structure shown in FIG. 4. More specifically, one dummy pack 89 is comprised of pack header 891, packet header 892 having a predetermined stream ID, and padding data 893 padded with a predetermined code (insignificant data). Note that packet header 892 and padding data 893 form padding packet 890. The contents of padding data 893 in a non-used dummy pack are not especially significant.

This dummy pack 89 can be used as needed when the recording contents are to be edited after predetermined image recording is done on disc 10 shown in FIG. 1, and in other cases.

More specifically, the dummy pack is inserted into each VOBU for the purposes of:

addition of information to be additionally recorded after image recording (for example, memo information indicating that after-recording information is inserted into an audio pack and replaced by a dummy pack is inserted as sub-picture information into a sub-picture pack and is replaced by a dummy pack);

compensation of a short size from an integer multiple of 32 kbytes to match the VOBU size with an integer multiple of the ECC block size (32 kbytes); and so forth.

Also, the dummy pack can be used to store reduced-scale image (thumbnail picture) data which is displayed on a user menu, as needed.

Figure 5:
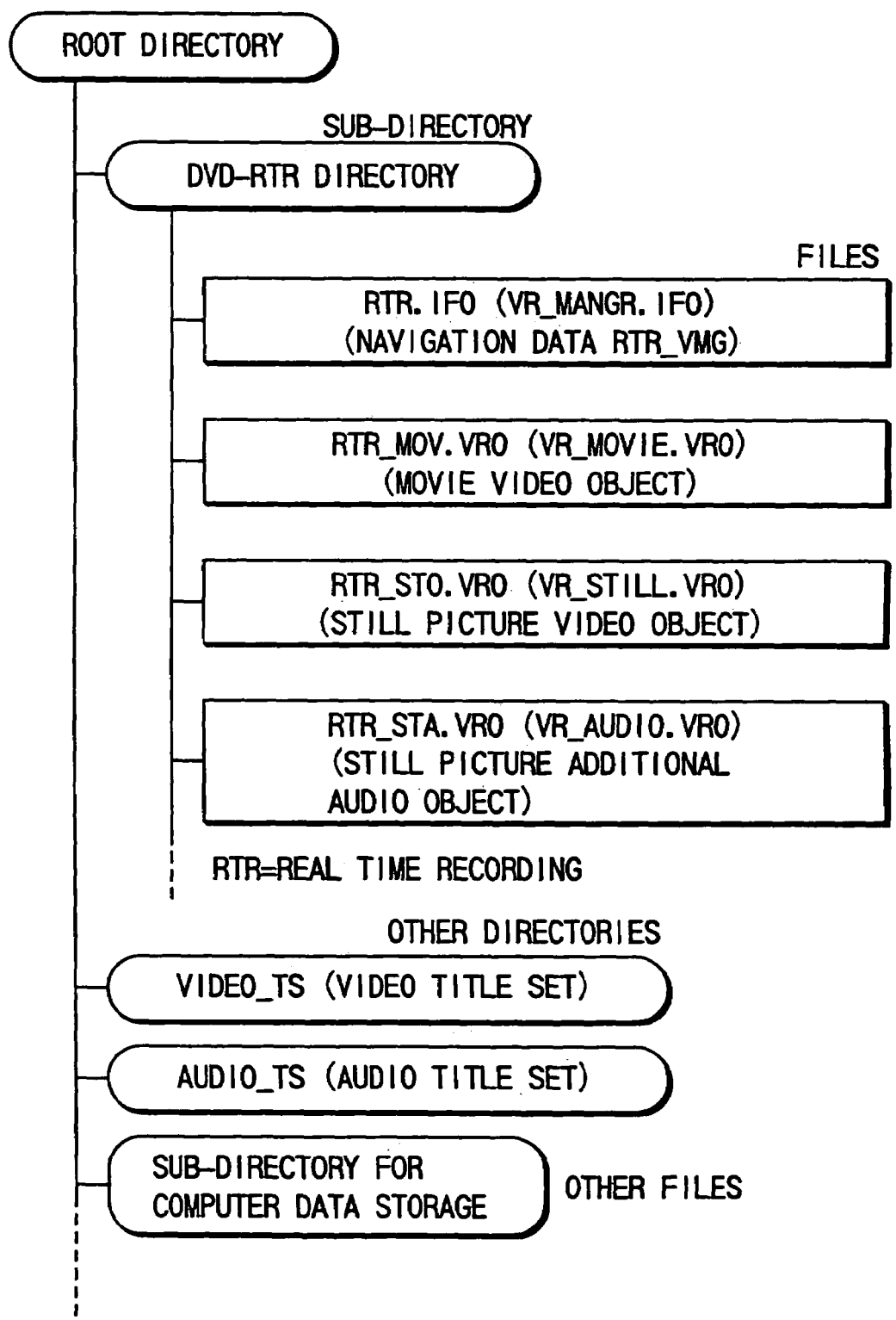
FIG. 5 is a view for explaining the file structure of digital information recorded on the optical disc shown in FIG. 1.

FIG. 5 is a view for explaining an example of the directory structure of information (data files) recorded on the optical disc shown in FIG. 1 to have the data structure shown in FIG. 2.

According to the DVD-RTR specification capable of digital real-time recording/playback of a video picture, the contents of a DVD disc are managed using the directory structure shown in FIG. 5, and are saved in accordance with a file system such as ISO9660, UDF, or the like.

Even when the data structure shown in FIG. 2 is used on the disc/apparatus side, this data structure is invisible to the user. The data structure that the user can actually see is a hierarchical file structure shown in FIG. 5.

More specifically, directories such as a DVD_RTR directory, VIDEO_TS directory, AUDIO_TS directory, computer data file directory, and the like are displayed on the display screen (not shown) of the root directory by means of menu windows, icons, or the like in correspondence with the types of data recorded on data area DA shown in FIG. 2.

The DVD_RTR directory shown in FIG. 5 stores file RTR.IFO of navigation data RTR_VMG, file RTR_MOV. VRO/VR_MOVIE.VRO of movie video object RTR_MOV. VOB, file RTR_STO.VRO/VR_STILL.VRO of still picture video object RTR_STO.VOB file RTR_STA.VRO/VR_AUDIO.VRO of still picture additional audio object RTR_STA.VOB for still pictures, and the like.

Note that file RTR.IFO stores management information such as a program set, program, entry point, play list, and the like for managing moving picture information.

File RTR_MOV.VRO/VR_MOVIE.VRO stores recorded moving picture information and its audio information, file RTR_STO.VRO/VR_STILL.VRO stores recorded still picture information and its audio information, and file RTR_STA.VRO/VR_AUDIO.VRO stores after-recording data for a still picture, and the like.

When a DVD-RTR recorder/player (RTR video recorder) has a function of displaying the directories shown in FIG. 5 and also has a playback function of a DVD video disc (ROM disc), and the DVD video disc is set in its disc drive, the VIDEO_TS directory shown in FIG. 5 is activated. In this case, when the VIDEO_TS directory is opened, the recorded contents of the set disc are further displayed.

When the DVD-RTR recorder/player has a DVD audio playback function and a DVD audio disc is set in its disc drive, the AUDIO_TS directory shown in FIG. 5 is activated. In this case, when the AUDIO_TS directory is opened, the recorded contents of the set disc are further displayed.

Furthermore, when the DVD-RTR recorder/player comprises a personal computer with a DVD-RAM drive and has a computer data processing function, and a DVD-RAM (or DVD-ROM) disc that has recorded computer data is set in that disc drive, the computer data directory shown in FIG. 5 is activated. In this case, when the computer data directory is opened, the recorded contents of the set disc are further displayed.

The user can access the recorded sources of DVD video, DVD video ROM, DVD audio, and computer data (including computer programs) as if he or she were operating a personal computer, while observing a menu screen or window display screen displayed with the directory structure shown in FIG. 5.

Figure 6:
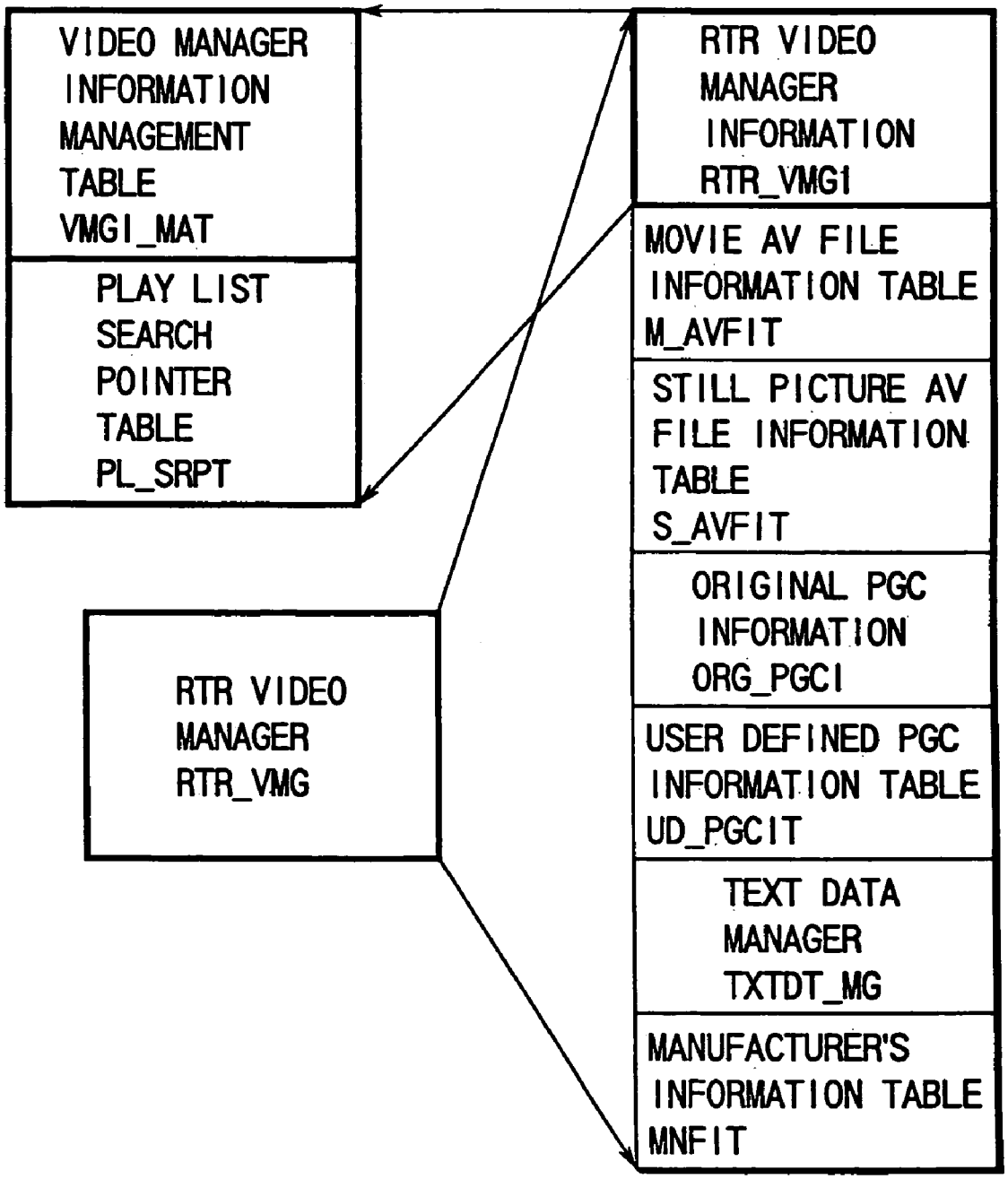
FIG. 6 is a view for explaining the data structure of a navigation data file (RTR_VMG) shown in FIG. 5.

FIG. 6 is a view for explaining the data structure of the navigation data file (RTR_VMG) shown in FIG. 5. RTR video manager RTR_VMG as navigation data is comprised of various kinds of information, as shown in FIG. 6.

Referring to FIG. 6, RTR video manager information RTR_VMGI describes basic information of recordable/reproducible optical disc (RTR disc) 10 shown in FIG. 1. This RTR_VMGI contains video manager information management table VMGI_MAT and play list search pointer table PL_SRPT.

RTR_VMGI further contains movie AV file information table M_AVFIT, still picture AV file information table S_AVFIT, original PGC information ORG_PGCI, user defined PGC information table UD_PGCIT, text data manager TXTDT_MG, and manufacturer's information table MNFIT.

FIG. 7 shows the contents of the video manager information management table (VMGI_MAT) shown in FIG. 6.

Referring to FIG. 7, VMG identifier VMG_ID describes "DVD_RTR_VMG0" that specifies an RTR_VMG file using an ISO646 character set code.

RTR_VMG_EA describes the end address of RTR_VMG by a relative byte number from the first byte of RTR_VMG.

VMGI_EA describes the end address of RTR_VMGI by a relative byte number from the first byte of RTR_VMG.

VERN describes the version number of the DVD specification for video recording (real-time video recording).

TM_ZONE describes the time zone of the RTR disc. In the DVD_RTR specification, five different data fields (PL_CREATE_TM, VOB_REC_TM, FIRST_VOB_REC_TM, LAST_VOB_REC_TM, and VOBU_REC_TM) are specified. These five different data fields are generally called REC_TM. REC_TM contains data TZ_TY and TZ_OFFSET. TZ_TY describes a common universal time or local time, and TZ_OFFSET describes a date offset from the common universal time in units of minutes.

STILL_TM describes the still time of a still picture in units of seconds.

CHRS describes a character set code used in primary text information. With this CHRS, for example, an ISO8859-1 character set code or shift JIS kanji code can be designated.

RSM_MRKI describes program chain number PGCN, program number PGN, cell number CN, marker point MRK_PT, and marker creation time MRK_TM. PGCN in this information indicates the number of the program chain where a marker point is present. When a marker is present in an original PGC, PGCN is set at "0". PGN indicates the number of the program where the marker point is present. When a resume marker is present in a user defined PGC, PGN is set at "0". CN indicates the number of a cell where the marker point is present. MRK_PT indicates a marker point in a target cell. When the resume marker is present in a movie cell, MRK_PT describes a presentation time (PTM) using an RTR presentation time description format. MRK_TM describes the time of creation of the marker using an RTR date description format.

REP_PICTI describes program chain number PGCN, program number PGN, cell number CN, picture point PICT_PT, and representative picture creation time CREAT_TM of the disc.

PGCN in this information indicates the number of the program chain where a representative picture of the disc is present. The representative picture of the disc is designated by only the pointer in an original PGC. Hence, when this representative picture pointer is present, PGCN is set at "0". PGN indicates the number of the program where the representative picture of the disc is present. When a resume marker is present in a user defined PGC, PGN is set at "0". CN indicates the number of a cell where the representative picture of the disc is present. PICT_PT indicates the representative picture of the disc in the target cell. When the representative picture is present in a movie cell, PICT_PT describes the presentation time (PTM) using the RTR presentation time description format. When this representative picture is present in a still picture cell, PICT_PT describes a still picture VOB entry number (S_VOB_ENTN) in a corresponding still picture VOB group (S_VOG). CREAT_TM describes the time of creation of the representative picture of the disc using the RTR date description format.

M_AVFIT_SA describes the start address of movie AV file information table M_AVFIT shown in FIG. 6 by a relative byte number from the first byte of RTR_VMG.

S_AVFIT_SA describes the start address of still picture AV file information table S_AVFIT shown in FIG. 6 by a relative byte number from the first byte of RTR_VMG.

ORG_PGCI_SA describes the start address of original PGC information ORG_PGCI shown in FIG. 6 by a relative byte number from the first byte of RTR_VMG.

UD_PGCIT_SA describes the start address of user defined PGC information table UD_PGCIT shown in FIG. 6 by a relative byte number from the first byte of RTR_VMG. If UD_PGCIT is not available, UD_PGCIT_SA is set at "0000 0000h".

TXTDT_MG_SA describes the start address of text data manager TXTDT_MG shown in FIG. 6 by a relative byte number from the first byte of RTR_VMG. If TXTDT_MG is not available, TXTDT_MG_SA is set at "0000 0000h".

MNFIT_SA describes the start address of manufacturer's information table MNFIT shown in FIG. 6 by a relative byte number from the first byte of RTR_VMG. If MNFIT is not available, MNFIT_SA is set at "0000 0000h".

Figures 8, 9:
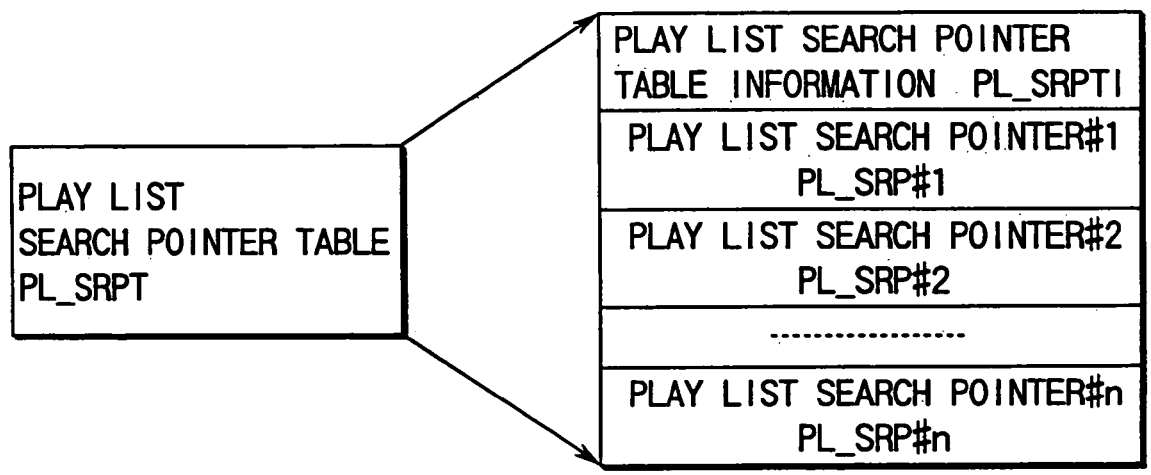
FIG. 8 is a view for explaining the data structure of a play list search pointer table (PL_SRPT) shown in FIG. 6.
FIG. 9 is a view for explaining the contents of play list search pointer table information (PL_SRPTI) shown in FIG. 8.

FIG. 8 shows the data structure of play list search pointer table PL_SRPT shown in FIG. 6.

PL_SRPT describes information required for searching and accessing play lists in an RTR disc, and contains play list search pointer table information PL_SRPTI and one or more play list search pointers PL_SRP#1 to PL_SRP#n.

Each play list is made up of a user defined PGC, and each PL_SRP has a PGC number corresponding to that play list.

Each play list is specified by play list number. PLN assigned thereto. PLNs are assigned to all pointers PL_SRP, and have serial numbers from 1 to 99 (maximum) in the order of one or more pointers PL_SRP described in PL_SRPT.

The user can identify a specific play list from other ones using PLN. Or the user can identify a specific play list from other ones using text information appended to the play list.

FIG. 9 shows the contents of play list search pointer table information PL_SRPTI shown in FIG. 8.

PL_SRP_Ns indicates the number of play list search pointers PL_SRP in PL_SRPT.

PL_SRPT_EA indicates the end address of play list search pointer table PL_SRPT, which is described by a relative byte number from the first byte of PL_SRPT.

FIG. 10 shows the contents of play list search pointer PL_SRP shown in FIG. 8.

Referring to FIG. 10, PL_TY describes the play list type. That is, one of movie, still picture, or hybrid (both movie and still picture) play lists can be specified by the contents (4-byte PL_TY1) of PL_TY.

PGCN describes the number of corresponding user defined program chain UD_PGC. The maximum value of this PGCN is 99.

PL_CREATE_TM describes the time of creation of the play list using the RTR date description format. This PL_CREATE_TM can describe year, month, day, hour, minute, and second.

PRM_TXTI describes primary text information of the play list. This PRM_TXTI consists of 128 bytes, the first 64 bytes of which are used to describe primary text information using ASCII character sets, and the remaining 64 bytes of which are used to describe primary text information using other character sets (shift JIS, ISO8859-15, and the like). Other character set codes are described in VMGI_MAT, and can be used by all pieces of primary text information in the disc. Note that a terminal control code is not described in PRM_TXTI.

IT_TXT_SRPN describes the number of IT_TXT_SRP of the play list. (Item text IT_TXT will be described later with reference to FIG. 18.)

THM_PTRI describes information of thumbnail pointer THM_PTR. Thumbnail pointer information THM_PTRI may be optionally set or used in either an RTR recorder and player. If the RTR recorder does not have performance capable of processing THM_PTRI, all pieces of 8-byte THM_PTRI can be set at "tFFh". If the RTR player does not have performance capable of processing THM_PTRI, it may simply ignore THM_PTRI.

Note that a "thumbnail" means a picture as small as the nail of the thumb, and normally indicates a picture which is obtained by reducing a still picture in a recorded video picture to the thumbnail size.

FIG. 11 shows the contents of thumbnail pointer information THM_PTRI shown in FIG. 10. Referring to FIG. 11, CN describes the number of a cell where the thumbnail point is present. Also, THM_PT describes the thumbnail point in a target cell.

When the resume marker is present in a movie cell, THM_PT describes the presentation time (PTM) using the RTR presentation time description format.

When a thumbnail is present in a still picture cell, THM_PT describes a still picture VOB entry number (S_VOB_ENTN) in a corresponding still picture VOB group (S_VOG).

Figure 12:
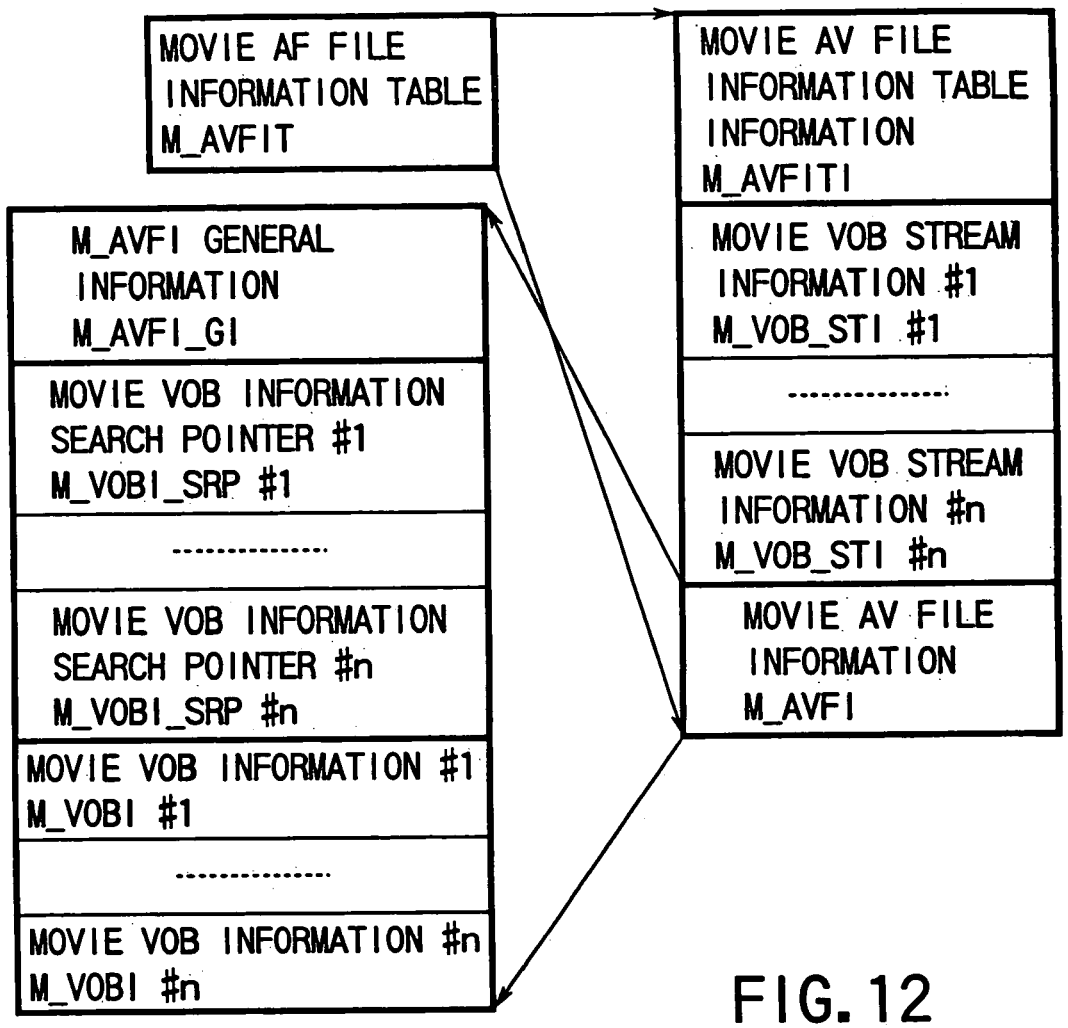
FIG. 12 is a view for explaining the data structure of a movie AV file information table (M_AVFIT) shown in FIG. 6.

FIG. 12 shows the data structure of the movie AV file information table (M_AVFIT) shown in FIG. 6.

M_AVFIT describes information of a movie AV file (file RTR_MOV.VRO/VR_MOVIE.VRO shown in FIG. 5), and contains movie AV file information table information M_AVFITI, one or more pieces of movie VOB stream information M_VOB_STI#1 to M_VOB_STI#n, and movie AV file information M_AVFI.

M_AVFI is information of a movie AV file having a predetermined file name (RTR_MOV.VRO/VR_MOVIE.VRO), and contains movie AV file information general information M_AVFI_GI, one or more movie VOB information search pointers M_VOBI_SRP#1 to M_VOBI_SRP#n, and one or more pieces of movie VOB information M_VOBI#1 to M_VOBI#n.

One movie AV file can contain one or more VOBS, and each VOB has movie VOB information M_VOBI for VOB in M_AVFI. One or more pieces of information M_VOBI in M_AVFI are described in the same order as that of VOB data stored in the movie AV file.

Figure 13:
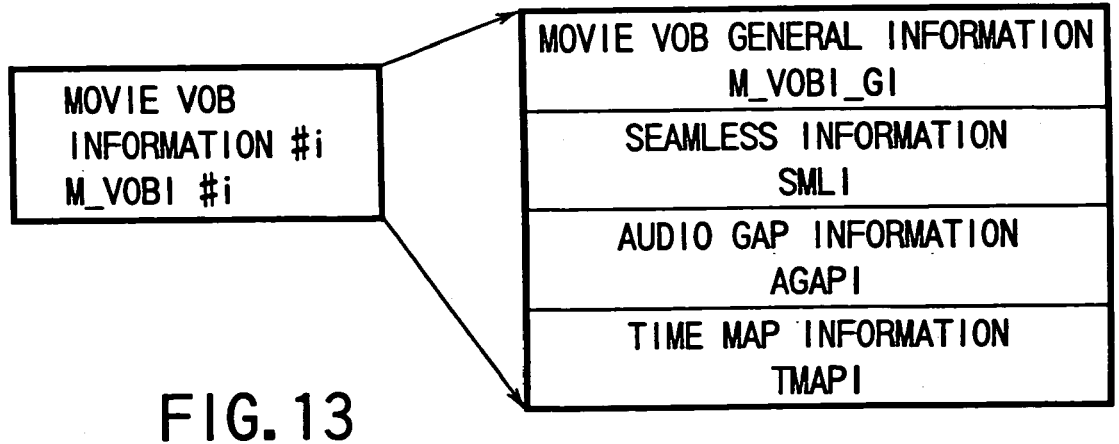
FIG. 13 is a view for explaining the data structure of movie VOB information (M_VOBI) shown in FIG. 12.

FIG. 13 shows the data structure of the movie VOB information M_VOBI shown in FIG. 12. As shown in FIG. 13, M_VOBI contains movie VOB general information M_VOBI_GI, seamless information SMLI, audio gap information AGAPI, and time map information TMAPI.

M_VOBI_GI shown in FIG. 13 contains VOB_TY which describes the type of VOB, VOB_REC_TM which describes the recording time of the start field in VOB using the RTR date description format, VOB_REC_TM_SUB which describes the recording time (sub-second information) of the start field in VOB by the number of video fields, M_VOB_STIN which describes the number of movie VOB stream information, VOB_V_S_PTM which describes the presentation start time of the first video field in VOB using the RTR presentation time description format, and VOB_V_E_PTM which describes the presentation end time of the last video field in the VOB using the RTR presentation time description format.

VOB_TY includes TE which indicates if that VOB has been temporarily erased, A0_STATUS which indicates the status of audio stream #0, A1_STATUS which indicates the status of audio stream #1, analog protection system APS which indicates the format of analog copy protection or the ON/OFF state of this copy protection, SML_FLG which indicates if VOB is to be-played back seamlessly, A0_GAP_LOC which indicates if an audio gap is present in audio stream #0 and the location of the audio gap if it is present, and A1_GAP_LOC which indicates if an audio gap is present in audio stream #1 and the location of the audio gap if it is present.

VOB_REC_TM is updated to indicate the recording time of the start field of the remaining VOB if the start field of a given VOB is deleted (erased).

More specifically, "new VOB_REC_TM=old VOB_REC_TM+presentation duration of deleted field".

On the other hand, if the presentation duration of the deleted field cannot be displayed in units of seconds (for example, when the presentation duration of the deleted field is 60.5 sec), "new VOB_REC_TM+new VOB_REC_TM_SUB=old VOB_REC_TM+old VOB_REC_TM_SUB+presentation duration of deleted field".

Since VOB_REC_TM describes the date of video recording, even when audio data has been modified, such modification has no influence on VOB_REC_TM.

The aforementioned RTR date description format will be briefly explained below. In this format, presentation time PTM is expressed by a PTM base and PTM extension. The PTM base is a value measured using 90 kHz as a unit, and the PTM extension is a value measured using 27 MHZ as a unit.

SMLI shown in FIG. 13 contains VOB_FIRST_SCR which describes SCR (system clock reference) of the first pack of current VOB using the RTR presentation time description format, and PREV_VOB_LAST_SCR which describes SCR of the last pack in previous VOB using the RTR presentation time description format.

Figure 14:
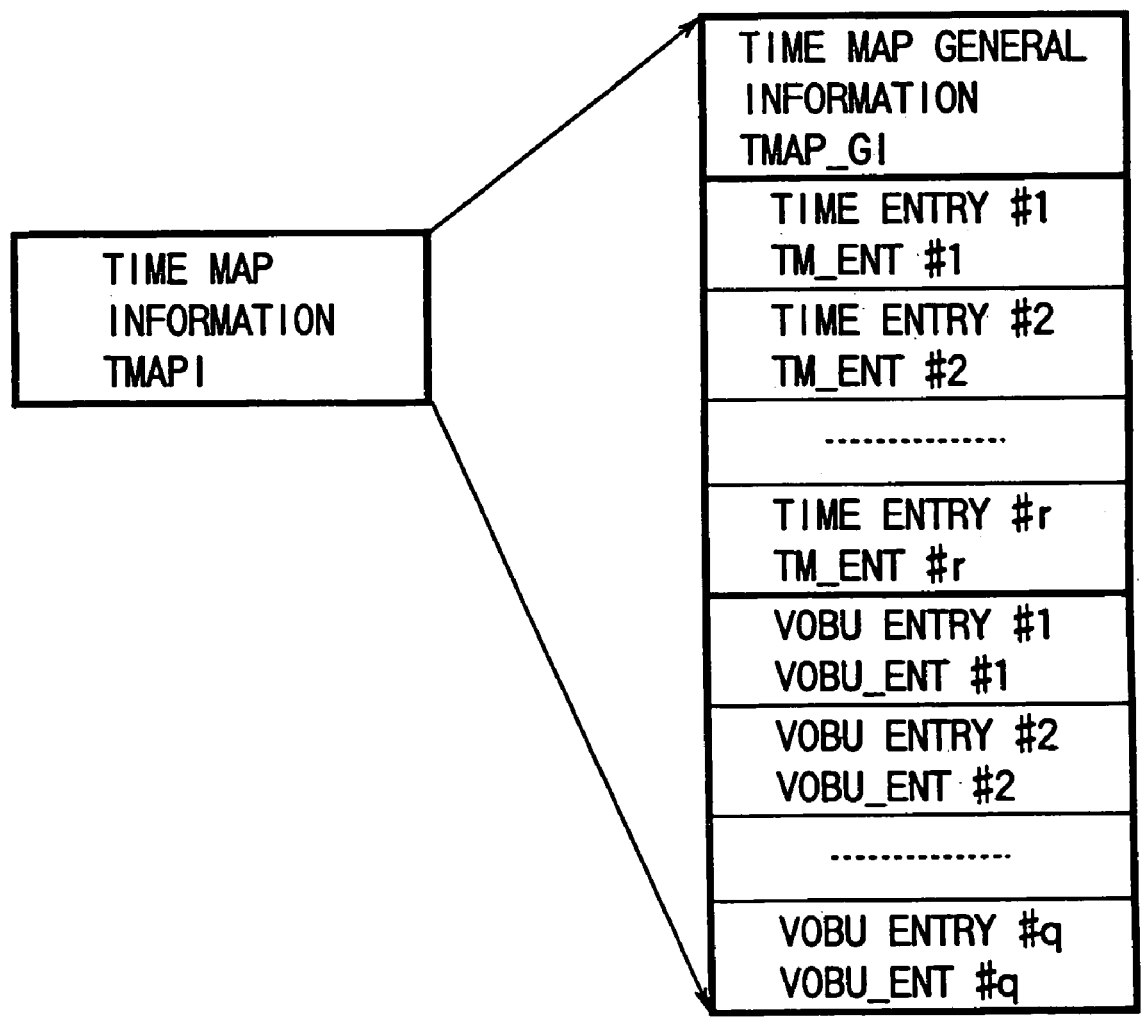
FIG. 14 is a view for explaining the data structure of time map information (TMAPI) shown in FIG. 13.

FIG. 14 shows the data structure of the time map information TMAPI shown in FIG. 13. Time map information TMAPI is used upon executing special playback (e.g., cell playback in an order unique to each user using a user defined PGC) and time search.

Time map information TMAPI includes time map general information TMAP_GI, one or more time entries TM_ENT#1 to TM_ENT#r, and one or more VOBU entries VOBU_ENT#1 to VOBU_ENT#q.

Each VOBU entry contains information of the size and presentation time of VOBU. The VOBU size is presented in units of sectors (2 kbytes), and the presentation time is presented in units of video fields (one field=1/60 sec in NTSC; one field=1/50 sec in PAL).

Since the VOBU size is presented in units of sectors, as described above, VOBU can be accessed using addresses in units of sectors.

Each VOBU entry includes reference picture size information 1STREF_SZ, VOBU playback time information VOBU_PB_TM, and VOBU size information VOBU_SZ.

Note that VOBU_PB_TM represents the playback time of VOBU of interest in units of video fields. On the other hand, reference picture size information 1STREF_SZ represents the size of the first reference picture (corresponding to I-picture in MPEG) of VOBU of interest in units of sectors.

On the other hand, each time entry contains address information (VOBU_ADR) of the corresponding VOBU, and time difference information (TM_DIFF). This time difference information indicates the difference between the playback time designated by the time entry and the VOBU presentation start time.

Assuming that the time interval (time unit TMU) between two successive time entries is 10 sec, this time entry interval corresponds to 600 fields in, e.g., NTSC video.

Normally, the "time interval between neighboring VOBUs" is expressed by the number of fields in the VOBU entry. As another method, a "count value from a given VOBU to the next VOBU by a clock counter" may be used to express the "time interval between neighboring VOBUs".

For example, the "time interval between neighboring VOBUs" can be expressed by the "difference value between the value of presentation time stamp at the start position of one VOBU and the value of PTS at the start position of the immediately succeeding VOBU".

In other words, "the time interval in a specific unit can be expressed by the difference value of the clock counter in that unit".

FIG. 15 shows the contents of time map general information TMAP_GI shown in FIG. 14.

This time map general information TMAP_GI includes TM_ENT_Ns indicating the number of time entries in that time map information, VOBU_ENT_Ns indicating the number of VOBU entries in that time map information, time offset TM_OSF for that time map information, and address offset ADR_OFS of that time map information.

When a value (10 sec or equivalent) corresponding to 600 fields in NTSC video (or 500 fields in PAL video) is used as time unit TMU, time offset TM_OSF is used to represent the time offset within TMU.

When the VOBU size is expressed by the number of sectors, address offset ADR_OFS is used to indicate a file pointer from the beginning of an AV file.

FIG. 16 shows the contents of time entry TM_ENT shown in FIG. 14.

This time entry TM_ENT includes VOBU_ENTN indicating the number of the corresponding VOBU entry, TM_DIFF indicating the time difference between the presentation start time of VOBU designated by the time entry, and the calculated presentation time, and. VOBU_ADR indicating the target VOBU address.

When time unit TMU is expressed by 600 fields in NTSC (or when time unit TMU is expressed by 500 fields in PAL), the "calculated presentation time" with respect to time entry #j is given by TMU (j−1)+TM_OSF.

On the other hand, VOBU_ADR indicates the target VOBU address by the total size of VOBUs preceding VOBU of interest when the VOBU size is expressed in units of sectors.

In the aforementioned data structure, in order to start presentation from the middle of a certain VOBU, that access point must be determined. This access point is assumed to be a time entry point.

This time entry point is located at a position separated from the position indicated by movie address information of VOBU by the time difference indicated by time difference information TM_DIFF in time entry TM_ENT. This time entry point serves as a special presentation start point (or time search point) indicated by time map information TMAPI.

Figure 17:
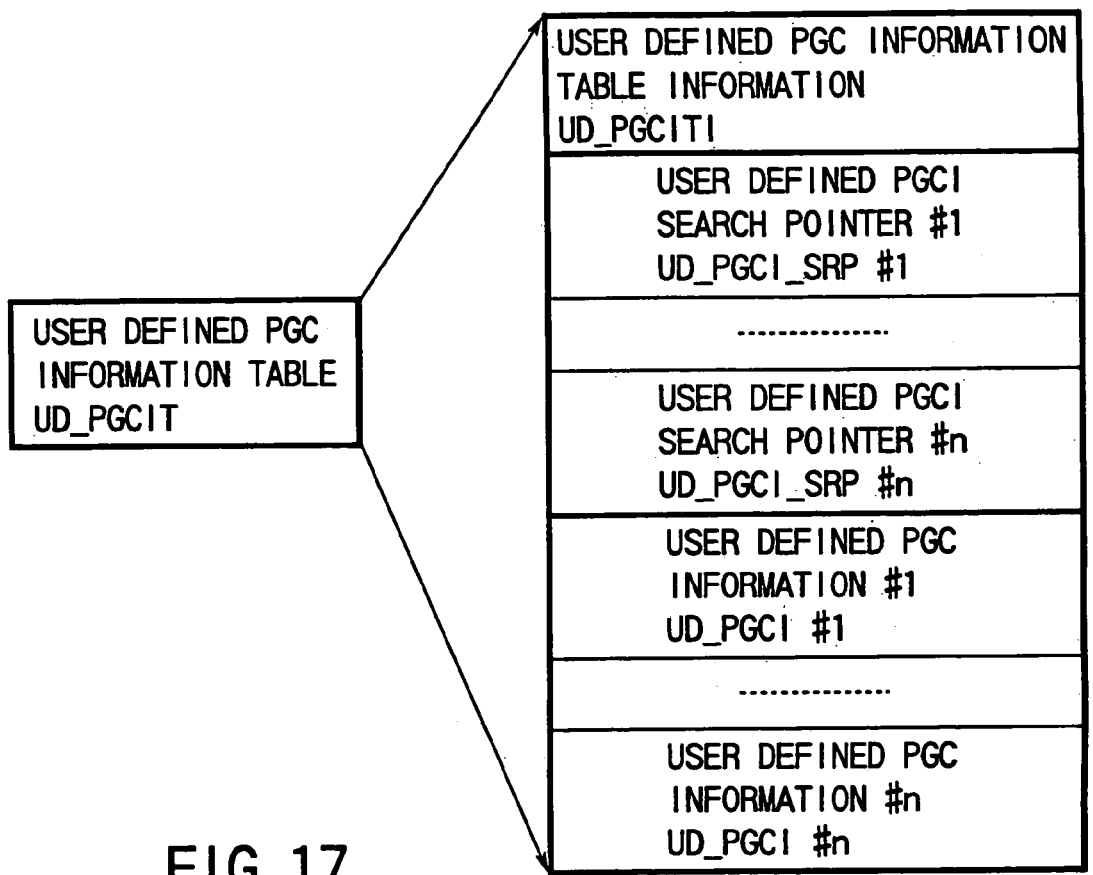
FIG. 17 is a view for explaining the data structure of a user defined PGC information table (UD_PGCIT) shown in FIG. 6.

FIG. 17 shows the data structure of user defined PGC information table UD_PGCIT shown in FIG. 6.

UD_PGCIT includes user defined PGC information table information UD_PGCITI, one or more user defined PGCI search pointers UD_PGCI_SRP#L to UD_PGCI_SRP#n, and one or more pieces of user defined PGC information UD_PGCI#1 to UD_PGCI#n.

All UD_PGCs are assigned program chain numbers PGCN ranging from 1 to 99 in the description order of UD_PGCI_SRP in UD_PGCIT. This PGCN can specify each PGC.

UD_PGCITI contains UD_PGCI_SRP_Ns indicating the number of UD_PGCI_SRPs, and UD_PGCIT_EA indicating the end address of UD_PGCIT.

Note that the maximum value of UD_PGCI_SRP_Ns is set at, e.g., "99". UD_PGCIT_EA represents the end address of UD_PGCIT by a relative byte number from the first byte of UD_PGCIT.

UD_PGCI_SRP includes start address UD_PGCI_SA of UD_PGCI. This UD_PGCI_SA represents the start address of UD_PGCI by a relative byte number from the first byte of UD_PGCIT.

Figure 18:
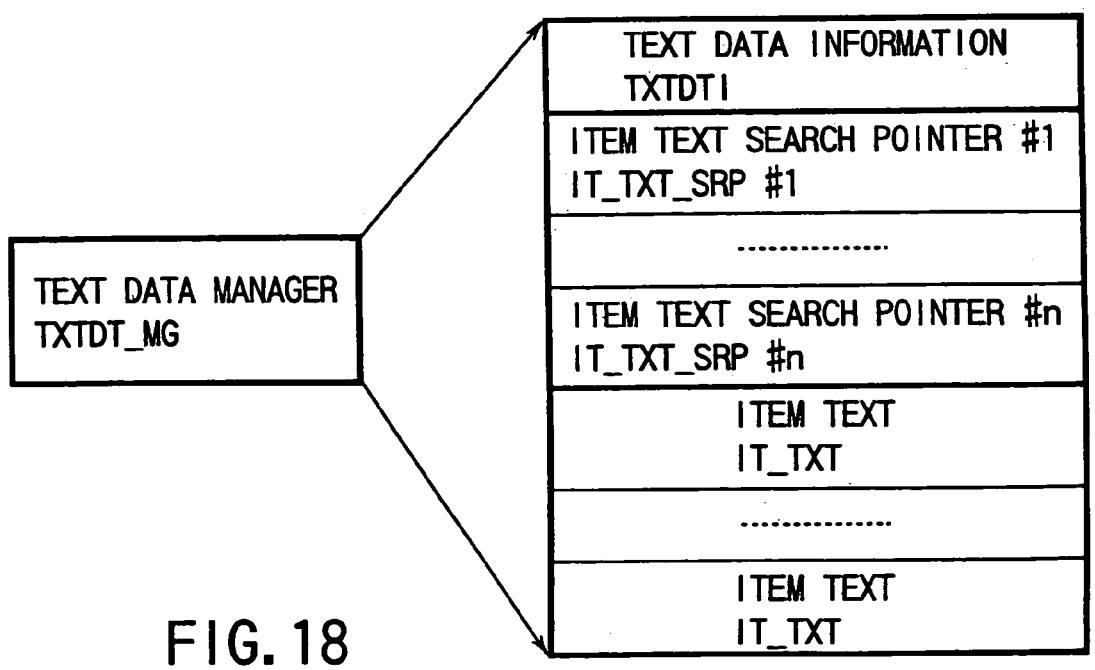
FIG. 18 is a view for explaining the data structure of a text data manager (TXTDT_MG) shown in FIG. 6.

FIG. 18 shows the data structure of text data manager TXTDT_MG shown in FIG. 6.

TXTDT_MG contains text data information TXTDTI, one or more item text search pointers IT_TXT_SRP#1 to IT_TXT_SRP#n, and one or more item texts IT_TXT.

TXTDTI includes CHRS that describes a character set code (ISO8859-1 or shift JIS kanji) used in TXTDT_MG, IT_TXT_SRP_Ns that describes the number of pointers IT_TXT_SRP, and TXTDT_MG_EA that describes the end address of TXTDT_MG by a relative byte number from the first byte of TXTDT_MG.

Each IT_TXT_SRP includes IT_TXT_SA that describes the start address of IT_TXT by a relative byte number from the first byte of TXTDT_MG.

IT_TXT describes item text by a character code designated by CHRS. The data length (the number of bytes) of IT_TXT changes depending on the text contents.

Figure 19:
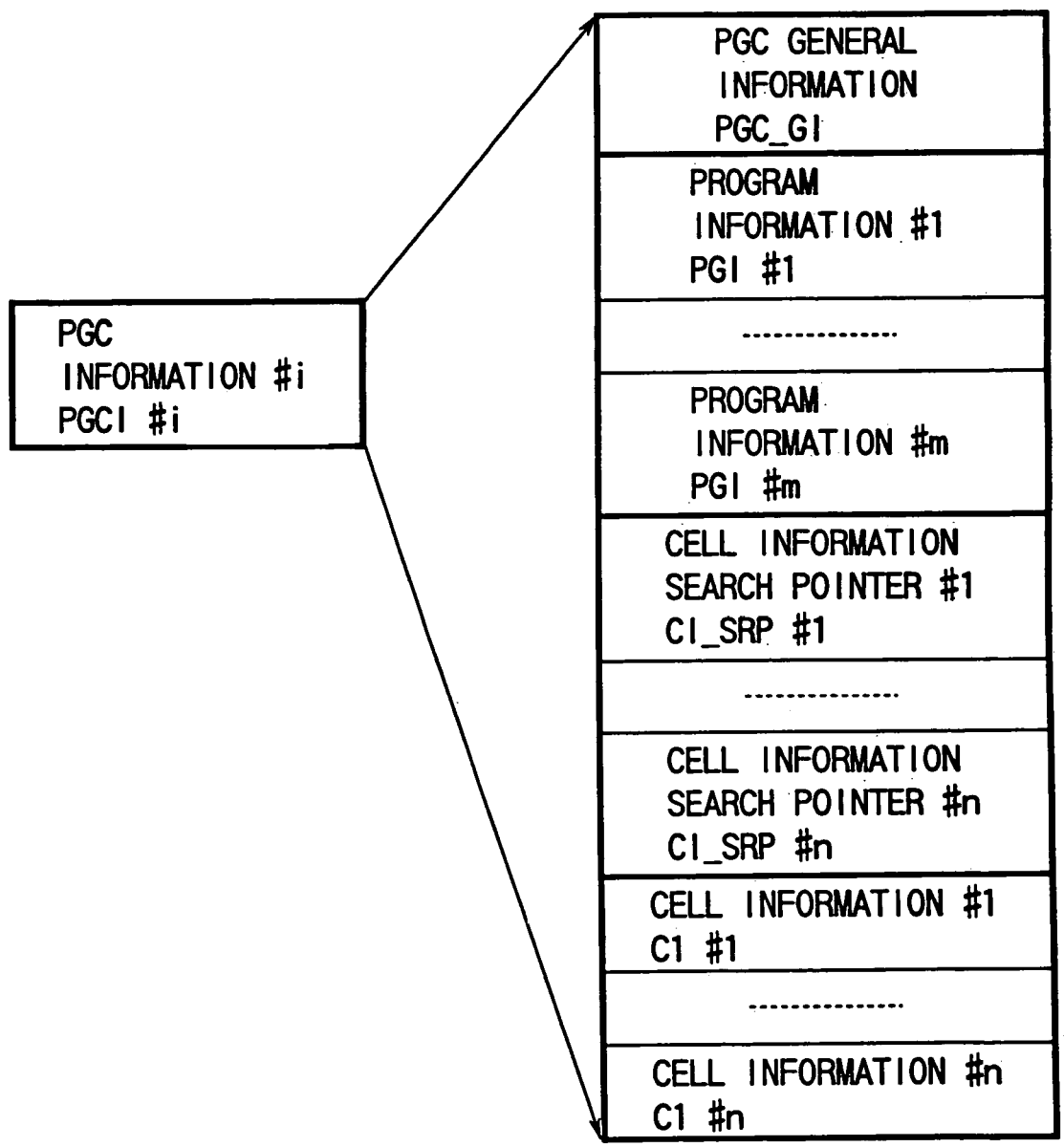
FIG. 19 is a view for explaining the data structure of PGC information (PGCI; original PGC or user defined PGC information)

FIG. 19 shows the data structure of the PGC information PGCI (information of an original PGC or user defined PGC).

PGCI contains navigation information for program chain PGC.

Two different types of program chains, i.e., an original PGC and user defined PGC, are available (see the contents of RTR_VMG shown in FIG. 6). The original PGC has VOB and PGCI. However, the user defined PGC does not have its own VOB, and refers to VOB in the original PGC.

As shown in FIG. 19, PGC information (PGCI#i) includes PGC general information PGC_GI, one or more pieces of program information PGI#1 to PGI#m, one or more cell information search pointers CI_SRP#1 to CI_SRP#n, and one or more pieces of cell information CI#1 to CI#n.

Note that the start address of cell information CI can be indicated by CI_SA described by a relative byte number from the first byte of PGCI.

FIG. 20 shows the contents of PGC general information PGC_GI shown in FIG. 19.

This PGC_GI contains PG_Ns that-describes the number of programs in PGC, and CI_SRP_Ns that describes the number of CI_SRPs in PGC.

In case of the user defined PGC, PG_Ns is set at "0". On the other hand, the maximum number of programs PG in the original PGC is "99", and the maximum number of cells in the PGC is "999".

FIG. 21 shows the contents of program information PGI shown in FIG. 19.

This PGI includes PG_TY which describes the type of program, C_Ns which describes the number of cells in PG, primary text information PRM_TXTI used in PG, search pointer number IT_TXT_SRPTN of IT_TXT where text data corresponds to PG, and thumbnail pointer information THM_PTRI.

Note that PRM_TXTI is constructed by a 128-byte field, and the first 64 bytes of that field are described by an ASCII character set. When ASCII text is less than 64 bytes, "00h" is written in blank bytes.

The second 64 bytes of the 128-byte field are used to describe primary text of another character set (e.g., shift JIS or ISO8859-15). Note that the code of "another character set" is described in VMGI_MAT, and is shared by all the pieces of primary text information in the disc.

Note that a terminal control code that assumes a value ranging from "01h" to "1Fh" is never described in PRM_TXTI.

THM_PTRI describes information of a thumbnail pointer. That is, THM_PTRI includes CN that describes the number of the cell where the thumbnail pointer is present, and THM_PT that describes the thumbnail point in the target cell.

When the resume marker is present in a movie cell, THM_PT describes the presentation time (PTM) using the RTR presentation time description format.

On the other hand, when a thumbnail is present in a still picture cell, THM_PT describes a still picture VOB entry number (S_VOB_ENTN) in a corresponding still picture VOB group (S_VOG).

THM_PTRI may be optionally set or used in either an RTR recorder or player. When the RTR recorder does not have performance capable of processing THM_PTRI, all the pieces of 8-byte THM_PTRI may be set at "FFh". On the other hand, when the RTR player does not have performance capable of processing THM_PTRI, it may simply ignore THM_PTRI.

Figure 22:
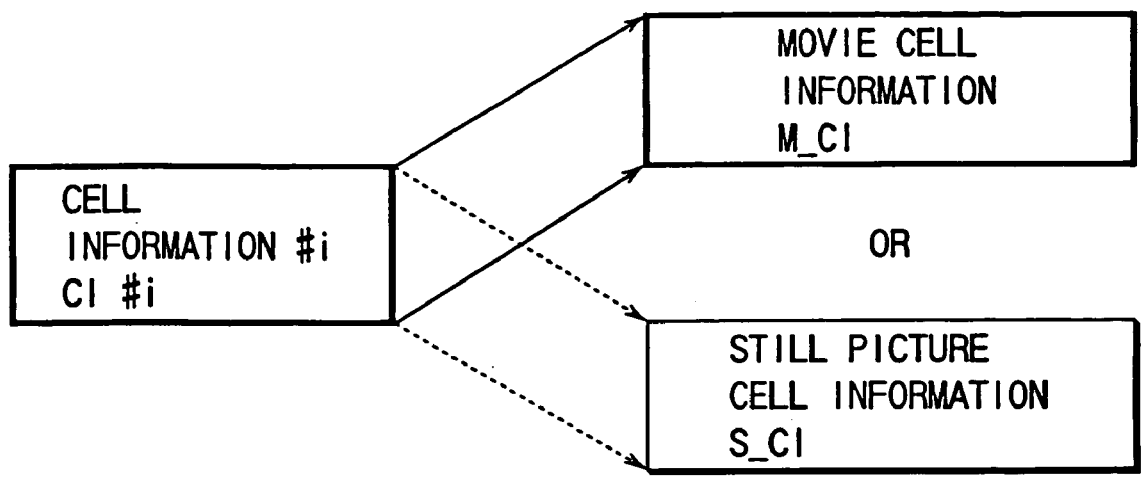
FIG. 22 is a view for explaining the data structure of cell information (CI) shown in FIG. 19.

FIG. 22 shows the data structure of cell information CI shown in FIG. 19. As shown in FIG. 22, there are two kinds of cell information, i.e., movie cell information M_CI and still picture cell information S_CI.

Information (M_C_EPI) that pertains to the entry point is written in movie cell information M_CI in navigation data file RTR.IFO shown in FIG. 5.

Figure 23:
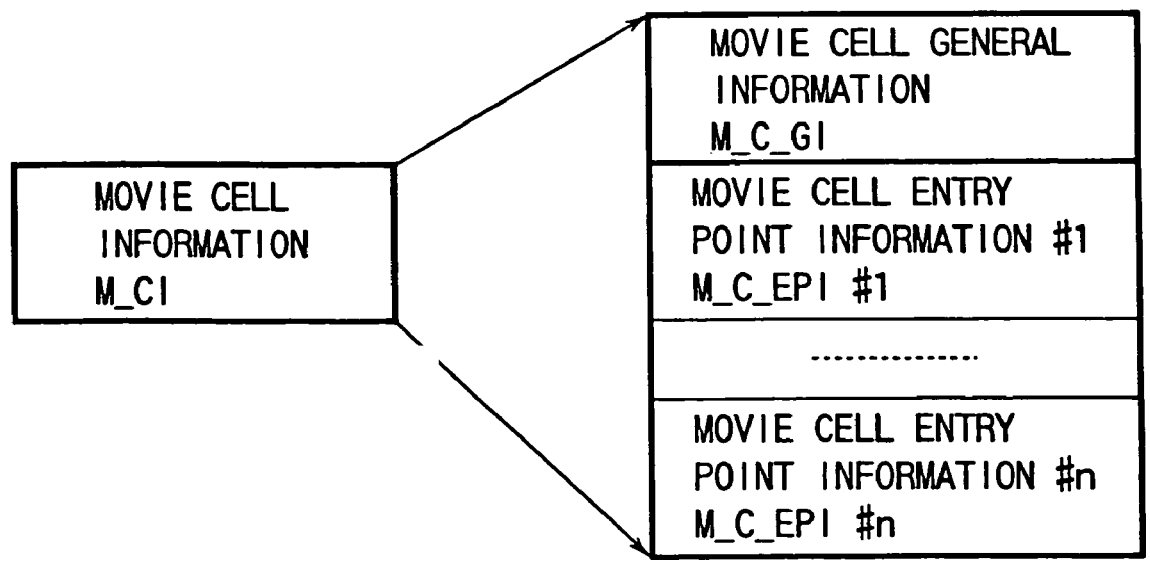
FIG. 23 is a view for explaining the data structure of movie cell information (M_CI) shown in FIG. 22.

FIG. 23 shows the data structure of movie cell information M_CI shown in FIG. 22. As shown in FIG. 23, M_CI contains movie cell general information M_C_GI, and one or more pieces of movie cell entry point information M_C_EPI#1 to M_C_EPI#n.

FIG. 24 shows the contents of movie cell general information M_C_GI shown in FIG. 23.

That is, M_C_GI contains C_TY which describes the type of cell, M_VOBI_SRPN which describes the number of the movie VOBI search pointer corresponding to VOB of this cell, C_EPI_NS which describes the number of pieces of cell entry point information, C_V_S_PTM which describes the presentation start time of this cell using the RTR presentation time description format, and C_V_E_PTM which describes the presentation end time of this cell using the RTR presentation time description format.

Note that C_V_S_PTM and C_V_E_PTM satisfy the following conditions.

(1) In case of cell in original PGC

C_V_S_PTM must be set in the first four VOBUs of the corresponding VOB; and

C_V__PTM must be set in the last four VOBUs of the corresponding VOB.

(2) In case of cell in user defined PGC
O_C_V_S_PTM≦C_V_S_PTM≦C_V_E_PTM≦O_C_V_E_PTM must hold, where O_C_V_S_PTM indicates the presentation start time of an original cell corresponding to VOB referred to by this cell, and O_C_V_E_PTM indicates the presentation end time of an original cell corresponding to VOB referred to by this cell.

FIG. 25 shows the contents of movie cell entry point information M_C_EPI shown in FIG. 23.

This M_C_EPI has two types (type 1 and type 2). M_C_EPI of type 1 without any text information is composed of EP_TY and EP_PTM, and M_C_EPI of type 2 with text information is composed of EP_TY, EP_PTM, and PRM_TXTI. FIG. 25 shows M_C_EPI of type 2.

As shown in FIG. 25, M_C_EPI includes EP_TY that describes the type of entry point, EP_PTM that describes the presentation time of the entry point using the RTR presentation time format, and PRM_TXTI that describes primary text information and the like of the entry point.

Upon playback, the value EP_PTM and cell playback time are converted into file pointers that point to VOBU by the time map TMAP information (see FIGS. 14 to 16), and are also converted into physical addresses by the file system.

PRM_TXTI in M_C_EPI is constructed by a 128-byte field. The first 64 bytes of that field are used to describe primary text using an ASCII character set. When ASCII text is less than 64 bytes, "00h" fills blank bytes. The latter 64 bytes of the 128-byte field are used to describe primary text of another character set (e.g., shift JIS, ISO8859-15, or the like). Note that "another character set" is described in VMGI_MAT, and is shared by all the pieces of primary text information in the disc.

Note that a terminal control code that assumes a value ranging from "01h" to "1Fh" is never described in PRM_TXTI.

EP_TY in M_C_EPI is comprised of 1-byte data including a 2-bit type identification code. If this identification code is "00b", it indicates that M_C_EPI is of type 1 (empty primary text data or no data); if the code is "01b", it indicates that M_C_EPI is of type 2 (primary text data).

This EP_TY has a 6-bit reserved field in addition to the 2-bit type identification code that identifies type 1 or 2. Using some or all the bits of this reserved field, the contents of PRM_TXTI in M_C_EPI can be further specified. (If all the six bits are used, a maximum of 64 different specifications may be made. More than 6 bits may be assigned to this designation code to specify more types.)

The bits using this reserved field will be referred to as a designation code for designating the contents of the primary text information hereinafter.

Specific bits in the designation code can designate whether PRM_TXTI in M_C_EPI shown in FIG. 25 is "text information" with "information type" and/or "information date" or "text information" without "information type" and/or "information date".

Furthermore, specific bits in the designation code can designate whether PRM_TXTI in M_C_EPI shown in FIG. 25 is "text information" with corresponding "thumbnail information" in addition to "information type" and/or "information date", or "text information" without "thumbnail information". (The "thumbnail information" corresponds to, e.g., thumbnail pointer information THM_PTRI shown in FIG. 21.)

Moreover, specific bits in the designation code can designate whether PRM_TXTI in M_C_EPI shown in FIG. 25 consists of "thumbnail information" alone without any "text information" or "thumbnail information" with "text information".

When the designation code (not shown) in EP_TY designates "information type", "information date", and "text information" shown in FIG. 25, these pieces of information can be used to express the following contents.

More specifically, "information type" describes an attribute of the entry point, "information date" describes the date the entry point was entered (recorded on the disc), and "text information" describes additional information (a brief comment of a picture at the entry point) that pertains to the entry point.

The attributes of the entry point described in "information type" include:

information type [1]=0, user mark (the user enters an entry point)

information type [1]=1; set mark (the recorder/player enters an entry point)

information type [1]=2; defect start mark information type [1]=3; defect end mark information type [1]=4; presentation start mark information type [1]=5; presentation end mark information type [1]=6; erasure prohibition mark information type [1]=7; another mark (e.g., an instruction from other than the user or recorder/player).

Note that [1] in information type [1] means the first data field of the information type. If this data field has a 3-bit configuration, information type [1] can express eight different marks.

Note that information similar to "information type", and "information date" and/or "text information" in FIG. 25 may be assured in play list search pointer PL_SRP shown in FIG. 10.

The DVD-RTR system can process text information other than the text managed by text data manager TXTDT_MG shown in FIG. 18. The text information includes primary text information (FIG. 21) described in a program, primary text information (FIG. 10) described in a play list, and primary text information (FIG. 25) described in the selected entry point.

The user uses such primary text information PRM_TXTI to identify the corresponding recorded contents using a character set such as ASCII, shift JIS, or the like.

Figure 26:
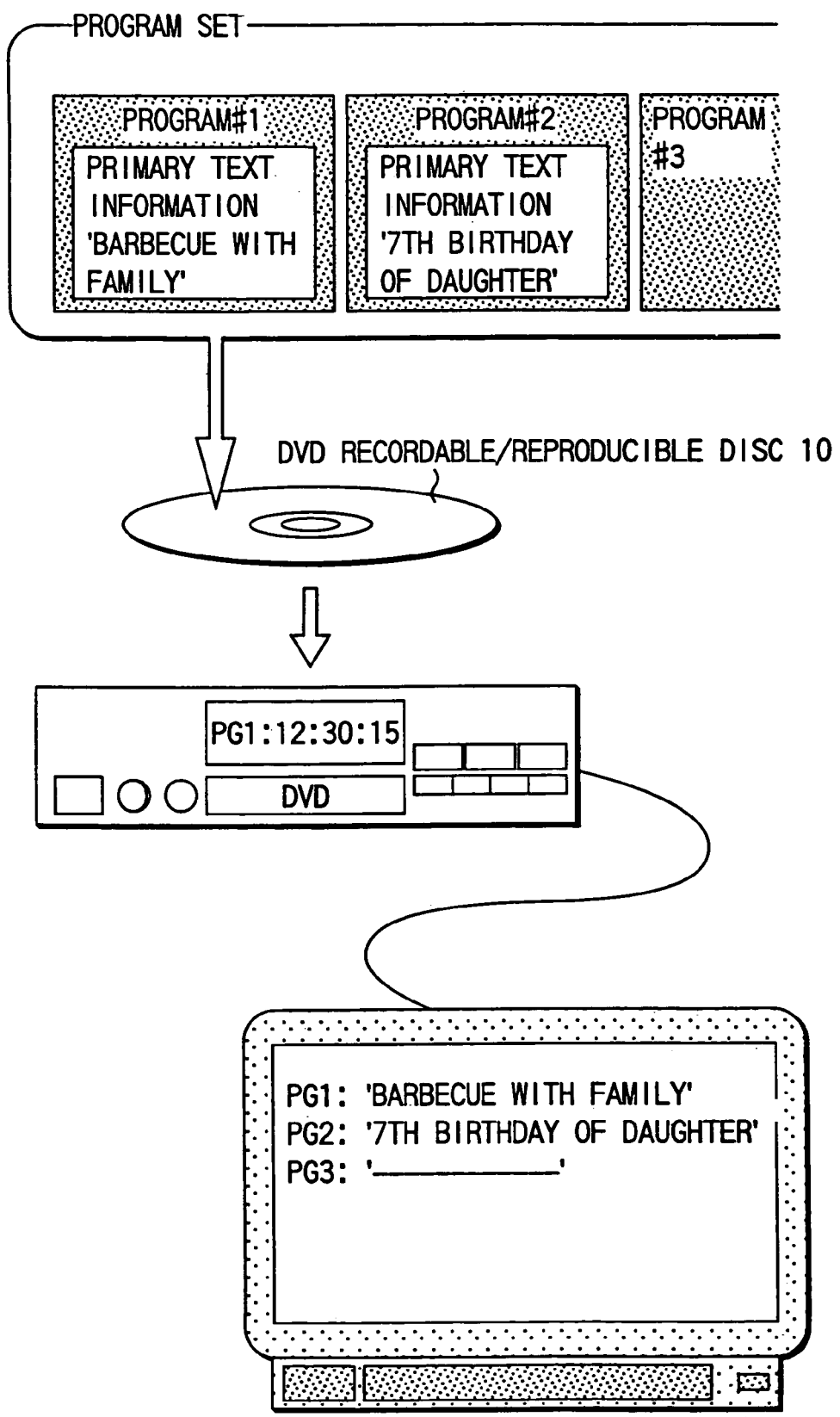
FIG. 26 is a view for explaining a use example of primary text information (PRM_TXTI)

FIG. 26 shows that example. That is, the player (RTR recorder/player) reads out primary text information PRM_TXTI shown in FIG. 21 from disc 10, and displays recording date information of recorded programs (PG1, PG2, PG3, . . . ) on the display panel of the player (this example indicates that recording of program #1 was started from PM 12:30:15).

When the corresponding primary text information PRM_TXTI is read out from the disc, the player outputs the result on a monitor (television). Before the beginning of playback of the recorded programs (PG1, PG2, PG3, . . . ), brief comments (e.g., "barbecue with family" of PG1, "7th birthday of daughter" of PG2, and the like) of the programs recorded on that disc 10 are displayed on the monitor screen.

The user can easily select a desired program (e.g., "barbecue with family) from this display. When the user has selected a desired program by operating the cursors of a remote controller (not shown) and has pressed a playback button, playback of program #1 is started.

Also, the user can similarly make display/user selection/playback operation using primary text information PRM_TXTI (FIG. 10) of a play list, and those using primary text information PRM_TXTI (FIG. 25) of an entry point.

Figure 27:
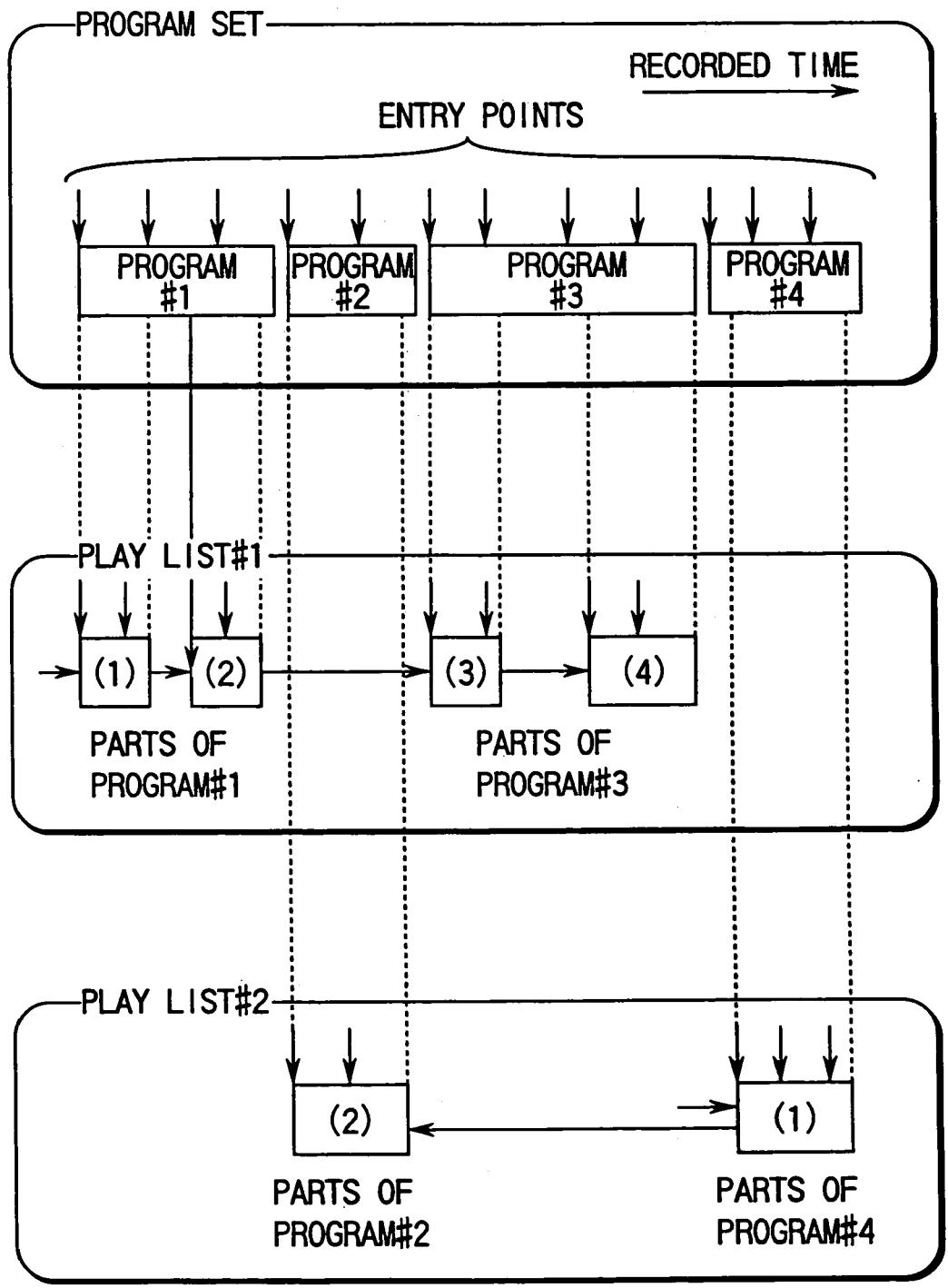
FIG. 27 is a view for explaining a correspondence among programs that form a program set, and program parts that form a play list.

More specifically, as exemplified in FIG. 27, an entry point (corresponding to a "bookmark" compared to a book) can be set at an arbitrary position of each program, and text such as "barbecue with family" can be stored in primary text information PRM_TXTI (FIG. 25) of that entry point.

The same applies to a case wherein the user decomposes recorded programs #1 to #4 into arbitrary parts, enters the playback order of decomposed parts in play lists #1 and #2, and sets entry points in the individual parts.

Furthermore, a short title such as "barbecue with grandma" may be written in primary text information PRM_TXTI (FIG. 10) of each play list.

Figure 28:
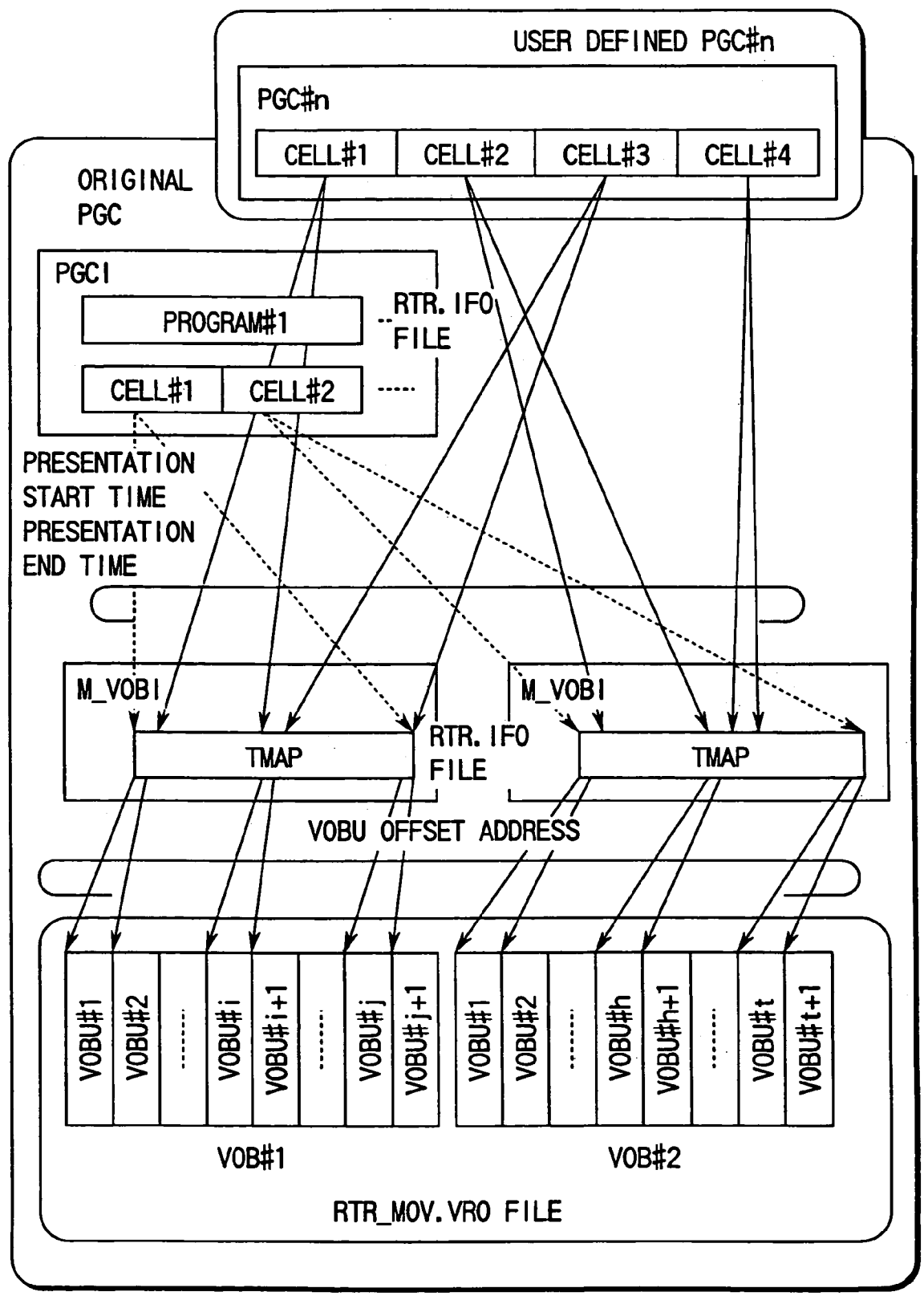
FIG. 28 is a view for explaining a correspondence between the presentation start times/presentation end times of cells that form a user defined PGC (or original PGC), and the offset addresses for VOBUs of VOBS that form a movie video object (RTR_MOV.VRO/VR_MOVIE.VRO) shown in FIG. 5.

FIG. 28 is a view for explaining a correspondence between the presentation start times/presentation end times of cells that form a user defined PGC (or original PGC), and the offset addresses for VOBUs of VOBs that form movie video object RTR_MOV.VRO/VR_MOVIE.VRO shown in FIG. 5.

Referring to FIG. 28, information PGCI and information M_VOBI are stored in the RTR.IFO file shown in FIG. 5. A VOB as a set of VOBUs corresponding to a PGC as a set of cells is stored in the RTR_MOV.VRO/VR_MOVIE.VRO file shown in FIG. 5.

Program chain information PGCI of the original PGC shown in FIG. 28 manages the playback method of a program as a set of one or more cells, and each user defined PGC manages the playback method of a set of one or more cells determined by the user.

The presentation start time and presentation end time of each cell in the original PGC or user defined PGC are converted by time map information TMAPI contained in each M_VOBI#i shown in FIG. 13 into file pointers from the beginning of the VRO file, which point to a given VOBU that stores the corresponding video data or the like, and are further converted into physical addresses by the file system.

In order to play back each cell, the corresponding VOB number, presentation start time, and presentation end time are described as cell information. Upon playing back each cell, the presentation start and end times are passed on to the corresponding VOBI, are converted into file pointers that point to a VOBU corresponding to the cell playback time using a time map (TMAP) included in the VOBI, and are further converted into physical addresses by the file system, thus accessing a VOB.

For example, video data (VOBS) recorded in audio/video data area DA2 in FIG. 2 is made up of a set of one or more program chains PGC. Each PGC is a set of programs as sets of one or more cells, and cells to be played back and their order upon forming programs can be determined by the original PGC information or user defined PGC information.

The playback times of cells and their playback order designated by the original PGC information or user defined PGC information are converted into VOBU addresses that form each of cells to be played back on the basis of the contents (time map TMAP shown in FIG. 28) of time map information TMAPI shown in FIG. 14.

That is, upon playback based on the original PGC (the cell playback order of the initially recorded state), the addresses of VOBUs within the time band to be played back are obtained via time map information (TMAP) in accordance with the contents of ORG_PGCI shown in FIG. 6, and playback is made in that order.

On the other hand, upon playback based on a PGC uniquely defined by the user (e.g., when the user has edited the playback order after recording), the addresses of VOBUs within the time band to be-played back are obtained via time map information (TMAP) in accordance with the contents of UD_PGCI shown in FIG. 17, and playback is made in that order.

The cell playback order based on user defined PGC information UD_PGCI can be quite different from that based on original PGC information ORG_PGCI.

The playback times and the addresses of VOBUs to be played back can correspond to each other with reference to the contents of time entries and VOBU entries in time map information TMAPI shown in FIG. 14.

Figure 29:
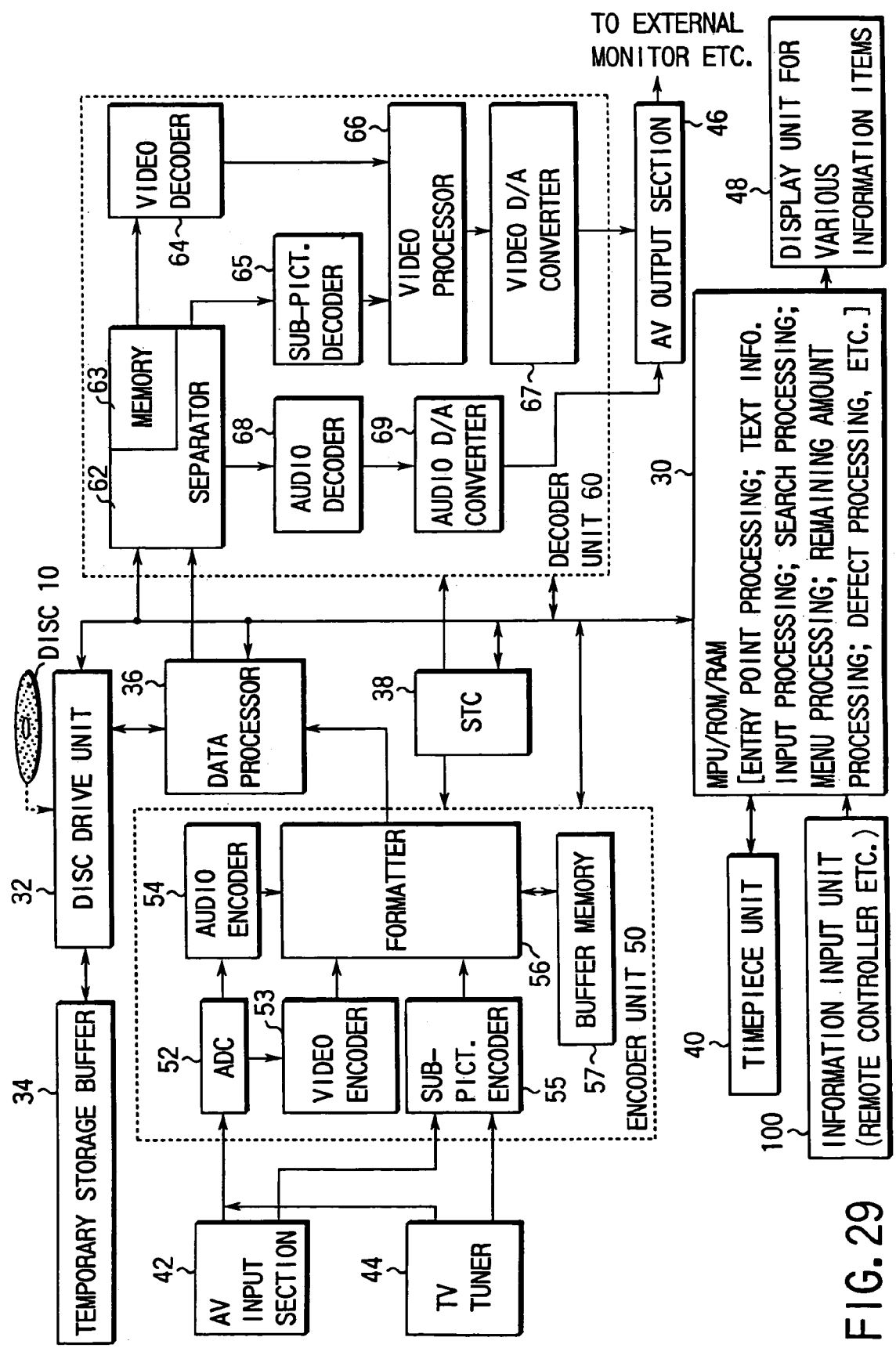
FIG. 29 is a block diagram for explaining an example of the arrangement of an apparatus (RTR video recorder) for recording a video program or the like in real time and playing it back using the recordable/reproducible optical disc shown in FIG. 1.

FIG. 29 is a block diagram for explaining an example of the arrangement of an apparatus (RTR video recorder) for recording a video program in real time and playing it back using recordable/reproducible optical disc 10 shown in FIG. 1.

The apparatus main body of the RTR video recorder shown in FIG. 29 is roughly constructed by a disc drive unit (32, 34, and the like) for rotating DVD-RAM or DVD-R disc 10 and reading/writing information on disc 10, encoder unit 50 which constructs the recording side, decoder unit 60 which constructs the playback side, and microcomputer block 30 for controlling the operations of the overall apparatus.

Encoder unit 50 comprises ADC (analog-to-digital converter) 52, video encoder (V encoder) 53, audio encoder (A encoder). 54, sub-picture encoder (SP encoder) 55, formatter 56, and buffer memory 57. ADC 52 receives an external analog video signal+external analog audio signal from AV input section 42, or analog TV signal+analog audio-signal from TV tuner 44, or the like. This ADC 52 converts the input analog video signal into digital data at, e.g., a sampling frequency=13.5 MHz and the number of quantization bits=8.

Likewise, ADC 52 converts the input analog audio signal into digital data at, e.g., a sampling frequency=48 kHz and the number of quantization bits=16.

When an analog video signal and digital audio signal are input to ADC 52, the digital audio signal passes through ADC 52.

On the other hand, when a digital video signal and digital audio signal are input to ADC 52, these signals pass through ADC 52.

A digital video signal component from ADC 52 is supplied to formatter 56 via video encoder (V encoder) 53. Also, a digital audio signal component from ADC 52 is supplied to formatter 56 via audio encoder (A encoder) 54.

V encoder 53 has a function of converting the input digital video signal into a digital signal compressed at variable bit rate on the basis of the MPEG2 or MPEG1 specifications.

A encoder 54 has a function of converting the input digital audio signal into a digital signal (or linear PCM digital signal) compressed at fixed bit rate on the basis of the MPEG or AC-3 specifications.

When a DVD video signal is input from AV input section 42, or when a DVD video signal is broadcasted and is received by TV tuner 44, a teletext signal component in the DVD video signal is input to SP encoder 55. Sub-picture data input to SP encoder 55 is arranged into a predetermined signal format, and is then sent to formatter 56.

Formatter 56 executes predetermined signal processing of the input video signal, audio signal, sub-picture signal, and the like using buffer memory 57 as a work area, and outputs recording data that matches a predetermined format (file structure) to data processor 36.

Standard encode process contents for generating the recording data will be briefly explained below.

More specifically, when encoder unit 50 shown in FIG. 29 starts an encode process, parameters required for encoding video data and the like are set. Main picture data is pre-encoded using the set parameters to compute optimal code amount distribution for the selected average transfer rate (recording rate). Then, the main picture data is encoded based on the code amount distribution obtained by pre-encoding. At this time, audio data is encoded simultaneously.

As a result of pre-encoding, if it is determined that the data compression amount is insufficient (a desired video program cannot fall within a DVD-RAM disc or DVD-R disc to be used in recording), and pre-encoding can be re-done (if the source to be recorded is a source that can be repetitively played back such as a video tape, video disc, or the like), main picture data is partially re-encoded, and the previously pre-encoded main picture data portion is replaced by the re-encoded main picture data portion. With a series of processes described above, the main picture and audio data are encoded, and the average bit rate value required for recording can be greatly reduced.

Analogously, parameters required for encoding sub-picture data are set, and encoded sub-picture data is generated.

The encoded main picture, audio, and sub-picture data are combined, and are converted into the DVD_RTR video structure.

The encoded main picture data, audio data, and sub-picture data are segmented into packs each having a predetermined size (2,048 bytes), as shown in FIG. 3. Dummy packs are inserted into these packs, as needed. Note that time stamps such as PTS (presentation time stamp), DTS (decode time stamp), and the like are described in packs other than dummy packs, as needed. As for PTS of sub-picture data, a time arbitrarily delayed from PTS of main picture data or audio data in the identical playback time band can be described.

Data cells are arranged in units of VOBUs to allow playback in the time code order of data, thus forming a VOB consisting of a plurality of cells. An RTR_MOV.VRO/ VR_MOVIE.VRO file that combines one or more VOBs is formatted into the structure shown in FIG. 5.

Upon digitally copying a DVD playback signal from the DVD video player, since the contents of the cells, program chains, management tables, time stamps, and the like are determined in advance, they need not be created again. (However, upon designing the RTR video recorder to be able to digitally copy a DVD playback signal, the recorder must have copyright protection means such as digital watermarking means and the like.)

The disc drive unit that reads/writes (records and/or plays back) information to/from DVD disc 10 comprises disc drive 32, temporary storage buffer 34, data processor 36, and system time counter (or system time clock; STC) 38.

Temporary storage buffer 34 is used to buffer a given amount of data to be written on disc 10 (data output from encoder unit 50) via disc drive 32, and to buffer a given amount of data played back from disc 10 (data input to decoder unit 60) via disc drive 32.

For example, when temporary storage buffer 34 comprises a 4-Mbyte semiconductor memory (DRAM), it can buffer recording or playback data for approximately 8 seconds at an average recording rate of 4 Mbps. When temporary storage buffer 34 comprises a 16-Mbyte EEPROM (flash memory), it can buffer recording or playback data for approximately 30 seconds at an average recording rate of 4 Mbps. Furthermore, when temporary storage buffer 34 comprises a 100-Mbyte, very small HDD (hard disc), it can buffer recording or playback data for 3 minutes or more at an average recording rate of 4 Mbps.

Temporary storage buffer 34 can also be used to temporarily store recording information when disc 10 is used up during recording, until that disc 10 is exchanged with a new disc.

When disc drive 32 uses a high-speed drive (a speed equal to or higher than double speeds), temporary storage buffer 34 can also be used to temporarily store readout data exceeding an amount read out from a normal drive per unit time. When temporary storage buffer 34 buffers readout data upon playback, even when an optical pickup (not shown) has caused read errors due to vibration shock or the like, playback data-buffered by temporary storage buffer 34 can be used instead, thus preventing the playback picture from being discontinued.

If an external card slot (not shown in FIG. 29) is provided to the RTR video recorder, the EEPROM can be offered as an option IC card. On the other hand, if an external drive slot or SCSI interface is provided to the RTR video recorder, the HDD can be offered as an option extension drive.

When a personal computer is used as a DVD video recorder by software (not shown), the free area of a hard disc drive or a main memory of the personal computer itself can be partially used as temporary storage buffer 34 shown in FIG. 29.

Data processor 36 in FIG. 29 supplies DVD_RTR recording data from encoder unit 50 to disc drive 32, receives a DVD_RTR playback signal played back from disc 10, rewrites management information (some file data in FIG. 5) recorded on disc 10, and deletes data (some or all of files) recorded on disc 10, under the control of microcomputer block 30.

Microcomputer block 30 includes an MPU (or CPU), a ROM written with control programs and the like, and a RAM which provides a work area required for executing programs.

The MPU of this microcomputer block 30 (to be also referred to as MPU 30 hereinafter) executes, using its RAM as a work area, an entry point enter process, text information input process, playback menu display process, text information search process (recorded content search process), defect enter process, priority order of erasure enter process, and the like, in accordance with the control programs stored in its ROM.

In these processes, data (a text input of a short title of the recorded contents or the like) input by the RTR video recorder user is supplied from information input unit 100 to MPU 30. Information input unit 100 can use a keyboard of a personal computer or cursor keys/ten-key pad of a remote controller (not shown).

Of the execution results of MPU 30, the contents the user of the DVD_RTR video recorder should know are displayed on display unit 48 of the DVD_RTR video recorder. Such message contents are also displayed on a monitor display using on-screen display (OSD), sub-picture data, and the like, as needed.

Note that the control timings of disc drive 32, data processor 36, and encoder unit 50 and/or decoder unit 60 by. MPU 30 can be determined based on time data supplied from STC 38 (video recording/playback are normally executed in synchronism with time clocks from STC 38, but other processes may be executed at timings independently of STC 38).

Furthermore, MPU 30 can process the recorded dates of individual programs recorded on disc 10, entered dates of entry points, and the like on the basis of time data from timepiece unit 40.

Decoder unit 60 comprises separator 62 for separating and extracting the respective packs from DVD_RTR playback data with the pack structure shown in FIG. 3, memory 63 used upon executing pack separation and other signal processes, video decoder (V decoder) 64 for decoding main picture data (the contents of video packs) separated by separator 62, sub-picture decoder (SP decoder) 65 for decoding sub-picture data (the contents of sub-picture packs) separated by separator 62, audio decoder (A decoder) 68 for decoding audio data (the contents of audio packs) separated by separator 62, video processor 66 for appropriately mixing sub-picture data from SP decoder 65 with video data output from V decoder 64 to superpose sub-picture data such as menus, highlight buttons, superimposed dialogs, and the like on main picture data, and outputting them, video digital-to-analog converter (V•DAC) 67 for converting the digital video output from video processor 66 into an analog video signal, and audio digital-to-analog converter (A•DAC) 69 for converting the digital audio output from A decoder 68 into an analog audio signal.

The analog video signal output from V•DAC 67 and the analog audio signal output from A•DAC 69 are supplied to an external component (not shown; a multi-channel stereo system having two to six channels+monitor TV or projector) via AV output section 46.

OSD data output from MPU 30 is input to video processor 66 in decoder unit 60. The OSD data is superimposed on main picture data, and they are supplied to an external monitor TV connected to AV output section 46. Thus, various kinds of text information are displayed together with main picture data.

The data processes in the RTR video recorder are roughly categorized into two processes, i.e., a recording process and playback process.

Figure 30:
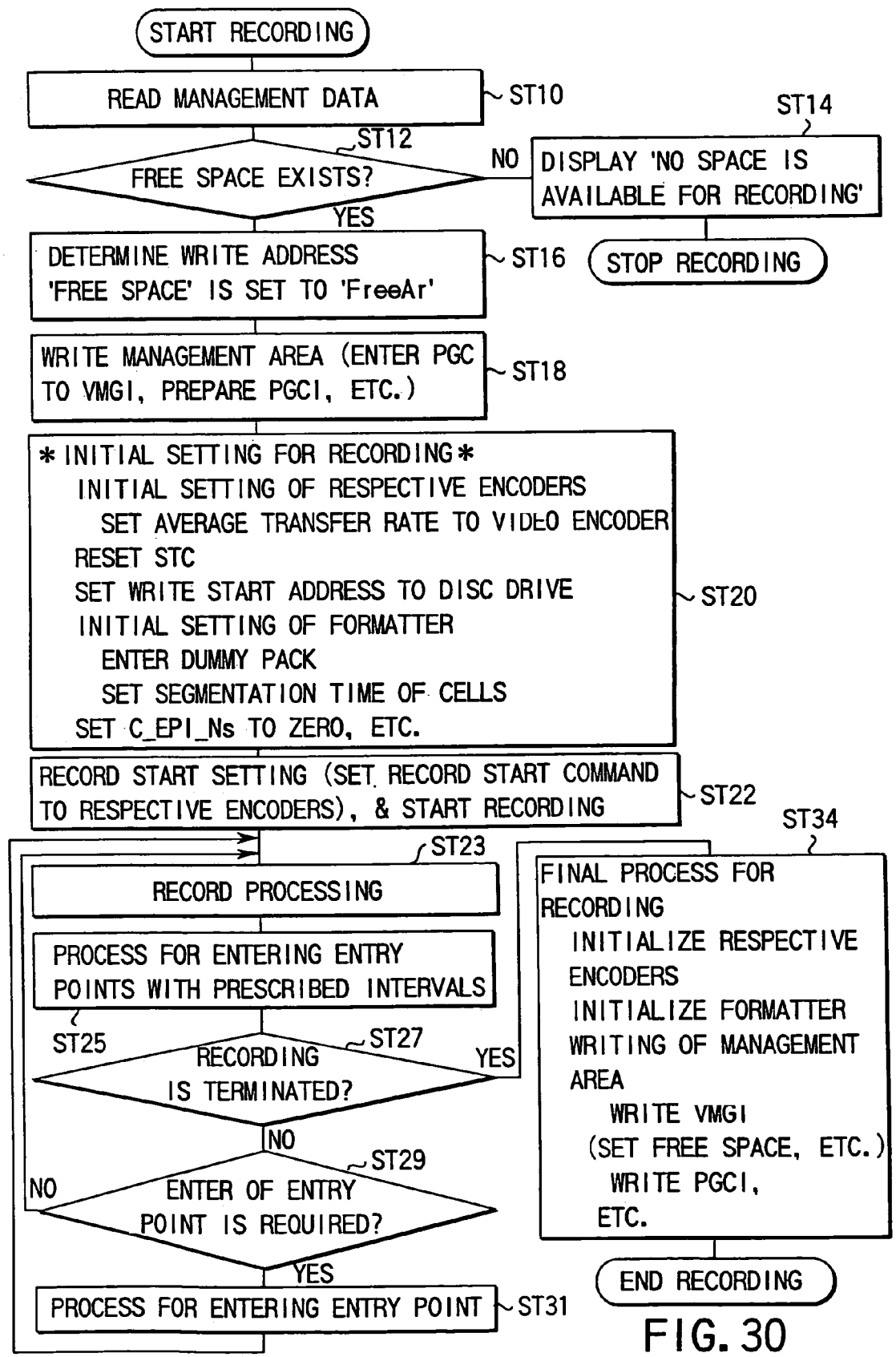
FIG. 30 is a flow chart for explaining an example of recording in the apparatus shown in FIG. 29.

FIG. 30 is a flow chart for explaining an example of the recording operation in the RTR video recorder shown in FIG. 29.

Upon receiving an image recording command input by remote controller operation of the user or a timer recording program (not shown), MPU 30 reads management data (file system and the like) from disc 10 (FIG. 1) set in disc drive 32 (step ST10), and determines the recording area (write area).

If disc 10 has no unrecorded area with a minimum required size or an area that can be erased by overwriting data, i.e., if no free space exists (NO in step ST12), MPU 30 displays an alert message "no space is available for recording" (step ST14), thus stopping recording.

If a free space exists (YES in step ST12), MPU 30 determines a write address (step ST16), and writes data required for recording (writing) on the determined area in the management area (RTR_VMG file and the like) (step ST18).

MPU 30 then executes an initial setting process for recording (step ST20). More specifically, MPU 30 sets the average transfer rate (e.g., 4 Mbps) in the respective encoders in encoder unit 50 shown in FIG. 29, resets STC 38 to a predetermined value (e.g., zero), sets a write start address in drive 32, initializes formatter 56 (e.g., for NTSC recording based on MPEG2/4 Mbps), enters dummy packs (FIGS. 3 and 4), sets the segmentation time of cells to be a predetermined value, and sets the number C_EPI_Ns (FIG. 24) of pieces of cell entry point information to zero.

Upon completion of the aforementioned initial setting process, MPU 30 sets a recording start command in the respective encoders in encoder unit 50 to start recording (step ST22), and starts a record process (step ST23).

The flow of a video signal in the record process (step ST23) is as follows.

An AV signal input to external AV input section 42 or a broadcast signal received by TV tuner 44 are A/D-converted by ADC 52. The A/D-converted digital video signal is input to V encoder 53, and the digital audio signal is input to A encoder 54. Also, a closed caption signal or text signal such as teletext or the like contained in the broadcast signal is input from TV tuner 44 to SP encoder 55.

The respective encoders compress the input signals by a predetermined method and packetize them to have 2,048 bytes per pack, and input packets to formatter 56.

Note that the respective encoders determine PTS (presentation time stamp or playback time stamp) and DTS (decoding time stamp) of each packet in accordance with the count value from STC 38, as needed, upon recording.

Formatter 56 temporarily stores packet data in buffer memory 57, then packs the input packet data, mixes them in units of GOPs, and transfers the packs to data processor 36.

Data processor 36 forms groups of 16 transferred packs (2 kbytes), executes an ECC process of these packs using, e.g., a product code, and sends them to disc drive 32.

At this time, when disc drive 32 is not ready to record, data processor 36 transfers the recording signal to the temporary storage buffer, and waits until disc drive 32 is ready to record data. When disc drive 32 is ready to record data, drive 32 starts recording.

In this case, a large-size memory is used as temporary storage buffer 34 so as to store recording data for several minutes or more by high-speed access.

Figure 33:
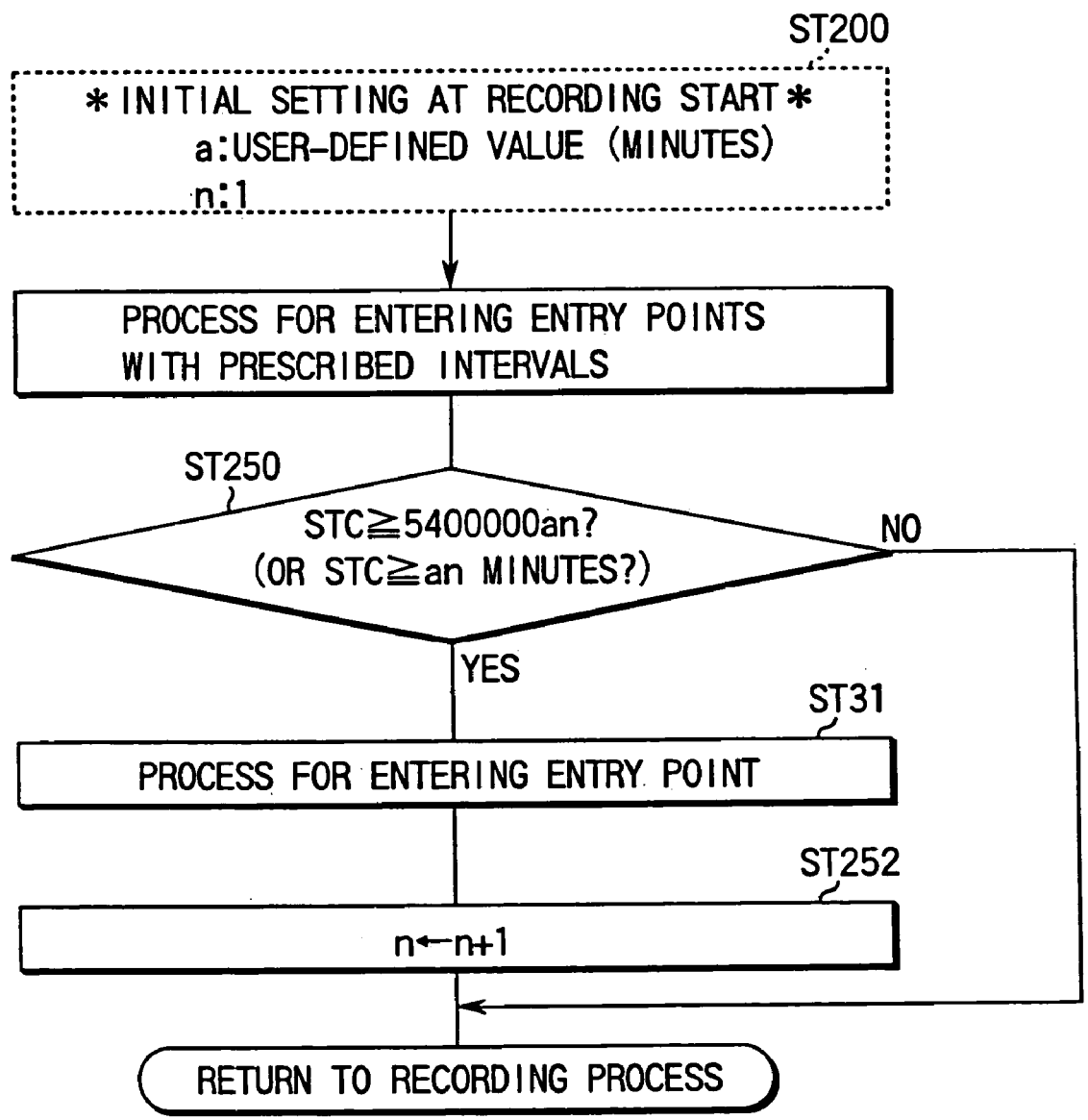
FIG. 33 is a flow chart for explaining an example of an automatic entry point enter process (for entering entry points at given time intervals) in the apparatus shown in FIG. 29.

During the record process, a process for automatically entering entry points at prescribed time intervals (e.g., at 5-sec intervals) is done (step ST25; see FIG. 33). The user can arbitrarily set this entry point entering time interval in units of minutes. If this time interval is set to be longer than the free space (recordable time) of disc 10, no entry points are automatically entered.

During recording (NO in step ST27), if the user requires entering of an entry point (YES in step ST29), a process for entering an entry point is done (step ST31; see FIG. 31) independently of the process in step ST25.

For example, when a remote controller (not shown) has an entry point key, and the user has pressed this entry point key during the record process, entry point information (FIG. 25) is entered at a position corresponding to the recorded contents at that time.

At this time, MPU 30 records entry point information in management information (RTR_VMG file in FIG. 5) in response to the entry point enter request from the user or set (RTR video recorder).

Upon completion of recording (YES in step ST27), MPU 30 initializes the respective encoders and formatter in encoder unit 50, sends predetermined management information to drive 32, and records it in RTR_VMGI of disc 10 (step ST34).

Figure 31:
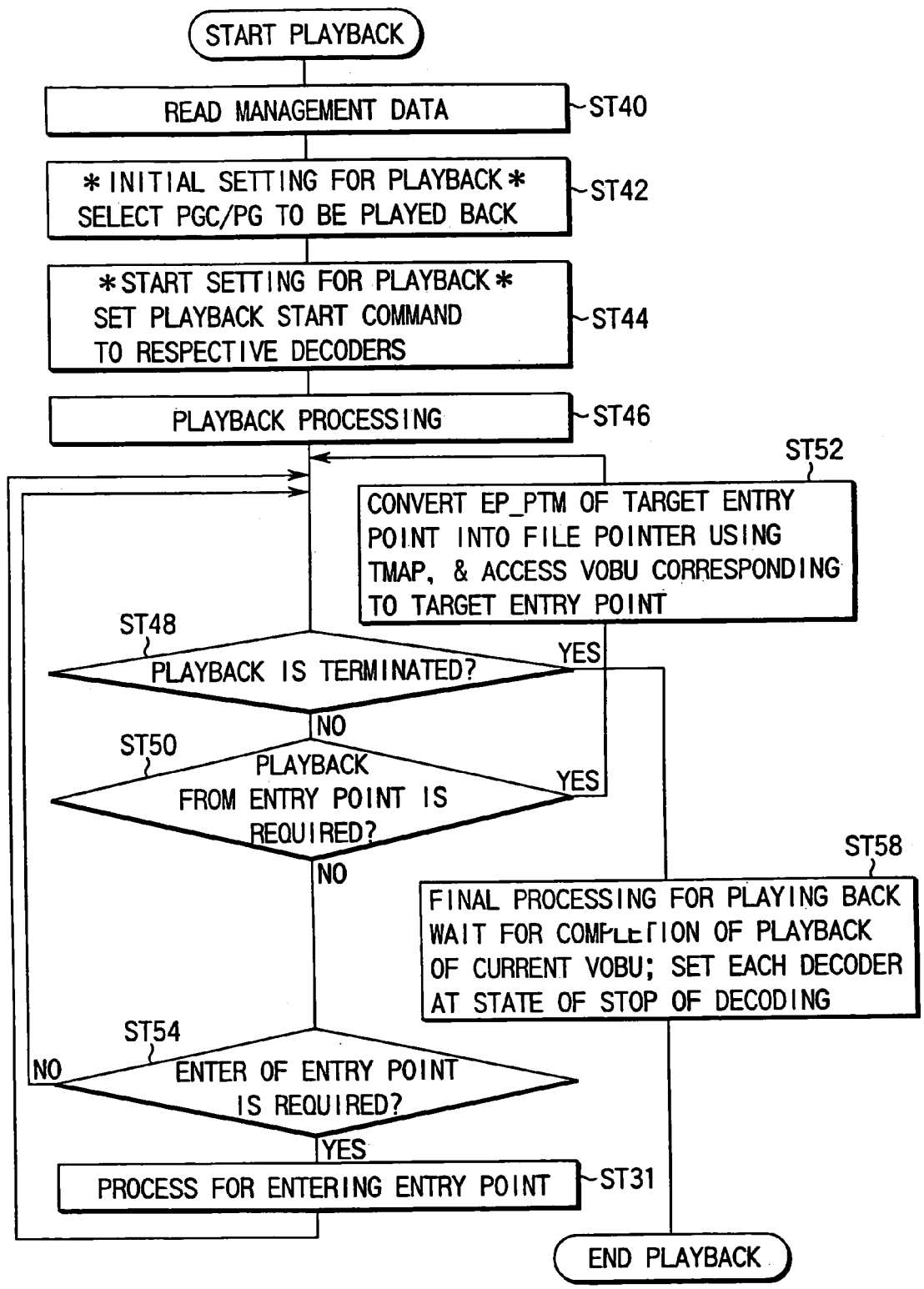
FIG. 31 is a flow chart for explaining an example of playback in the apparatus shown in FIG. 29.

FIG. 31 is a flow chart for explaining an example of the playback operation in the RTR video recorder shown in FIG. 29.

Upon receiving a playback command input by remote controller operation by the user or a timer playback program (not shown), MPU 30 reads the contents of the management area (RTR_VMG) of disc 10 via drive 32 and data processor 26 (step ST40), and determines the playback address.

MPU 30 selects a program chain and programs to be played back on the basis of the read management data (step ST42), and sets a playback start command in the respective decoders in decoder unit 60 (step ST44).

MPU 30 then sends the determined playback address and read command to drive 32 and starts a playback process (step ST46).

Drive 32 reads out sector data of disc 10 (FIG. 1) in accordance with the received read command, and data processor 36 corrects errors of readout data, and outputs the data to decoder unit 60 in the form of pack data.

In decoder unit 60, separator 62 receives the readout pack data. Separator 62 packetizes the received data, and transfers packets in accordance with the types of data (video data, audio data, sub-picture data, and the like). That is, separator 62 transfers video packet data (MPEG video data) to V decoder 64, audio packet data to A decoder 68, and sub-picture data to SP decoder 65.

At the beginning of transfer of packet data to the respective decoder, SCR (system clock reference or reference system clock) data is loaded onto STC 38. The respective decoders execute playback processes in synchronism with PTS values (see FIG. 3) in packet data (that is, by comparing PTS and STC values). In this manner, a moving picture with audio and superimposed dialog data, which are synchronous with a video, can be played back.

If playback from an entry point of a specific cell is required during playback (YES in step ST50), MPU 30 converts EP_PTM (see FIG. 25) of the target entry point into a file pointer with reference to TMAP (see FIG. 14), and accesses a VOBU (see FIG. 28) corresponding to that entry point (step ST52).

If playback from an entry point is not required (NO in step ST50), the playback process continues.

If enter of an entry point is required during the playback process (YES in step ST54), a process for entering an entry point can be executed (step ST31). This entry point enter process can have the same contents as that (ST31 in FIG. 30) upon recording.

If playback is to end (YES in step ST48), MPU 30 waits for completion of playback of the VOBU, playback of which is in progress at that time, and then sets the respective decoders in decoder unit 60 upon stopping decoding (step ST58), thus ending the playback process.

Figure 32:
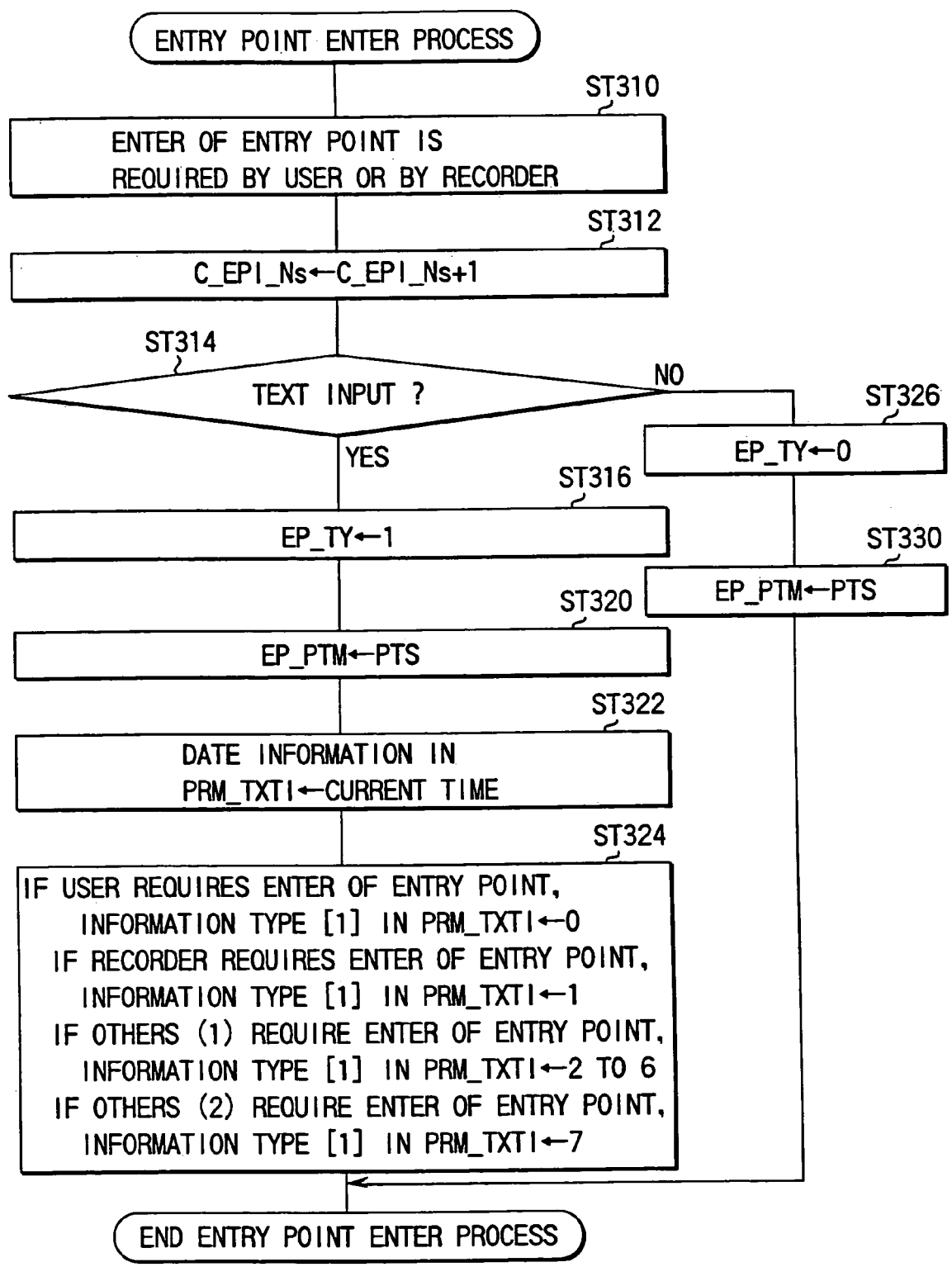
FIG. 32 is a flow chart for explaining an example of an entry point enter process in the apparatus shown in FIG. 29.

FIG. 32 is a flow chart for explaining an example of a process executed when recording or playback of the RTR video recorder (recorder/player) is underway, and the user or recorder/player requests enter of an entry point with respect to specific video or audio data. This entry point enter process corresponds to step ST31 in FIG. 30 or 31.

Upon receiving the entry point enter request from the user or recorder/player (step ST310), MPU 30 of the RTR video recorder (recorder/player) shown in FIG. 29 increments C_EPI_Ns (FIG. 24) in movie cell general information M_C_GI by "1" (step ST312).

If no entry point enter request is input, C_EPI_Ns is set at "0".

Incrementing C_EPI_Ns by "1" means addition of one entry point information in a cell of a program whose recording (or playback) is underway. Hence, MPU 30 assures an area for movie cell entry point information (M_C_EPI) in movie cell information (M_CI).

Assume that the user has made a text input or the recorder/player has given closed caption data or the like of a broadcast program, air-check of which is underway, as a text input within a predetermined period of time (e.g., within 30 sec) after that (YES in step ST314).

Note that the text input is not limited to a character input but includes an operation result input when the user has selected a menu item or has clicked a mouse button.

MPU 30 sets "1" in entry point type EP_TY in movie cell entry point information M_C_EPI (step S316). EP_TY="1" indicates that M_C_EPI includes primary text information PRM_TXTI.

Subsequently, MPU 30 reads the current count value of STC 38 and writes the read value in entry point playback time EP_PTM (FIG. 25) in M_C_EPI (step ST320).

Furthermore, MPU 30 reads the current time (year, month, day, hour, minute, and second) from timepiece unit 40, and writes the read value in an information date (FIG. 25) in primary text information PRM_TXTI in M_C_EPI (step ST322).

After that, MPU 30 writes the following attribute data (one of 0 to 7) in information type [1] in primary text information PRM_TXTI (step ST324):

information type [1]=0, user mark (the user enters an entry point)

information type [1]=1; set mark (the recorder/player enters an entry point)

information type [1]=2; defect start mark information type [1]=3; defect end mark information type [1]=4; presentation start mark information type [1]=5; presentation end mark information type [1]=6; erasure prohibition mark information type [1]=7; another mark (e.g., an instruction from other than the user or recorder/player).

Note that [1] in information type [1]-means the first data field of the information type. If this data field has a 3-bit configuration, information type [1] can express eight different attributes; if it has an 8-bit-configuration, 256 different attributes.

More specifically, when the user requests enter of an entry point, information type [1]=0; when the recorder/player, i.e., the RTR video recorder set requests enter of an entry point, information type [1]=1.

Information type [1]=2 is set for a defect start mark (to be described later), and information type [1]=3 is set for a defect end mark.

Also, information type [1]=4 is set for a presentation start mark (to be described later), and information type [1]=5 is set for a presentation end mark.

Information type [1]=6 is set for an erasure prohibition mark (to be described later).

Furthermore, information type [1]=7 is set when the entry point enter request is sent from a broadcast station during recording of a broadcast program or is sent from a communication partner during downloading of digital video data via a communication line.

If no text input is made for the entry point in the entry point enter process (NO in step ST314), "0" is set in EP_TY (step ST318).

MPU 30 sets "0" in EP_TY in movie cell entry point information M_C_EPI (step ST316). EP_TY="0" indicates that primary text information PRM_TXTI in M_C_EPI is empty.

In this case, MPU 30 sets PTS in EP_PTM (step ST330), and sets predetermined contents in information type [1] in PRM_TXTI (step ST324), thus ending the entry point enter process.

FIG. 33 is a flow chart for explaining an example of an automatic entry point enter process (for entering entry points at given time intervals) in the RTR video recorder shown in FIG. 29.

In this process, entry points are automatically entered at prescribed time intervals (without interrupting recording) irrespective of the contents of video picture or audio data to be recorded.

Before the start of recording, the user executes an initial setting process. That is, the user sets a numerical value of parameter a which designates the entry point enter interval in units of minutes, and index parameter n is preset to "1" (step ST200).

If the user does nothing, a predetermined default value (for example, a=5 indicating 5-min intervals, a=0 that prohibits entry points from being automatically entered, or the like) is selected, and n is preset to "1".

If recording is started after the initial setting process at the start of recording, the process for entering entry points at prescribed intervals is executed at, e.g., the timing of step ST25 in FIG. 30.

That is, STC indicating an elapse of recording time is compared with a (n(5400000 (corresponding to an minutes when 90-kHz clocks are used) (step ST250).

If an minutes (initially, an=5 min) have not elapsed yet after the start of recording (NO in step ST250), the control returns to the record process in step ST23 in FIG. 30.

If an minutes (an=5 min) have elapsed after the start of recording (YES in step ST250), the entry point enter process with the contents that have been explained with reference to, e.g., FIG. 32 is executed (step ST31).

If the entry point at that time (when 5 minutes have elapsed after the start of recording) has been entered, index parameter n is incremented by "1" (step ST252), and the control returns to the record process in step ST23 in FIG. 30.

If an minutes (next, an=10 min) have not elapsed yet after the start of recording (NO in step ST250), the control returns to the record process in step ST23 in FIG. 30.

If an minutes (an=10 min) have elapsed after the start of recording (YES in step ST250), the entry point enter process with the contents that have been explained with reference to, e.g., FIG. 32 is executed (step ST31).

The aforementioned processes are repeated-until recording is completed. As a result, when a television broadcast program for 54 min is recorded, 10 entry points are automatically recorded at 5-min intervals.

Note that the RTR video recorder automatically enters entry points at the start of recording, at the end of recording, at the pause of recording, at the start of playback, at the end of playback, at the pause of playback, upon switching video picture data to be recorded, upon switching video audio data to be recorded, and so forth, in addition to the aforementioned process for entering entry points at given time intervals irrespective of recorded contents.

For example, whether or not the audio level of the recording source has changed (whether or not a predetermined audio level or lower continues for a predetermined period of time) is detected, and an entry point can be automatically entered at that detection position.

Alternatively, a scene change is detected from a change in MPEG video data in the recording source (when the image contents have changed drastically due to a scene change, since the moving picture compression ratio lowers, the buffer capacity in an MPEG encoder is consumed abruptly within a short period of time), and an entry point can be automatically entered at that detection position.

Figure 34:
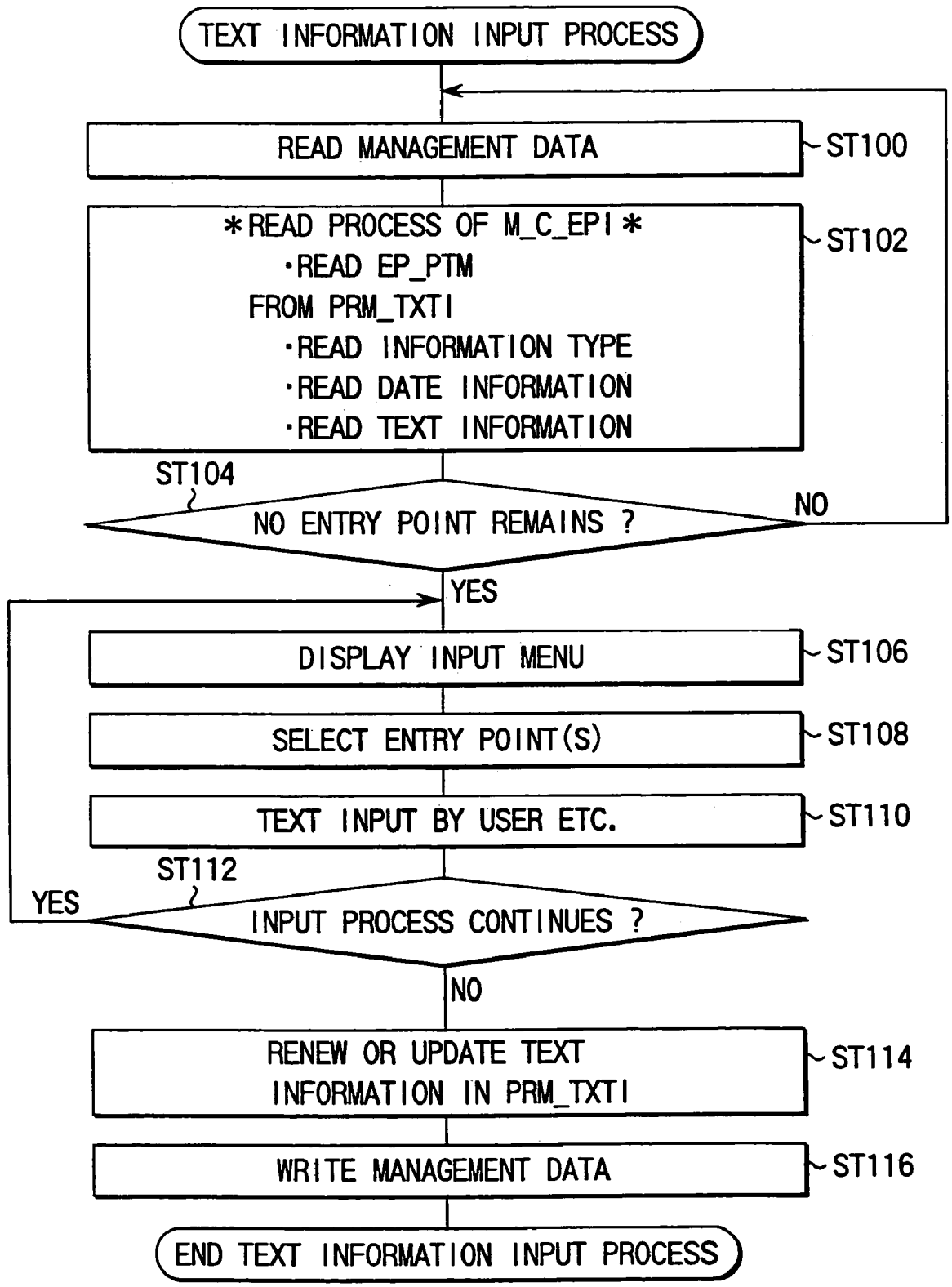
FIG. 34 is a flow chart for explaining an example of a text information input process in the apparatus shown in FIG. 29.

FIG. 34 is a flow chart for explaining an example of the text information input process in the RTR video recorder shown in FIG. 29.

MPU 30 reads management data (RTR_VMG and the like in FIGS. 5 and 6) from disc 10 (step ST100). As a result of reading this data, MPU 30 can detect the play list information contents (FIGS. 8 to 11), PGC information contents (FIGS. 19 to 21), and contents of movie cell information M_CI (FIGS. 23 to 25), as needed.

MPU 30 reads the contents of movie cell entry point information M_C_EPI of all the entry points from the read management data (step ST102).

More specifically, MPU 30 selectively extracts entry points with entry point type EP_TY="01b" (with primary text information PRM_TXTI) from M_C_EPI (FIG. 25) of the individual entry points. Then, MPU 30 reads entry point playback time EP_PTM and primary text information PRM_TXTI from the entry point information with PRM_TXTI. Furthermore, MPU 30 reads the information type, information date, and text information of that entry point from read PRM_TXTI.

This M_C_EPI read process is repeated if unprocessed entry points still remain (NO in step ST104).

If all entry points have undergone the M_C_EPI read process (YES in step ST104), MPU 30 outputs input menu information to the monitor on the basis of the read contents (step ST106).

Figure 35:
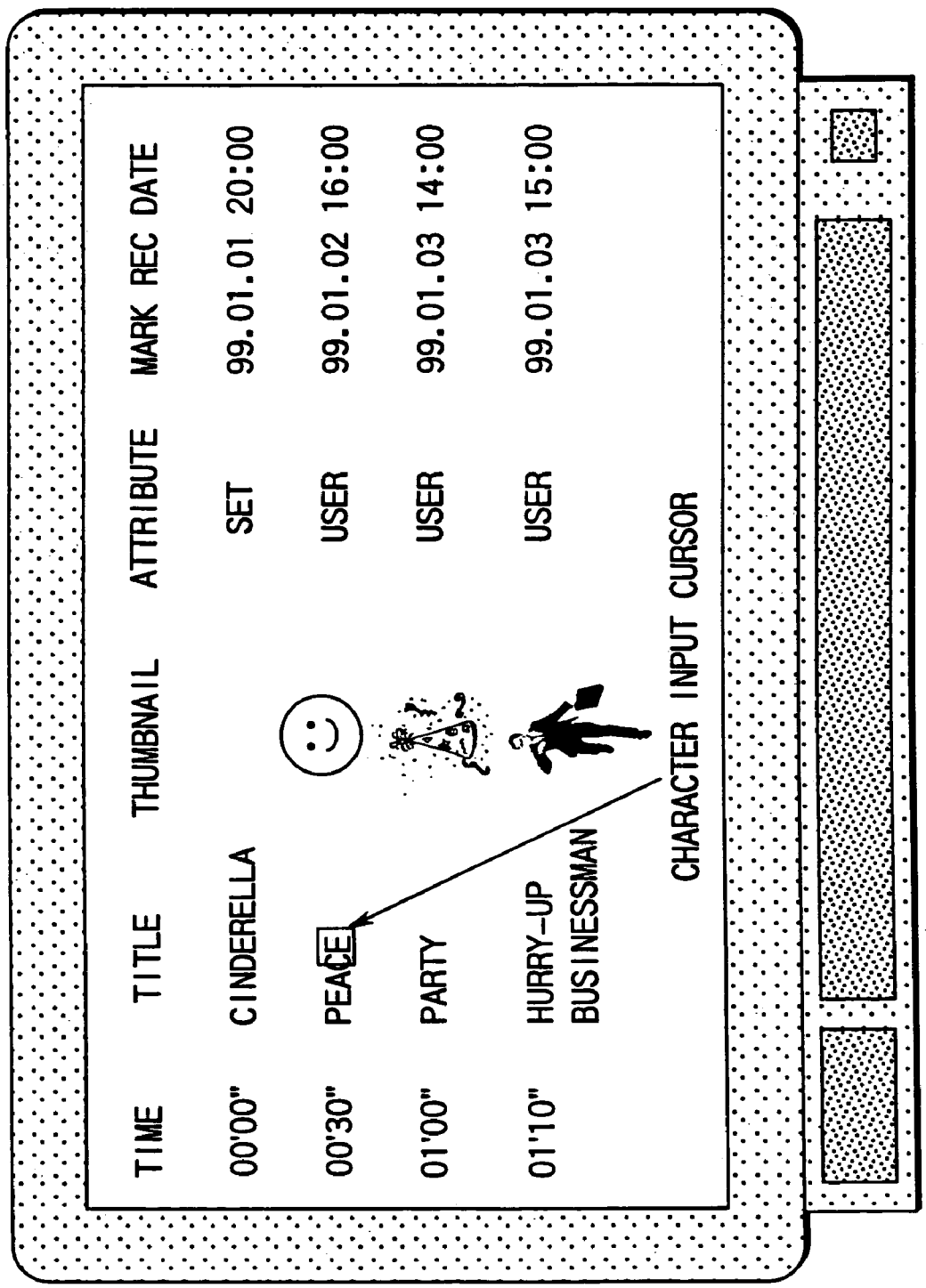
FIG. 35 shows an example of a text information input window in the text information input process shown in FIG. 34.

In this input menu, for example, as shown in FIG. 35, playback times (hour, minute) based on EP_PTM, titles based on text information in PRM_TXTI, thumbnail images based on THM_PTRI (FIG. 10), attributes based on the information types in PRM_TXTI, and mark recording dates (year, month, day, hour, minute, and second) based on the information dates in PRM_TXTI are displayed while being categorized in units of items and are sorted in the order of playback times (or recording times).

The user moves the cursor to a predetermined line position of a title field in the menu using the cursor keys of a remote controller (not shown), an optional keyboard, or the like, and selects an entry point or points which is or are to undergo text input (step ST108). In this manner, the user can input desired text to a target entry point or points by operating the remote controller or keyboard (step ST110).

The aforementioned text input is done for all the entry points the user wants (YES in step ST112, ST106 to ST110).

If the text input is complete for all the entry points the user wants (NO in step ST112), text information (FIG. 25) in PRM_TXTI of M_C_EPI is updated to the contents exemplified in FIG. 35 (step ST114), and the updated data is written in a predetermined area of the management data (RTR_VMG) (step ST116).

In this fashion, the user inputs his or her desired text information or the like to an entry point or points he or she wants, and the input contents are entered in disc 10 (FIG. 1).

Figure 36:
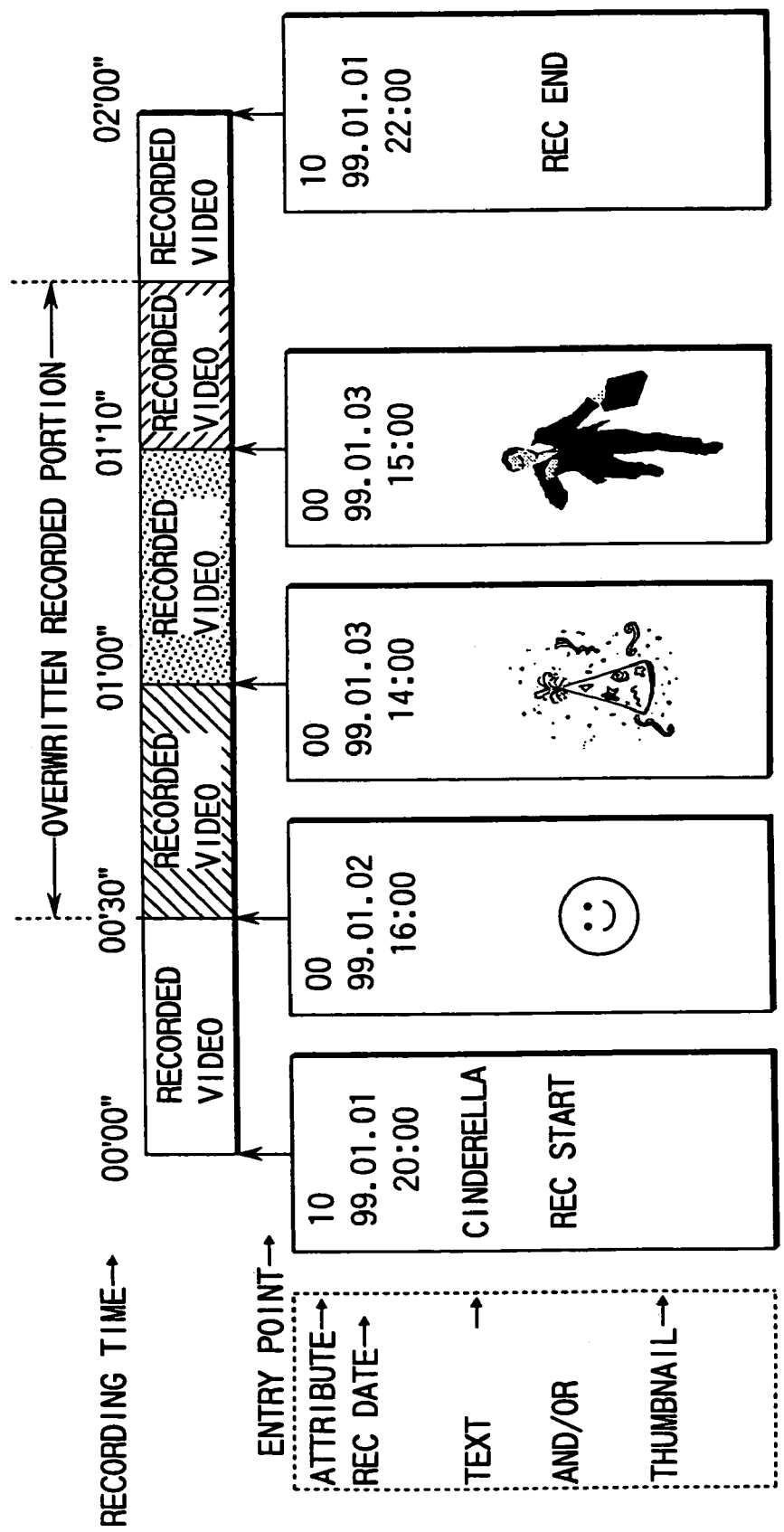
FIG. 36 is a view for explaining an example of the relationship among recorded video data, entry points, and information (attribute, recording date and the like) of the recorded video data in an optical disc recorded by the apparatus shown in FIG. 29.

FIG. 36 depicts a state wherein information exemplified in FIG. 35 has been entered in disc 10 by the processes shown in FIG. 34.

Referring to FIG. 36, attribute "10" of an entry point at the start of recording (recording time 00'00") and attribute "10" of an entry point at the end of recording (recording time 02'00") indicate that the RTR video recorder has automatically entered entry points. Note that the recording date is written on the basis of time data from timepiece unit 40 in FIG. 29, and text "Cinderella" is extracted from closed caption data at the beginning of a broadcast program (broadcast with text) and is automatically written.

Entry points at three positions of recording times 00'30", 01'00", and 01'10" of the disc indicate overwritten recorded portions in the middle of the recorded program "Cinderella" by user operations. For this reason, the attributes of these entry points are "00" indicating the user mark, and their recording dates are largely different from that of "Cinderella".

At each entry point entered by the user, an image (obtained by reducing the I-picture of MPEG at that position is extracted as a thumbnail, which is entered in THM_PTRI of play list search pointer PL_SRP (FIG. 10) as one entry point data.

Figure 37:
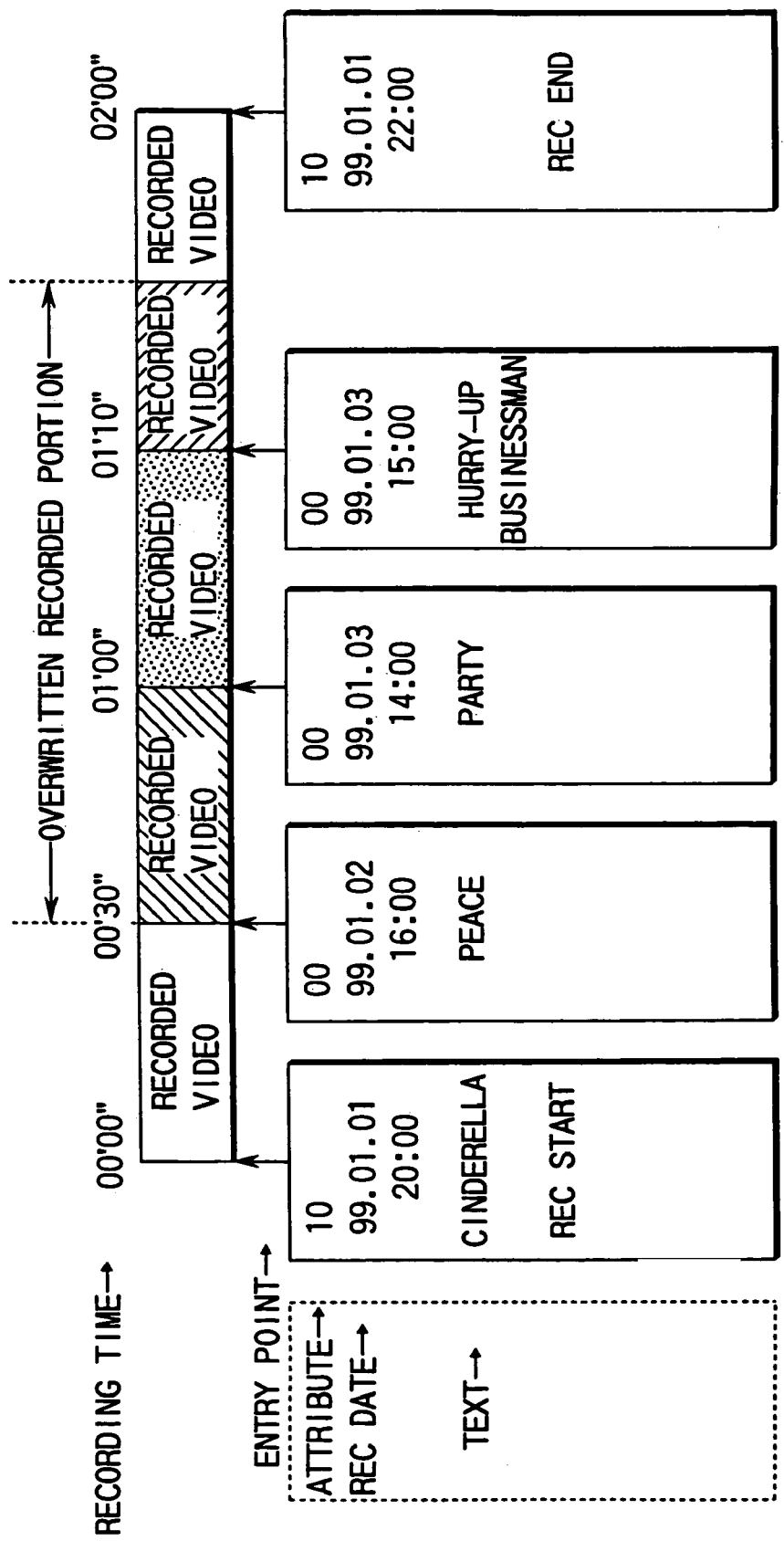
FIG. 37 is a view for explaining another example of the relationship among recorded video data, entry points, and information (attribute, recording date, and the like) of the recorded video data in an optical disc recorded by the apparatus shown in FIG. 29.

FIG. 37 exemplifies a case wherein the user inputs text at each entry point in place of the thumbnails entered, as shown in FIG. 36, and text information is entered in PRM_TXTI (FIG. 25) of movie cell entry point information M_C_EPI.

Figure 38:
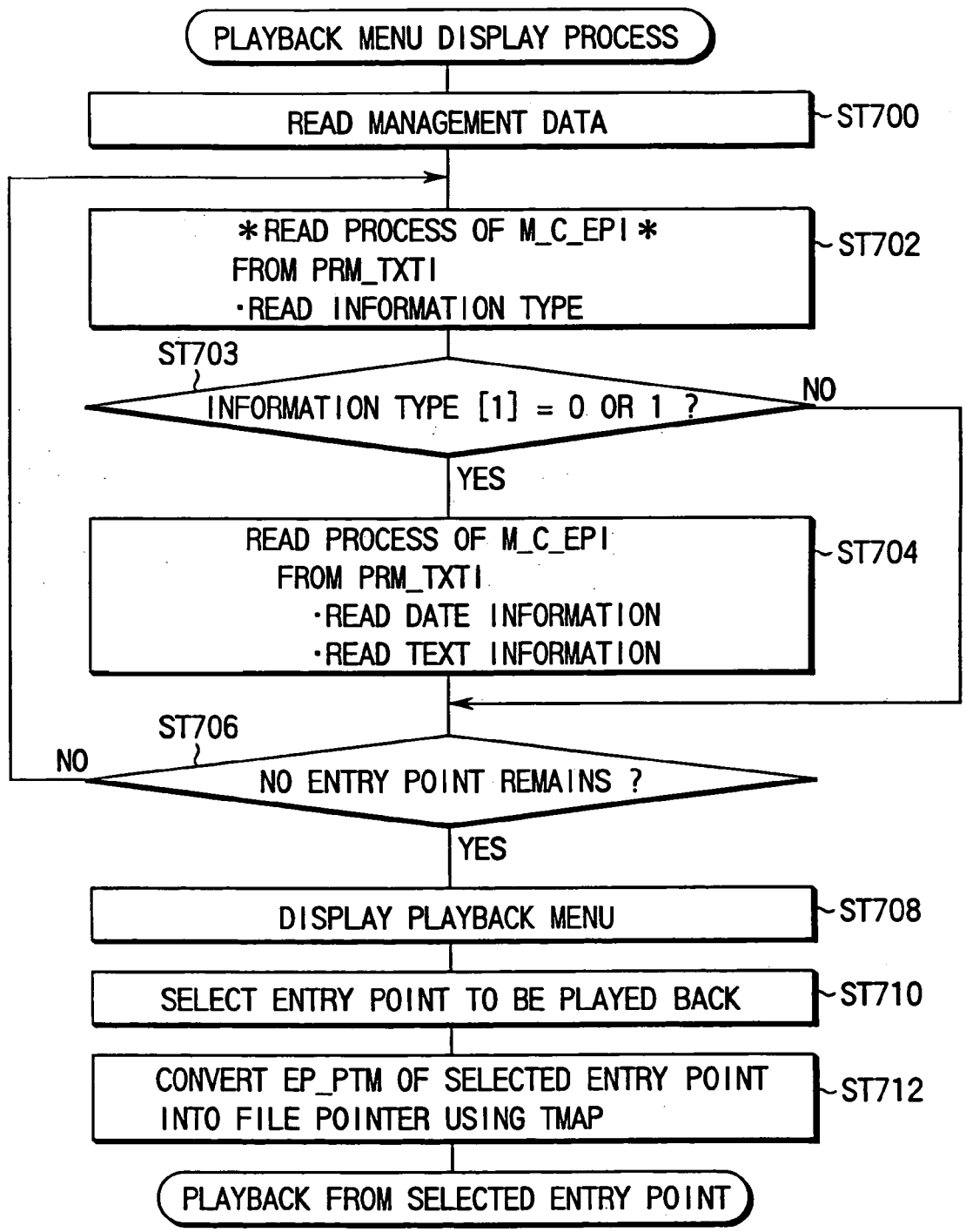
FIG. 38 is a flow chart showing an example of a playback menu display process in the apparatus shown in FIG. 29.

FIG. 38 is a flow chart for explaining an example of the playback menu display process in the RTR video recorder shown in FIG. 29.

MPU 30 reads management data (RTR_VMG and the like) from disc 10 (step ST700). As a result of reading this data, MPU 30 can detect the play list information contents (FIGS. 8 to 11), PGC information contents (FIGS. 19 to 21), and contents of movie cell information M_CI (FIGS. 23 to 25), as needed.

MPU 30 reads the contents of movie cell entry point information M_C_EPI of all the entry points from the read management data (step ST702).

More specifically, MPU 30 selectively extracts entry points with entry point type EP_TY="01b" (with primary text information PRM_TXTI) from M_C_EPI (FIG. 25) of the individual entry points. Then, MPU 30 reads primary text information PRM_TXTI, and information [1] of that entry point.

The description contents of this information type [1] are:
information type [1]=0; user mark (the user enters an entry point)
information type [1]=1; set mark (the recorder/player enters an entry point)
information type [1]=2; defect start mark
information type [1]=3; defect end mark
information type [1]=4; presentation start mark
information type [1]=5; presentation end mark
information type [1]=6; erasure prohibition mark
information type [1]=7; another mark (e.g., an instruction from other than the user or recorder/player).

If read information type [1] is "0" (user mark) or "1" (set mark) (YES in step ST703), MPU 30 further reads the information date and text information from primary text information PRM_TXTI (step ST704).

If read information type [1] is neither "0" nor "1" (NO in step ST703), the control skips step ST704.

The M_C_EPI information read process (ST702 to ST704) is repeated if unprocessed entry points still remain (NO in step ST706).

By repeating this process, MPU 30 can fetch all pieces of movie cell information at entry points of the user marks or set marks.

If all entry points have undergone the M_C_EPI read process (YES in step ST706), MPU 30 outputs playback menu information to the monitor on the basis of the read contents (step ST708).

Figure 39:
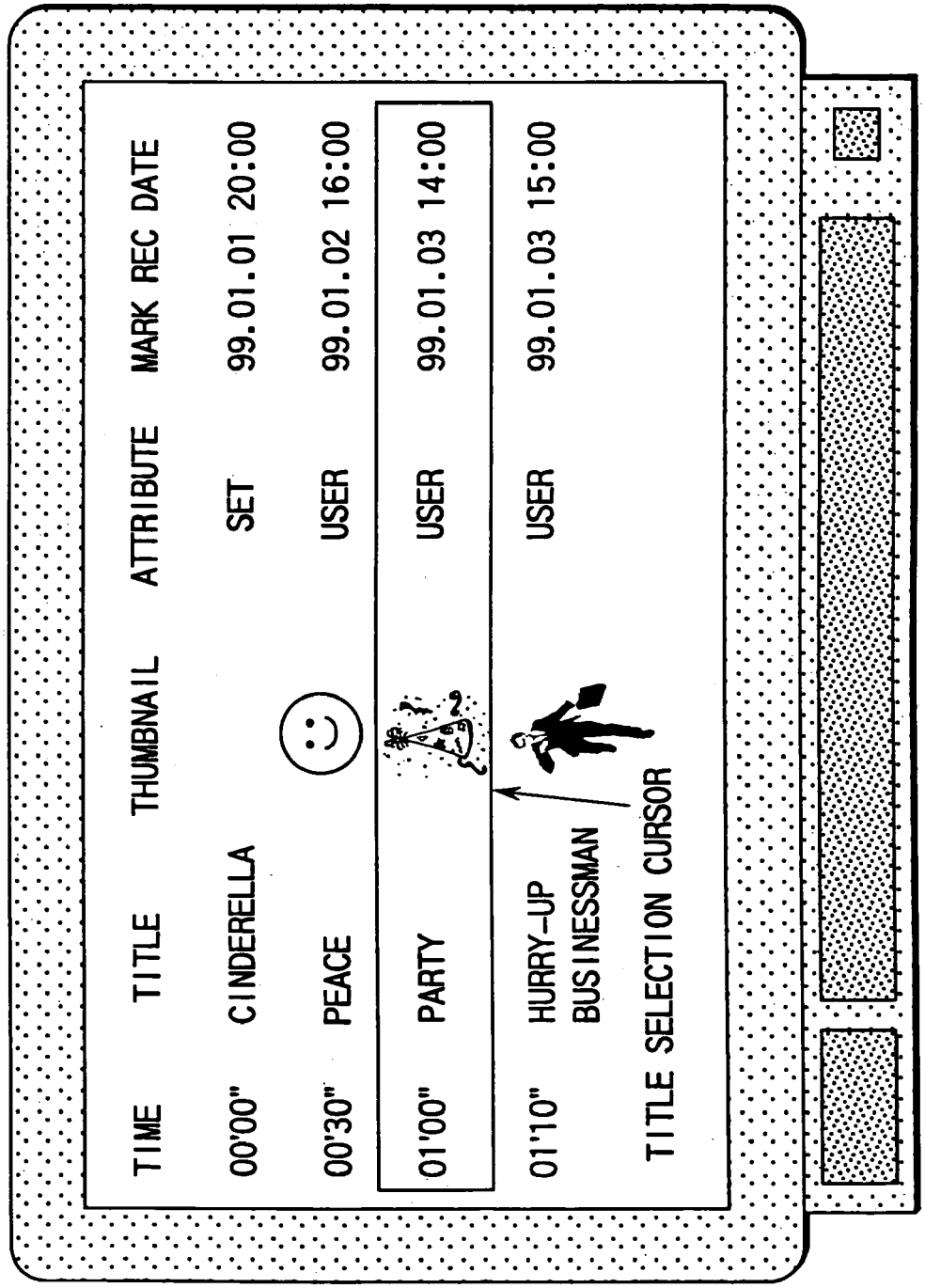
FIG. 39 shows an example of a playback menu display window in the playback menu display process shown in FIG. 38.

In this playback menu, for example, as shown in FIG. 39, playback times (hour, minute) based on EP_PTM, titles based on text information in PRM_TXTI, thumbnail images based on THM_PTRI (FIG. 10), attributes based on the information types in PRM_TXTI, and mark recording dates (year, month, day, hour, minute, and second) based on the information dates in PRM_TXTI are displayed while being categorized in units of items and are sorted in the order of playback times (or recording times).

The user moves a title select cursor to a desired line position in the playback menu by operating the cursor keys of a remote controller (not shown) and selects an entry point to be played back (step ST710).

MPU 30 converts the entry point playback time value of the selected entry point into a corresponding file pointer on the basis of time map information (FIGS. 14 to 16) (step ST712). Using this file pointer, the entry point playback time value is converted into a physical address (VOBU address) by the file system, thus starting playback.

Figure 40:
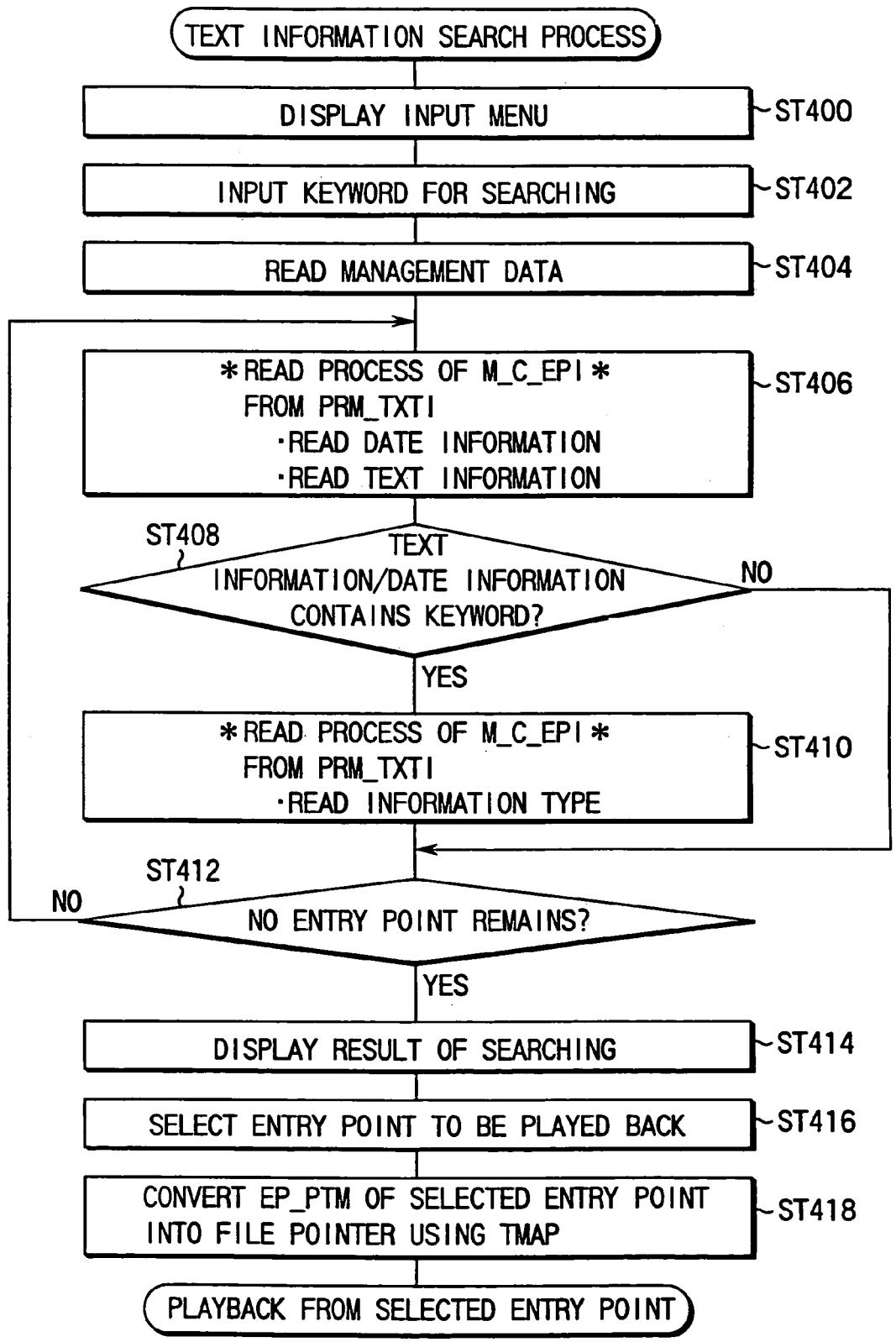
FIG. 40 is a flow chart for explaining an example of a text information search process in the apparatus shown in FIG. 29.

FIG. 40 is a flow chart for explaining an example of the text information search process in the RTR video recorder shown in FIG. 29.

MPU 30 executes a process for displaying the playback menu used to input a search keyword (step ST400).

This playback menu for search is used when the user inputs a keyword upon searching information recorded in M_C_EPI (FIG. 25) of respective entry points.

Figure 41:
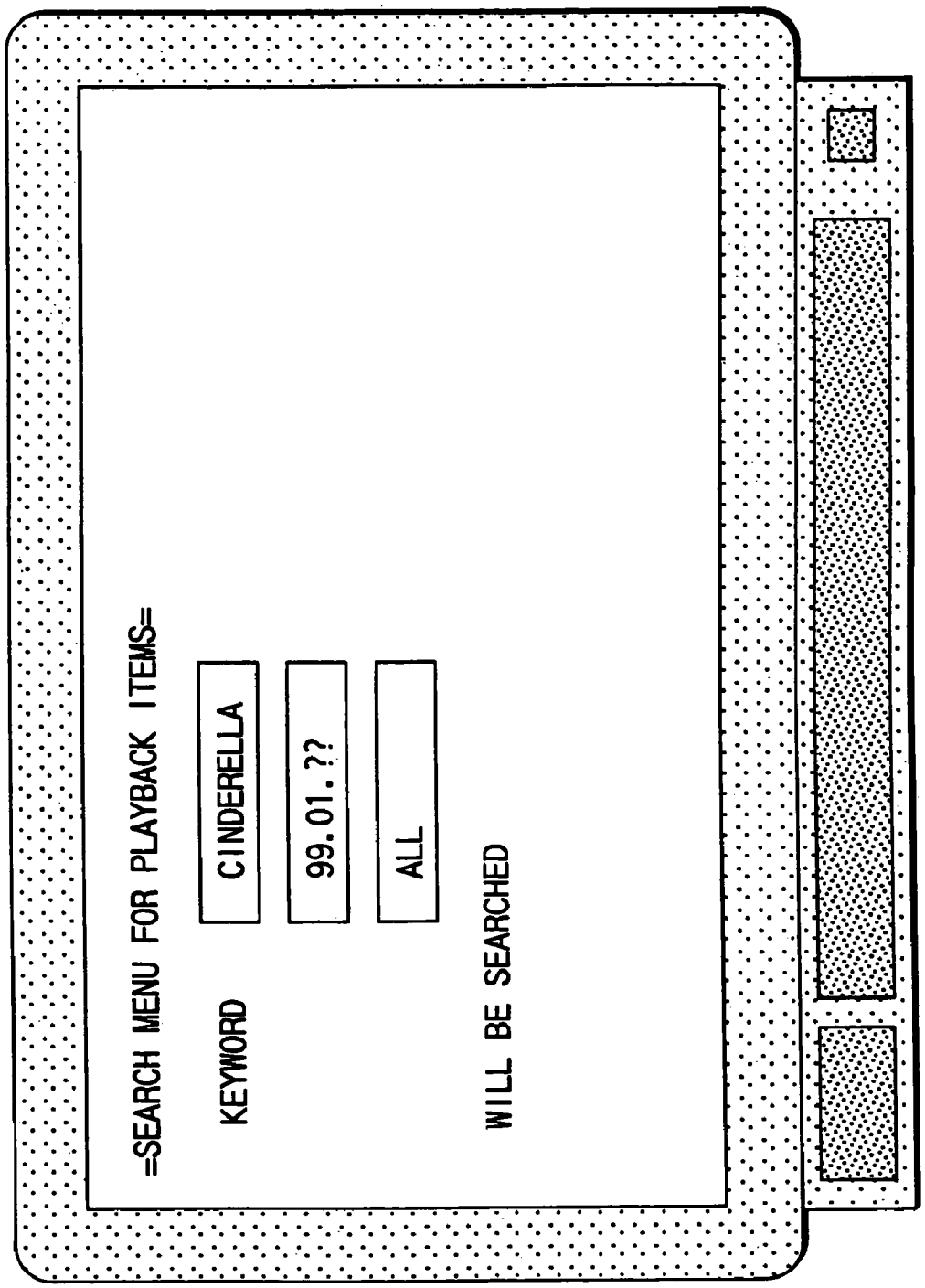
FIG. 41 shows an example of a search keyword input window in the text information search process shown in FIG. 40.

For example, assume that the user inputs search keywords to search for all entry points which include a character string "Cinderella" in their titles and were marked on January 1999 (step ST402), as shown in FIG. 41.

MPU 30 reads management data (RTR_VMG) from disc 10, and acquires the contents of movie cell information M_CI of all the recorded entry points (step ST404).

MPU 30 then extracts M_C_EPI from the acquired information, and reads the information date and text information from PRM_TXTI (FIG. 25) in that information (step ST406).

MPU 30 searches based on the keywords (to search for entry points which include a character string "Cinderella" and were marked on January 1999) set by the user.

As a result, if an entry point that is a match to the keywords is found (YES in step ST408), MPU 30 reads information type [1] of that entry point from PRM_TXTI of the entry point (step ST410).

The description contents of this information type [1] are:
information type [1]=0; user mark (the user enters an entry point)
information type [1]=1; set mark (the recorder/player enters an entry point)
information type [1]=2; defect start mark
information type [1]=3; defect end mark
information type [1]=4; presentation start mark
information type [1]=5; presentation end mark
information type [1]=6; erasure prohibition mark
information type [1]=7; another mark (e.g., an instruction from other than the user or recorder/player).

Based on the contents of read information type [1], entry points with information type [1] other than "1" can be excluded from the search results, and only entry points written by the RTR video recorder upon recording can be left as search results.

Alternatively, if read information type [1] is "2" (or 2X; X is an arbitrary integer value) or 3 (or 3X), a defect (e.g., ECC error correction failure upon playback or the like) is present at the recording position of the cell corresponding to that entry point, and such entry point can be excluded from search results in some cases.

If the search is complete and no entry point to be searched remains (YES in step ST412), MPU 30 displays the search results on the monitor, as shown in, e.g., FIG. 42 (step ST414).

MPU 30 converts the entry point playback time value of each entry point found by search into a corresponding file pointer on the basis of time map information (in FIGS. 14 to 16) (step ST418). Using this file pointer, the entry point playback time value can be converted into a physical address (VOBU address) by the file system, and only an entry point mark portion found by search can be selectively played back.

Figure 43:
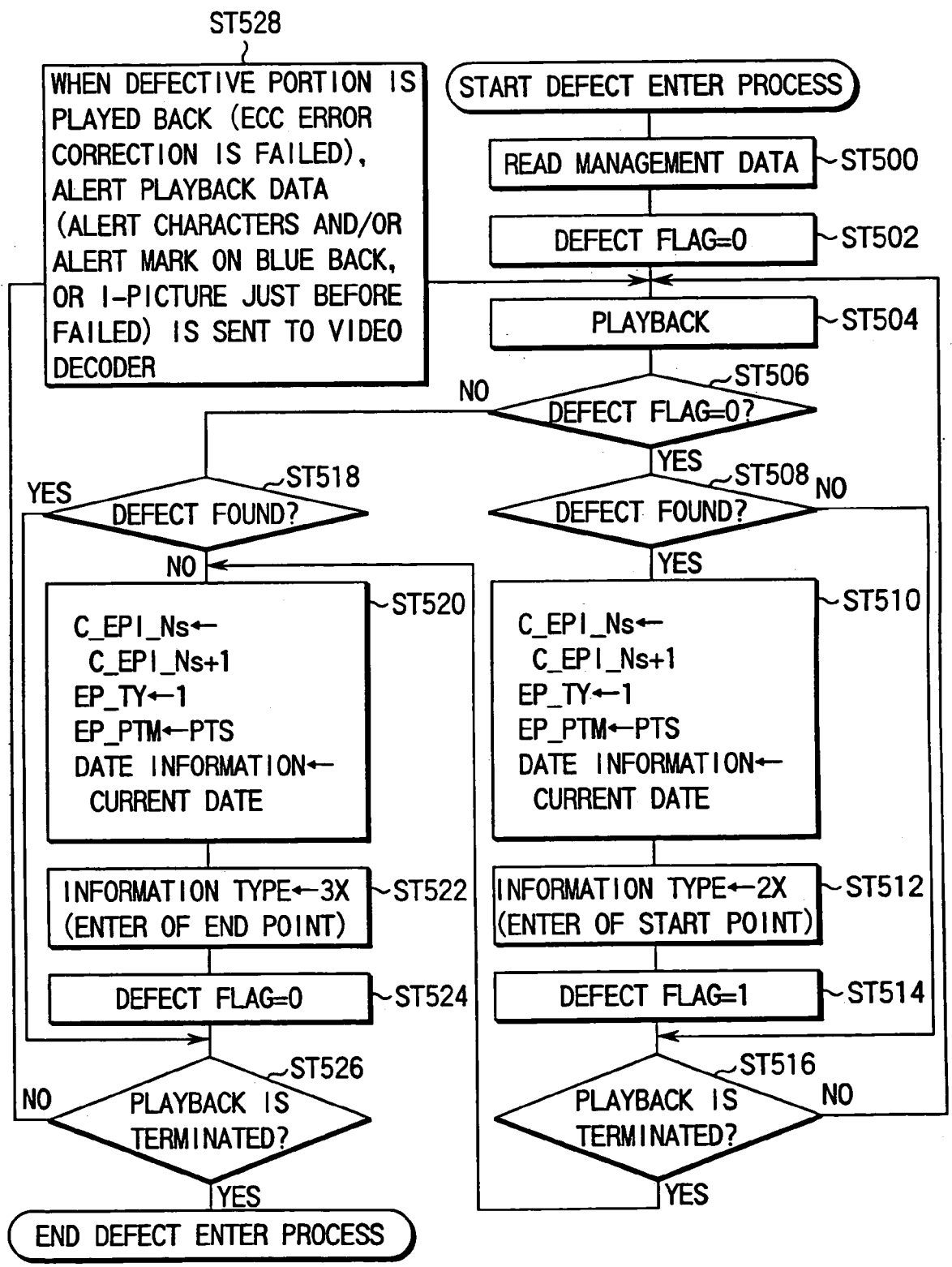
FIG. 43 is a flow chart for explaining an example of a defect enter process in the apparatus shown in FIG. 29.

FIG. 43 is a flow chart for explaining an example of the defect enter process in the RTR video recorder shown in FIG. 29.

This defect enter process is executed, for example, when the user wants to check an old disc.

MPU 30 reads management data (RTR_VMG) (step ST500), and resets a defect flag to "0" (step ST502).

This defect flag can be set in a given field of the internal RAM or register of MPU 30.

Then, MPU 30 plays back disc 10 (step ST504). This playback process is the same as that in step ST46 in FIG. 31.

Initially, the defect flag is "0" (YES in step ST506). During playback, if no defect (ECC error correction failure) is found (NO in step ST508), and playback is not terminated (NO in step ST516), playback is normally continued (loop of steps ST504 to ST516).

If any defect (ECC error correction failure) is found during playback (YES in step ST508), MPU 30 increments the number C_EPI_Ns (FIG. 24) of pieces of cell entry point information by "1", sets "1" in entry point type EP_TY (FIG. 25), sets PTS (FIG. 3) at that time in entry point playback time EP_PTM (FIG. 25), and sets current date (date data from timepiece unit 40) in the information date (FIG. 25) in primary text information PRM_TXTI (step ST510).

Then, MPU 30 sets 2X (X is an arbitrary integer value) in the information type in primary text information PRM_TXTI (step S512). With this information type set with 2X, the defect start point is entered.

If a defect is found for the first type, 2X of information type is set to be "20". If the second defect is found, 2X=21; if the third defect is found, 2X=22.

Upon completion of entering of the defect start points, MPU 30 sets the defect flag at "1" (step ST514).

If playback is not terminated (NO In step S516), playback continues (step ST504).

Since the defect flag is set at "1" immediately before continuation of playback (NO in step ST506), the control enters another processing loop in turn.

The presence/absence of defects (the presence/absence of ECC error correction failures) is checked. If a defect still continues to be detected (YES in step ST518), and playback is not terminated (NO in step S526), MPU 30 transfers data that informs the user that playback of a defective portion is in progress to video decoder 64. Then, alert characters or mark "playback of defective portion now in progress" are displayed on the blue back on the monitor screen (not shown) (step ST528). Alternatively, if I-picture data (free from any defect) immediately before the defect flag is set at "1" remains on a video buffer (not shown) of decoder unit 60, that I-picture data may be transferred to video decoder 64 for the purpose of informing the user that playback of a defective portion is in progress.

If the defect disappears after the defect flag is set at "1" (ECC error correction has succeeded)., that position corresponds to the end point of the defective portion.

If playback of the defective portion comes to an end, and ECC error correction recovers normal function (NO in step ST518), MPU 30 increments the number C_EPI_Ns (FIG. 24) of pieces of cell entry point information by "1", sets "1" in entry point type EP_TY (FIG. 25), sets PTS (FIG. 3) at that time in entry point playback time EP_PTM (FIG. 25), and sets current date (date data from timepiece unit 40) in the information date (FIG. 25) in primary text information PRM_TXTI (step ST520).

MPU 30 then sets 3X (X is an arbitrary integer value) in the information type (FIG. 25) in primary text information PRM_TXTI (step ST522). With the information type set with 3X, the defect end point is entered.

If a defect is found for the first type, 3X of information type is set to be "30". If the second defect is found, 3X=31; if the third defect is found, 3X=33.

Note that 2X (20, 21, 22, . . . ) in step S512 is paired with 3X (30, 31, 32, . . . ) in step ST522. More specifically, a pair of information types "20" and "30" are assigned to the first defect as those of the entry points of the defect start and end points.

Upon completion of entering of the defect end point, MPU 30 resets the defect flag to "0" (step ST524).

After that, if playback is not terminated (NO in step S526), playback continues (step ST504).

Since the defect flag is "0" in this case, the loop of steps ST504 to ST516 is executed until a new defective portion begins to be played back.

If playback is terminated without any defects (NO in step ST508, YES in step ST516), no information type=2X is entered, and only an information type=3X is entered (step ST522). In this case, entry points do not form any pairs mentioned above. This record shows that no defect is found during playback of the disc.

Figure 44:
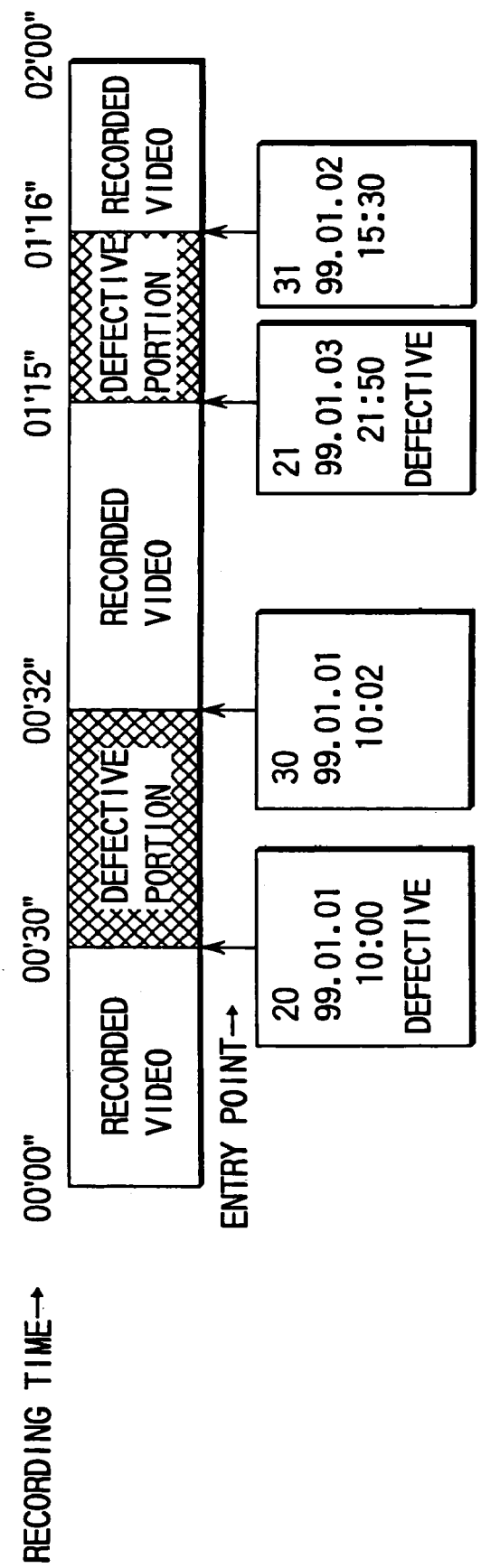
FIG. 44 is a view for explaining an example of the relationship between defective portions of recorded video data detected by the process shown in FIG. 43, and entry points.

FIG. 44 shows an example of entry points when two defects are found by the process shown in FIG. 43.

Figure 45:
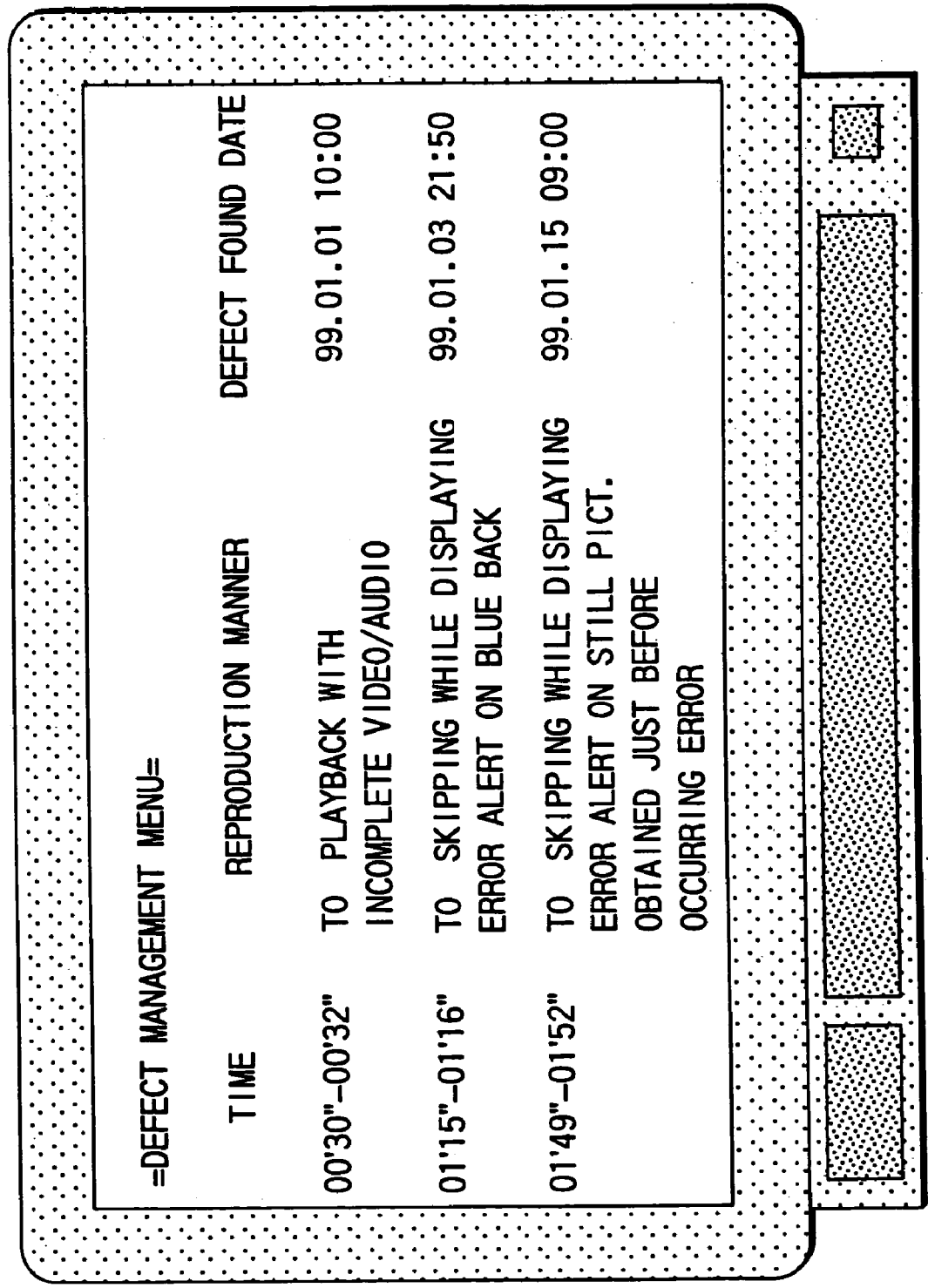
FIG. 45 shows a display example of defective portions of recorded video data detected by the process shown in FIG. 43, and their reproduction manners.

If the defect positions of the disc of interest can be detected beforehand based on pairs of information types (contents of PRM_TXTI in FIG. 25) entered in steps ST512 and ST522 in FIG. 43, how to play back such defective portions can also be determined. Hence, a menu that prompts the user to select a defective portion reproduction manner is needed. FIG. 45 shows an example of such defect management menu.

More specifically, even when the disc of interest has a defect, and suffers many MPEG block noise components (or digital audio data is distorted and sometimes discontinued), if the user wants to play back to confirm the contents of that portion, he or she can select a reproduction manner "incomplete video playback".

When a defect is disagreeable to see, the user can select a reproduction manner "skip that portion, and display alert on blue back on monitor".

Alternatively, in place of alert display on the blue back, the user may select a reproduction manner "display alert while displaying still image of I-picture immediately before error has occurred as background image".

The data that pertain to the reproduction manners can be entered anywhere (e.g., as a kind of information type) in M_C_EPI in FIG. 25.

Figure 46:
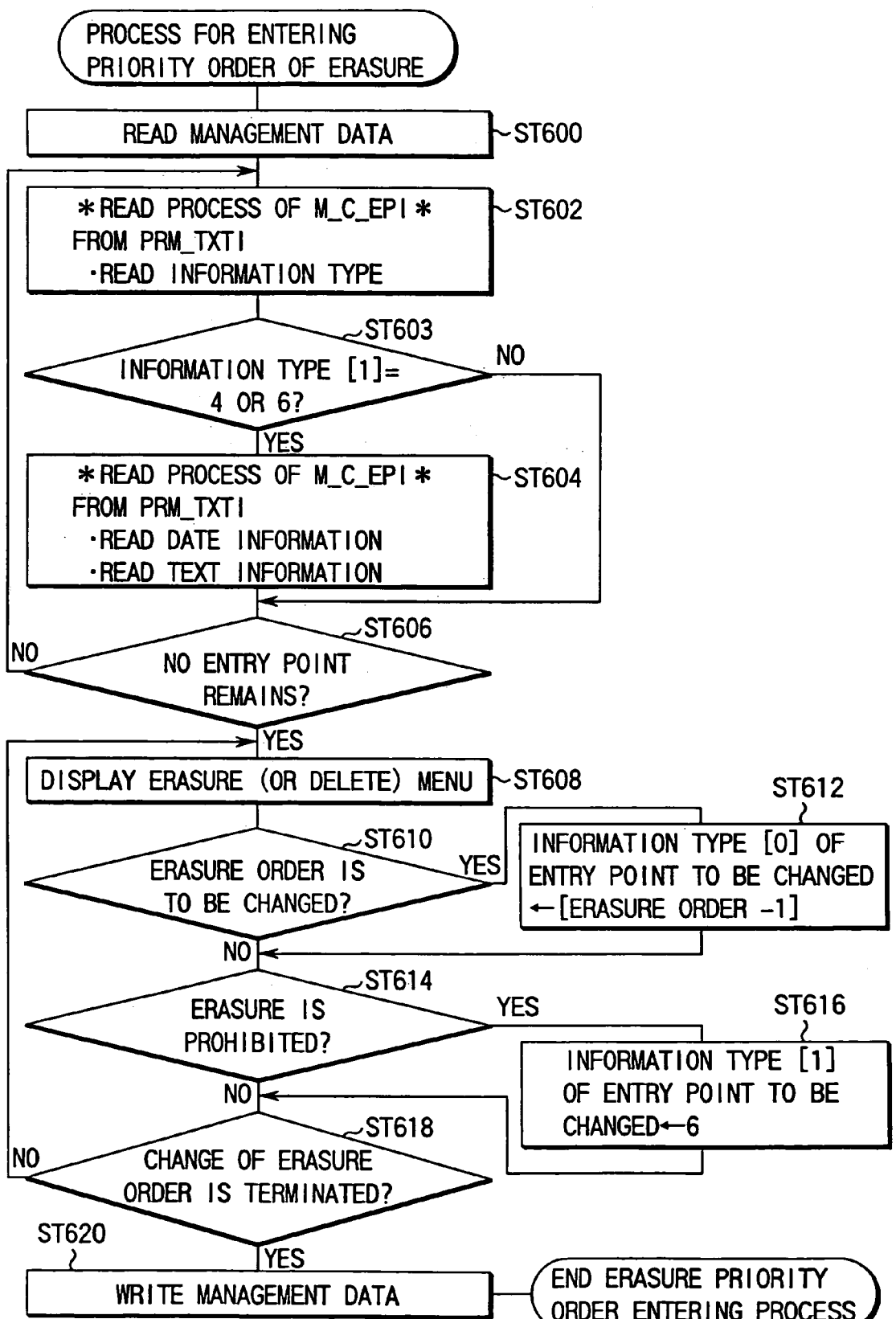
FIG. 46 is a flow chart for explaining an example of a process for entering the priority order of erasure in the apparatus shown in FIG. 29.

FIG. 46 is a flow chart for explaining an example of the process for entering the priority order of erasure in the RTR video recorder shown in FIG. 29. MPU 30 reads management data (RTR_VMG and the like) from disc 10 (step ST600). As a result of reading this data, MPU 30 can detect the play list information contents (FIGS. 8 to 11), PGC information contents (FIGS. 19 to 21), and contents of movie cell information M_CI (FIGS. 23 to 25), as needed.

MPU 30 reads the contents of movie cell entry point information M_C_EPI of all the entry points from the read management data (step ST602).

More specifically, MPU 30 selectively extracts entry points with entry point type EP_TY="01b" (with primary text information PRM_TXTI) from M_C_EPI (FIG. 25) of the individual entry points. Then, MPU 30 reads primary text information PRM_TXTI, and information [1] of that entry point.

The description contents of this information type [1] are: information type [1]=0, user mark (the user enters an entry point)

information type [1]=1; set mark (the recorder/player enters an entry point)

information type [1]=2; defect start mark
information type [1]=3; defect end mark
information type [1]=4; presentation start mark
information type [1]=5; presentation end mark
information type [1]=6; erasure prohibition mark
information type [1]=7; another mark (e.g., an instruction from other than the user or recorder/player).

If read information type [1] is "4" (presentation start mark) or "6" (erasure prohibition mark) (YES in step ST603), MPU 30 further reads the information date and text information from primary text information PRM_TXTI (step ST604).

If read information type [1] is neither "4" nor "6" (NO in step ST603), the control skips step ST604.

The M_C_EPI information read process (ST602 to ST604) is repeated if unprocessed entry points still remain (NO in step ST606).

By repeating this process., MPU 30 can fetch all pieces of movie cell information at entry points of the presentation start marks or erasure prohibition marks.

If all entry points have undergone the M_C_EPI read process (YES in step ST606), MPU 30 outputs erasure (or delete) menu information to the monitor on the basis of the read contents (step ST608).

Figure 48:
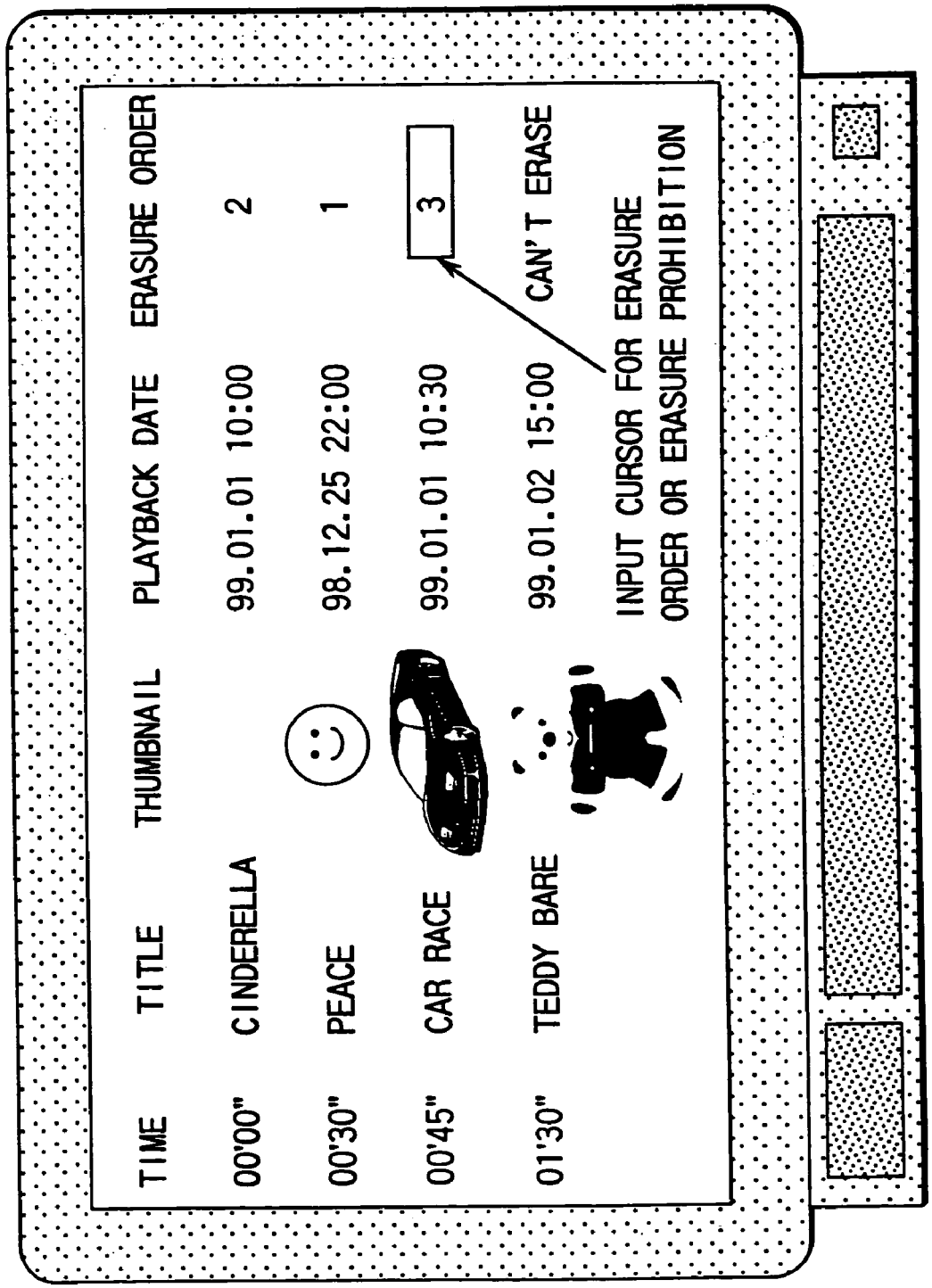
FIG. 48 shows a display example of information (recording time, title, thumbnail, last playback date, and the like) of recorded video data detected by the process shown in FIG. 46, and its order of erasure.

In this erasure menu, for example, as shown in FIG. 48, playback times (hour, minute) based on EP_PTM, titles based on text information in PRM_TXTI, thumbnail images based on THM_PTRI (FIG. 10), attributes based on the information types in PRM_TXTI, playback dates (year, month, day, hour, minute, and second) based on the information dates in PRM_TXTI, and the erasure order (or erasure prohibition marks) based on information type [0] of PRM_TXTI are displayed while being categorized in units of items and are sorted in the order of playback times (or recording times).

Figure 47:
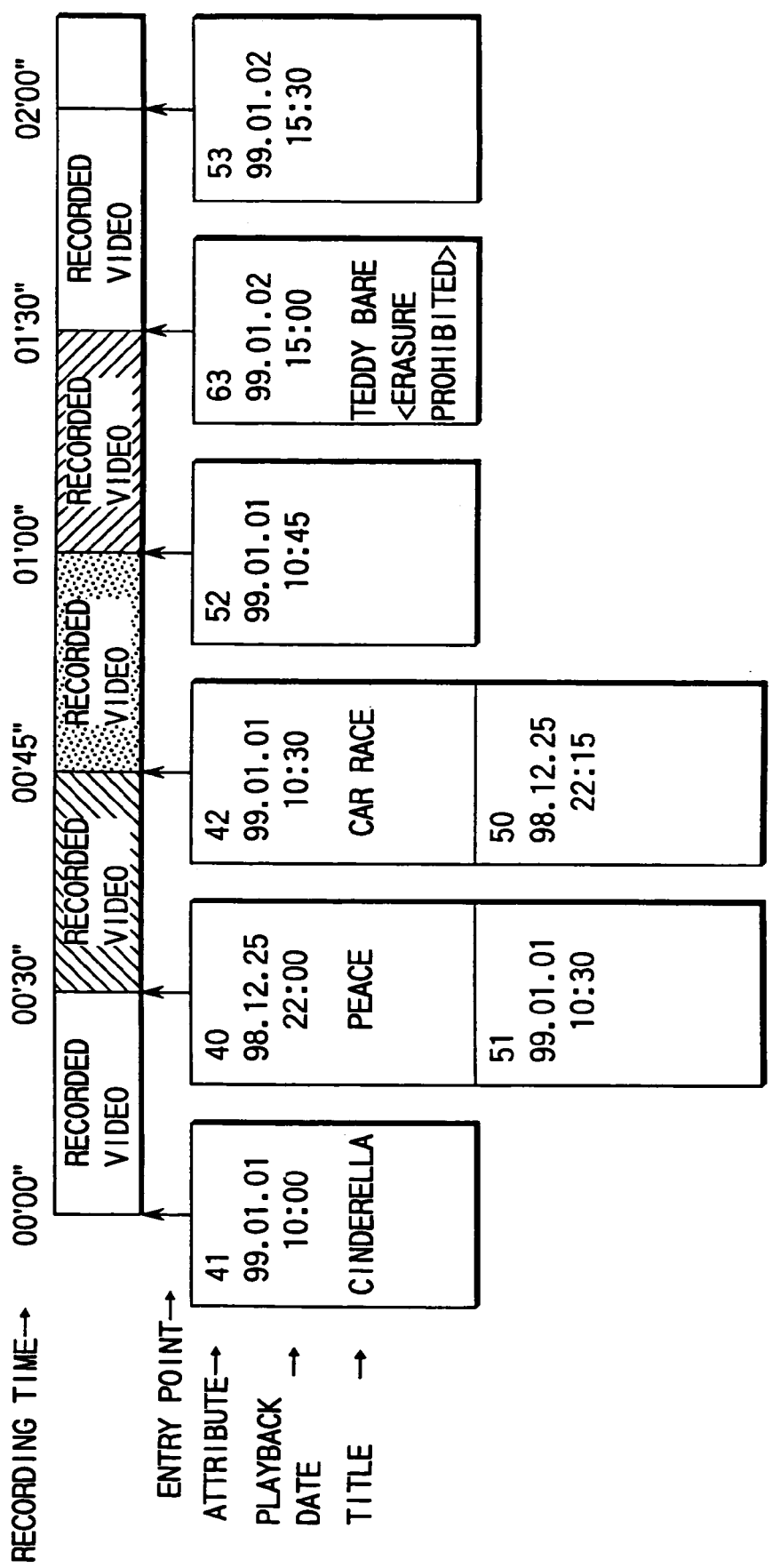
FIG. 47 is a view for explaining an example of the relationship among recorded video data, entry points, and information (attribute, recording date, and the like) of the recorded video data detected by the process shown in FIG. 46.

Note that a pair of information type [0]=4X (erasure start point) and information type [0]=5X (erasure end point) are set as information type [0], as exemplified in the attribute fields of entry points in FIG. 47.

In information type [0], identical values are written in turn from "0" in pairs of movie cell information, but the same value as that of another pair of movie cell information must not be written.

For example, in FIG. 47, a recorded video (recording time=15 min from 00'30" to 00'45") with a title "peace", which has a pair of entry point attributes (information type [0]) "40" and "50" has the first erasure order on the erasure menu in FIG. 48, if the remaining size of the disc becomes short during recording, this recorded video with the title "peace" is erased at the very beginning by overwriting another data.

The user moves the cursor to a predetermined position of an erasure order field in the menu in FIG. 48 using the cursor keys of a remote controller (not shown), an optional keyboard, or the like, and selects entry points, the erasure order of which is to be changed.

If the user wants to set a lower erasure order of a cell corresponding to the selected entry points (YES in step ST610), he or she decreases the order of information type [0] of each entry point to be changed by "1" (for both entry points with information type [1]=4 and information type [1]=5) (for example, to change the erasure order from the second to the third) (step ST612).

Conversely, if the user wants to set a higher erasure order, he or she increases the order of information type [0] of each entry point to be changed by "1" (for both entry points with information type [1]=4 and information type [1]=5) (for example, to change the erasure order from the second to the first) (step ST612).

If the erasure order is not to be changed (NO in step ST610), and erasure is to be prohibited (YES in step ST614), information type [1] of that entry point is set at "6" (erasure prohibition mark) (step ST616).

Upon completion of the erasure order change or erasure prohibition mark set process (YES in step ST618), management data (RTR_VMG) written with information corresponding to PRM_TXTI shown in FIG. 25 is written in disc 10 (step ST620).

If the remaining size of disc 10 becomes short during recording, MPU 30 can proceed with recording while erasing some data on disc 10 by overwriting in units of entry points in the erasure order (or in ascending order of recording dates or playback dates if no erasure order is set).

Figure 49:
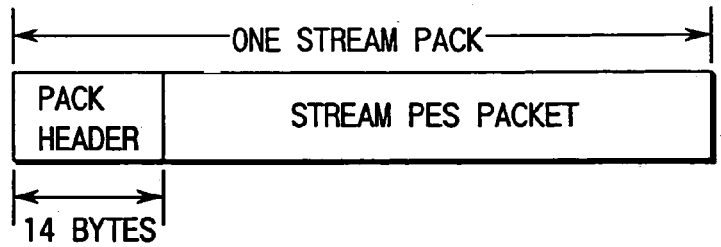
FIG. 49 explains a structure of one stream pack used when a streamer is used for a DVD-RTR recorder.

FIG. 49 shows a stream pack structure used when a streamer is used for the DVD-RTR recorder. As shown in the figure, one stream pack (2048 bytes) is formed of a pack header (14 bytes) and a stream PES packet (2034 bytes).

The pack header of the stream pack has 14 bytes in size. In this pack-header, a pack start code is described in the first 4 bytes (00001Bah). In the next 6 bytes, reference information of system clock reference SCR (SCR_base with 32 bits total) defined by a provider, marker bits, and extension of system clock reference (SCR_extension with 9 bits) are described. In the subsequent 3 bytes (0189C3h), a program multiplexed rate (program_mux_rate with 22 bits) and marker bits are described. In the last 1 byte (F8h), a pack stuffing length (pack_stuffing_length with 3 bits) is described, and a reserved area of 5 bits is further provided.

The 32nd bit of SCR_base is set to zero. The program_mux_rate is set to 10.08 Mbps.

In stream recording, an application performs its own stuffing, so that the pack length adjustment methods of DVD-VIDEO or DVD-VR (DVD video recording) need not be used. In stream recording, it is safe to assume that the stream packs will always have the necessary length.

A stream PES packet of the stream pack has the following data structure.

Figure 50:
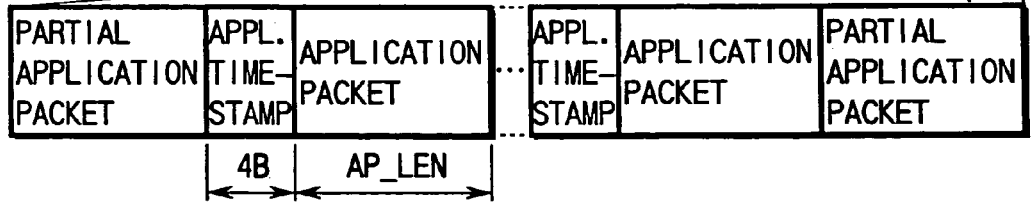
FIG. 50 shows details of the inner structure of the stream pack shown in FIG. 49.

FIG. 50 illustrates a structure of the stream data area contained in the stream PES packet shown in FIG. 49.

As shown, one stream PES packet (2034 bytes) includes a PES header (6 bytes), a substream ID (1 byte), and a stream data area (2027 bytes).

In the PES packet header of the stream PES packet, a packet start code prefix (packet_start_code_prefix with 24 bits) is recorded at the first 3 bytes (000001h). In the next 1 byte, a stream ID (stream_id=10111111b; indicating private stream 2) is recorded. In the subsequent 2 bytes (07Ech), a PES packet length (PES_packet_length with 16 bits) is recorded, In the last 1 byte, a substream ID (sub_stream_id=0000010b; indicating stream recording data) is recorded.

The stream data area (2027 bytes) within the stream packet of FIG. 50 includes an application header (9 bytes), an application header extension (optional), a stuffing byte (optional), and an application packet area.

The application packet area of FIG. 50 contains one or more application packets each of which is associated with an application time stamp.

At the leading portion of the application packet area, a partial application packet can be recorded. Thereafter, a plurality of pairs of application time stamp ATS and application packet are sequentially recorded. At the trailing portion of the application packet area, another partial application packet can be recorded.

In other words, at the start of the application packet area, a partial application packet may exist, and at the end of the application packet area, another partial application packet or a stuffing area of reserved bytes may exist.

The application time stamp (ATS) arranged in front of each application packet has 32 bits in size. An ATS can be divided into two parts, namely a base part and an extension part. The base part holds a 90 kHz unit value, and the extension part holds the less significant value measured in 27 MHz.

In the structure of FIG. 50, the application header extension may be used to store information that can differ from application packet to application packet. Such information may not be required for all kinds of applications.

Therefore, a data field of the application header is defined to describe the presence of the optional application header extension in the stream data area.

At stream recording, the first byte of application time stamp ATS of the first application packet should be aligned to the start of the application packet area in the first stream packet at the beginning of a stream object (SOB).

Any following stream packets in an SOB may split application packets across stream packet boundaries. The partial application packets in FIG. 50 show examples obtained by the above splitting.

The byte offset to the first application time stamp that starts in a stream packet, as well as the number of application packets starting in the stream packet, should be described in its application header.

This mechanism automatically allows for stuffing in front of the first application time stamp and after the last application packet in a stream packet.

The above automatic mechanism corresponds to said "an application performs its own stuffing" mentioned in the description for FIG. 49.

The application header extension (optional) is formed of a list of entries, where there is exactly one entry of 1 byte length for each application packet, which starts in this stream packet. These bytes can be used to store information that may differ from application packet to application packet.

In the 1 byte application header extension (optional), 1 bit AU_START, 1 bit AU_END, and 2 bits COPYRIGHT are described.

When AU_START is set to "1", this indicates that the associated application packet contains a random access entry point (start of a random access unit) in the stream.

When AU_END is set to "1", this indicates that the associated application packet is the last packet of a random access unit.

The COPYRIGHT describes the copyright status of the associated application packet.

Figure 51:
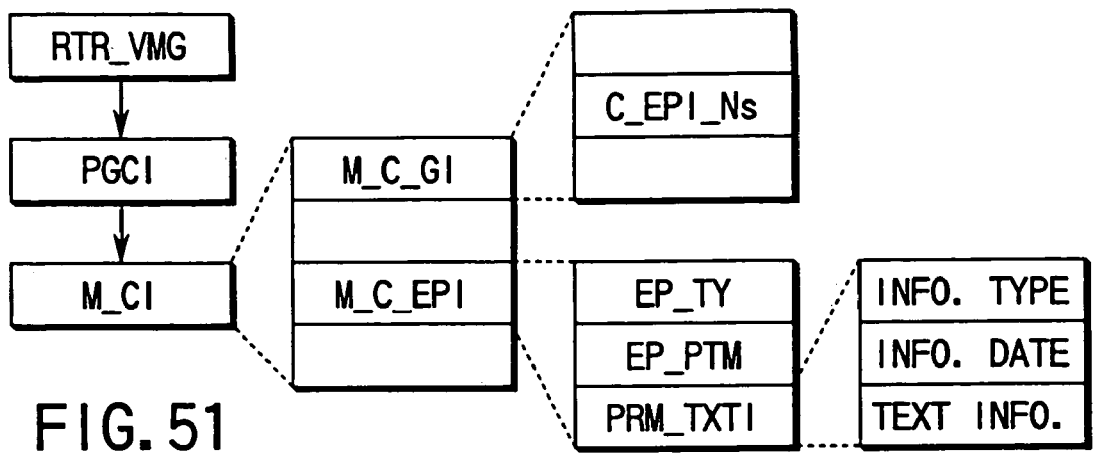
FIG. 51 briefly illustrates entry point relating information with respect to movie cell information (M_CI) used for an RTR recorder.

FIG. 51 shows entry point relating information with respect to movie cell information M_CI contained in PGCI of the RTR video manager.

More specifically, movie cell general information M_C_GI contained in M_CI includes the number of cell entry point information C_EPI_Ns (cf. FIG. 24), and movie cell entry point information M_C_EPI contained in M_CI includes entry point type EP_TY, entry point presentation time EP_PTM and primary text information PRM_TXTI (cf. FIG. 25). In this PRM_TXTI, the information type, information date and text information can be described.

Figure 52:
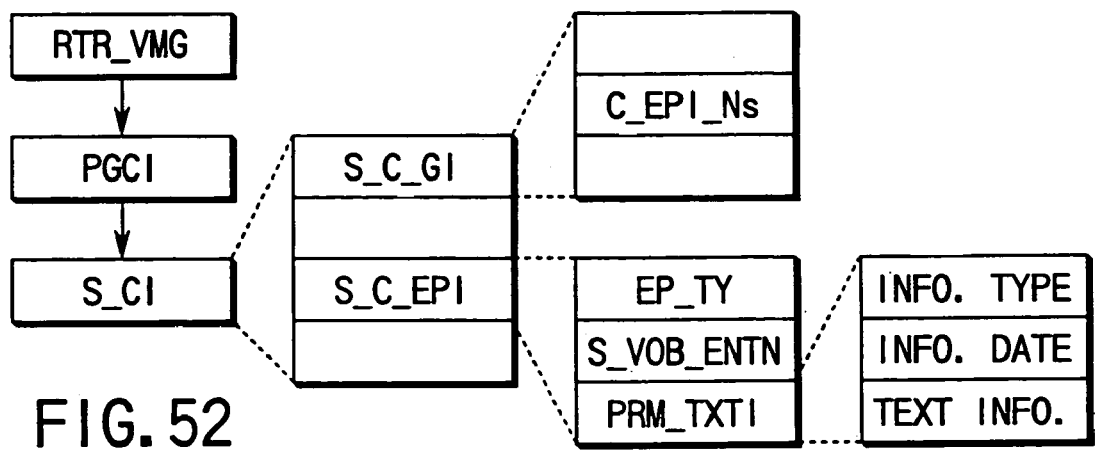
FIG. 52 briefly illustrates entry point relating information with respect to still picture cell information (S_CI) used for an RTR recorder.

FIG. 52 shows entry point relating information with respect to still picture cell information S_CI contained in PGCI of the RTR video manager.

More specifically, still picture cell general information S_C_GI contained in S_CI includes the number of cell entry point information C_EPI_Ns, and still picture cell entry point information S_C_EPI contained in S_CI includes entry point type EP_TY, still picture VOB entry number S_VOB_ENTN and primary text information PRM_TXTI. In this PRM_TXTI, the information type, information date and text information can be described.

Figure 53:
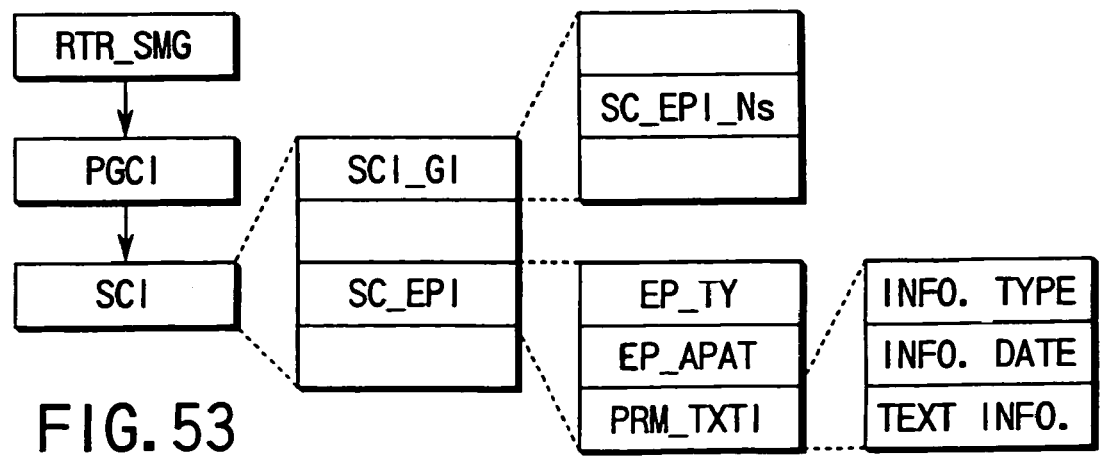
FIG. 53 briefly illustrates entry point relating information with respect to stream cell information (SCI) used for a streamer.

FIG. 53 shows entry point relating information with respect to stream cell information SCI contained in PGCI of the RTR stream manager.

More specifically, stream cell information general information SCI_GI contained in SCI includes the number of stream cell entry point information SC_EPI_Ns, and stream cell entry point information SC_EPI contained in SCI includes entry point type EP_TY, application packet arrival time of entry point EP_APAT and primary text information PRM_TXTI. In this PRM_TXTI, the information type, information date and text information can be described.

According to the embodiment (real-time digital video recording/playback system) of the present invention, the user can write or erase a mark (entry point) at an arbitrary recording position of video data, audio data, and the like as if he or she placed a bookmark between pages or at an important position while reading a book.

When information that pertains to the mark (entry point) is recorded at a predetermined position (movie cell entry point information or the like) on a medium (disc), the user can enjoy the following merits using this information upon playing back or recording (including overwrite and erasure).

1) An index that indicates programs and their recording positions on a disc can be freely generated.

That is, when that disc is set in the apparatus, the user can easily know the recorded contents of marked portions (entry points), and can start to play back such portions by simple operation.

2) A desired program can be easily found by searching various program recorded on a disc.

That is, when that disc is set in the apparatus (RTR video recorder), the user can search for titles of the marked portions (entry points) using a keyword. As a result of search, the user can easily know only a desired program of various ones recorded on the disc, and can start to play back that portion by simple operation.

3) A portion that can be erased (by overwrite recording) (or a portion that is not to be erased) of various programs recorded on a disc can be easily specified.

That is, when that disc is set in the apparatus, the user can easily know the priority order of erasure or erasure permission/prohibition of the marked portions (entry points), and can change the priority order of erasure or erasure permission/prohibition of a desired portion by simple operation. A program corresponding to a marked portion which is not prohibited from being erased is automatically erased by overwriting in accordance with the priority order of erasure upon recording new data on that disc.

4) When a portion of the recorded disc becomes defective, and cannot be normally played back, the defective portion that cannot be normally played back can be easily specified.

More specifically, when that disc is set in the apparatus, the user can easily know if the respective marked positions (entry points) suffer defects. If any defect is found, the reproduction manner of that portion (skip a defective portion, display the blue back during playback of a defective portion, play back a still image immediately before a defect until a normal portion is played back, and so forth) can be arbitrarily designated.

As described above, according to the real-time digital video recording/playback system of the present invention, even when the size of the disc to be recorded increases, the user can easily manage its contents, and can start recording/playback from a position of his or her choice.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording medium comprising:
   an object recording area configured to store an object which has a plurality of object units each including video data or audio data, said video data including movie information;
   a control information recording area configured to store control information, said control information including movie management information of said movie information;
   a program chain information area included in the control information;
   a cell information area included in the program chain information area;
   an entry point information area included in the cell information area;
   an area included in the entry point information area configured to store primary text information, wherein the primary text information corresponds to an entry point that marks an arbitrary position in the video data or audio data for a user to freely set the video data or audio data, and a first portion of the area is described by an ASCII character set and a second portion of the area is described by primary text of another character set; and
   a management table included in the control information and configured to store:
      a character set code used in the primary text information, and
      start address information of said movie management information.

2. An information recording method for recording information on an information recording medium including:
   an object recording area configured to store an object which has a plurality of object units each including video data or audio data, said video data including movie information,
   a control information recording area configured to store control information, said control information including movie management information of said movie information,
   a program chain information area included in the control information,
   a cell information area included in the program chain information area,
   an entry point information area included in the cell information area,
   an area included in the entry point information area configured to store primary text information, wherein the primary text information corresponds to an entry point that marks an arbitrary position in the video data or audio data for a user to freely set the video data or audio data, and a first portion of the area is described by an ASCII character set and a second portion of the area is described by primary text of another character set, and
   a management table included in the control information and configured to store:
      a character set code used in the primary text information, and
      start address information of said movie management information,
   the information recording method comprising:
   recording the object including the object units in the object recording area; and
   recording the control information including the primary text information, the character set code used in the primary text information, and the start address information of said movie management information.

3. An information reproducing method for reproducing information on an information recording medium including:
   an object recording area including an object which has a plurality of object units each including video data or audio data, said video data including movie information,
   a control information recording area including control information, said control information including movie management information of said movie information,
   a program chain information area included in the control information,
   a cell information area included in the program chain information area,
   an entry point information area included in the cell information area,
   an area included in the entry point information area including primary text information, wherein the primary text information corresponds to an entry point that marks an arbitrary position in the video data or audio data for a user to freely set the video data or audio data, and a first portion of the area is described by an ASCII character set and a second portion of the area is described by primary text of another character set, and
   a management table included in the control information and including:
      a character set code used in the primary text information, and
      start address information of said movie management information,
   the information reproducing method comprising:
   reproducing the control information including the primary text information and the start address information of said movie management information.

4. An information reproducing apparatus for reproducing information on an information recording medium including:
   an object recording area including an object which has a plurality of object units each including video data or audio data, said video data including movie information,
   a control information recording area including control information, said control information including movie management information of said movie information, a program chain information area included in the control information, a cell information area included in the program chain information area, an entry point information area included in the cell information area, an area included in the entry point information area including primary text information, wherein the primary text information corresponds to an entry point that marks an arbitrary position in the video data or audio data for a user to freely set the video data or audio data, and a first portion of the area is described by an ASCII character set and a second portion of the area is described by primary text of another character set, and a management table included in the control information and including:

a character set code used in the primary text information, and start address information of said movie management information, the information reproducing apparatus comprising:

a first reproducer configured to reproduce the primary text information based on the character set code; and a second reproducer configured to reproduce the start address information of said movie management information.

* * * * *